United States Patent
Ikegami et al.

(10) Patent No.: US 7,905,108 B2
(45) Date of Patent: Mar. 15, 2011

(54) AIR CONDITIONING APPARATUS

(75) Inventors: Shuji Ikegami, Osaka (JP); Nobuki Matsui, Osaka (JP); Tomohiro Yabu, Osaka (JP); Junichi Teraki, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 615 days.

(21) Appl. No.: 10/574,896

(22) PCT Filed: Oct. 8, 2004

(86) PCT No.: PCT/JP2004/014943
§ 371 (c)(1),
(2), (4) Date: Apr. 6, 2006

(87) PCT Pub. No.: WO2005/036063
PCT Pub. Date: Apr. 21, 2005

(65) Prior Publication Data
US 2007/0039343 A1 Feb. 22, 2007

(30) Foreign Application Priority Data

Oct. 9, 2003 (JP) .................................. 2003-351195

(51) Int. Cl.
*F25D 23/00* (2006.01)
*F25D 17/00* (2006.01)
(52) U.S. Cl. ........................................................ 62/271
(58) Field of Classification Search .................. 62/271, 62/238.3, 238.7, 232, 324.1, 476, 480
See application file for complete search history.

(56) References Cited

U.S. PATENT DOCUMENTS

| | | | | |
|---|---|---|---|---|
| 1,729,081 A | * | 9/1929 | Miller | 62/106 |
| 2,057,938 A | * | 10/1936 | Crawford | 62/94 |
| 2,136,513 A | * | 11/1938 | Lednum | 96/144 |
| 3,774,374 A | * | 11/1973 | Dufour et al. | 96/112 |
| 4,165,952 A | * | 8/1979 | Bennett | 417/207 |
| 4,180,985 A | | 1/1980 | Northrup, Jr. | |
| 4,430,864 A | * | 2/1984 | Mathiprakasam | 62/94 |
| 4,700,550 A | * | 10/1987 | Rhodes | 62/271 |
| 4,703,886 A | * | 11/1987 | Kirby | 236/44 E |

(Continued)

FOREIGN PATENT DOCUMENTS

JP 8-189667 A 7/1996

(Continued)

OTHER PUBLICATIONS

Oxford English Dictionary, Online Edition Definition of "Air" retrieved Jul. 19, 2010.*

*Primary Examiner* — Judy J Swann
*Assistant Examiner* — Alexis K Cox
(74) *Attorney, Agent, or Firm* — Birch, Stewart, Kolasch & Birch, LLP

(57) ABSTRACT

An air conditioning apparatus is provided which includes a plurality of heat exchangers (11, 12, 13) for effecting heat exchange between a heating medium (such as refrigerant, cold and hot water et cetera) and air and which is adapted to separately perform sensible heat processing and latent heat processing of room air (RA). In the air conditioning apparatus, at least one heat exchanger (13) is made up of an adsorption heat exchanger (13) that supports on its surface an adsorbent, thereby preventing the increase in apparatus size and making it possible to perform operations at high COP.

8 Claims, 36 Drawing Sheets

U.S. PATENT DOCUMENTS

| | | | |
|---|---|---|---|
| 4,786,301 A * | 11/1988 | Rhodes | 62/271 |
| 4,793,143 A | 12/1988 | Rhodes | |
| 4,995,235 A * | 2/1991 | Halene | 62/46.2 |
| 5,005,371 A * | 4/1991 | Yonezawa et al. | 62/238.6 |
| 5,438,843 A * | 8/1995 | Conlon | 62/124 |
| 5,749,230 A * | 5/1998 | Coellner et al. | 62/94 |
| 5,806,337 A * | 9/1998 | Mabuchi et al. | 62/476 |
| 6,041,617 A * | 3/2000 | Sanada et al. | 62/480 |
| 6,370,900 B1 * | 4/2002 | Maeda | 62/271 |
| 6,520,249 B2 * | 2/2003 | Iwamoto et al. | 165/104.12 |
| 6,668,572 B1 * | 12/2003 | Seo et al. | 62/238.6 |
| 6,675,601 B2 * | 1/2004 | Ebara | 62/271 |
| 7,603,791 B1 * | 10/2009 | Griffin | 34/77 |
| 7,617,694 B2 * | 11/2009 | Hwang et al. | 62/225 |
| 7,685,835 B2 * | 3/2010 | Yoshimi | 62/324.1 |
| 7,716,943 B2 * | 5/2010 | Seefeldt | 62/324.6 |
| 2004/0000152 A1 * | 1/2004 | Fischer | 62/94 |
| 2008/0307802 A1 * | 12/2008 | Forkosh | 62/78 |
| 2009/0301127 A1 * | 12/2009 | Kaufman et al. | 62/480 |
| 2009/0308099 A1 * | 12/2009 | Matsui et al. | 62/476 |
| 2010/0000243 A1 * | 1/2010 | Morimoto et al. | 62/176.6 |
| 2010/0043462 A1 * | 2/2010 | Barot et al. | 62/112 |
| 2010/0132914 A1 * | 6/2010 | Watanabe | 165/10 |

FOREIGN PATENT DOCUMENTS

| | | |
|---|---|---|
| JP | 9-318126 A | 12/1997 |
| JP | 11-51421 A | 2/1999 |
| JP | 2001-201106 A | 7/2001 |
| JP | 2003-035436 A | 2/2003 |
| JP | 2003-232540 A | 8/2003 |

* cited by examiner

FIG. 1
(A)
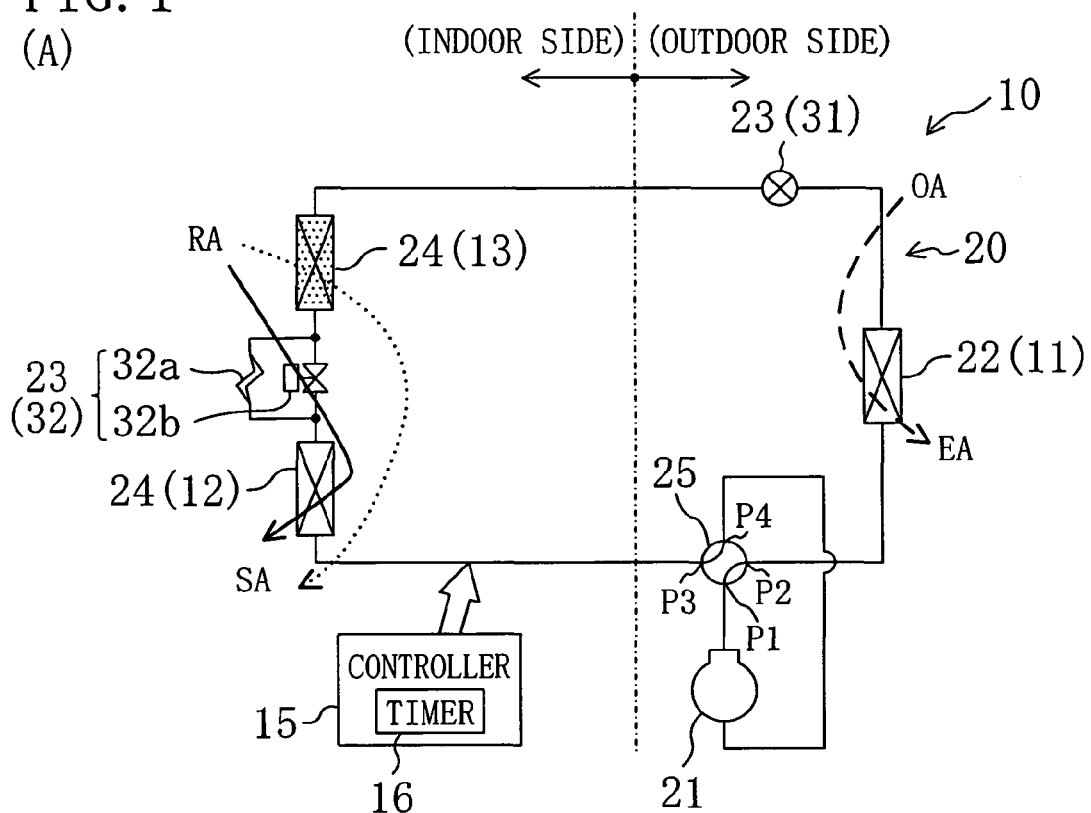
(B)
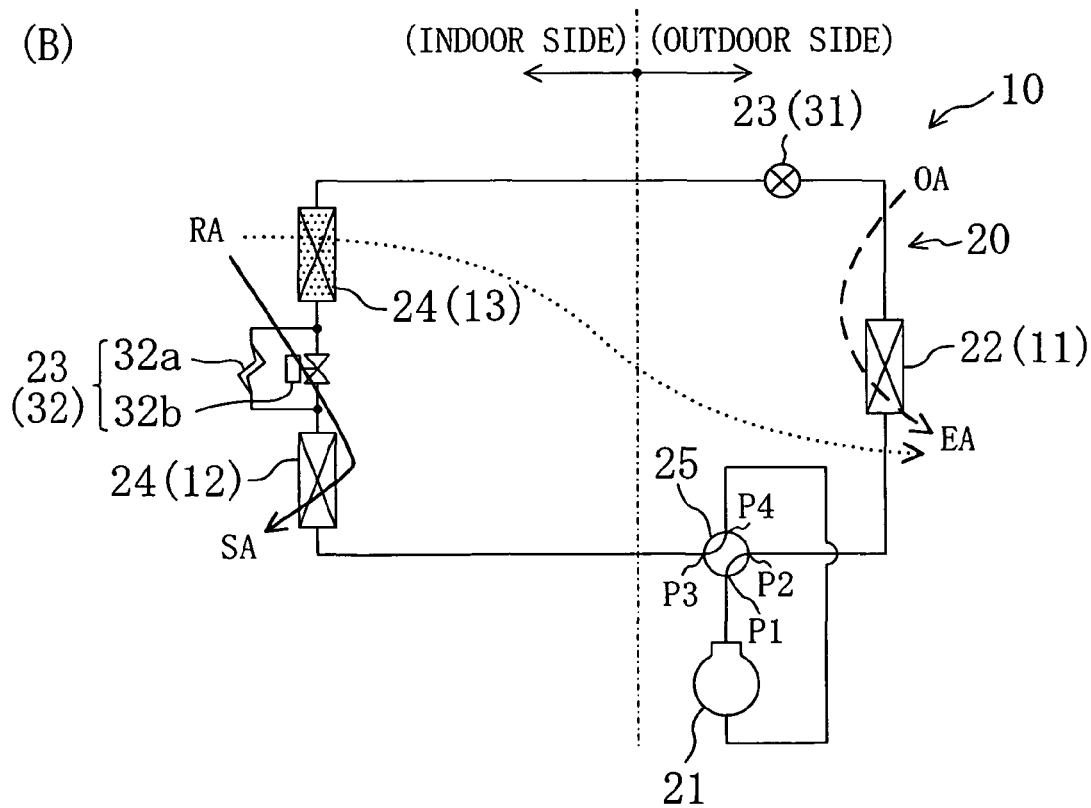

FIG. 2
(A)
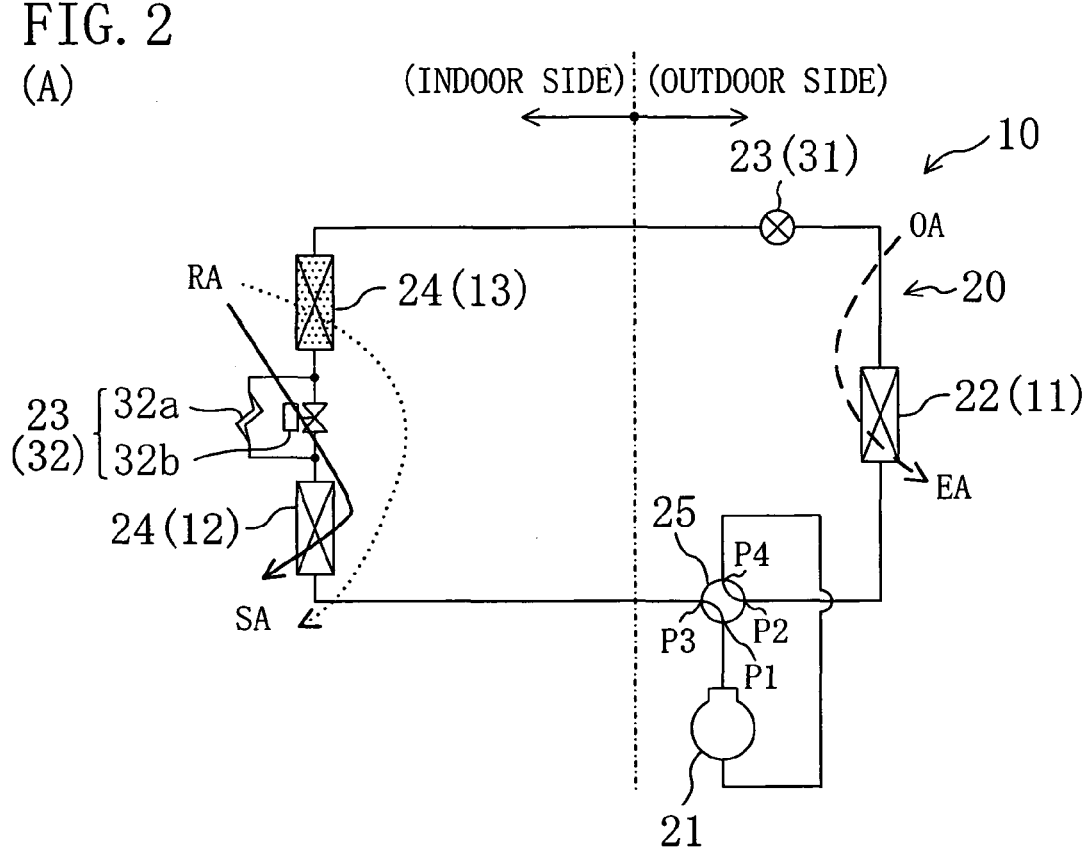
(B)
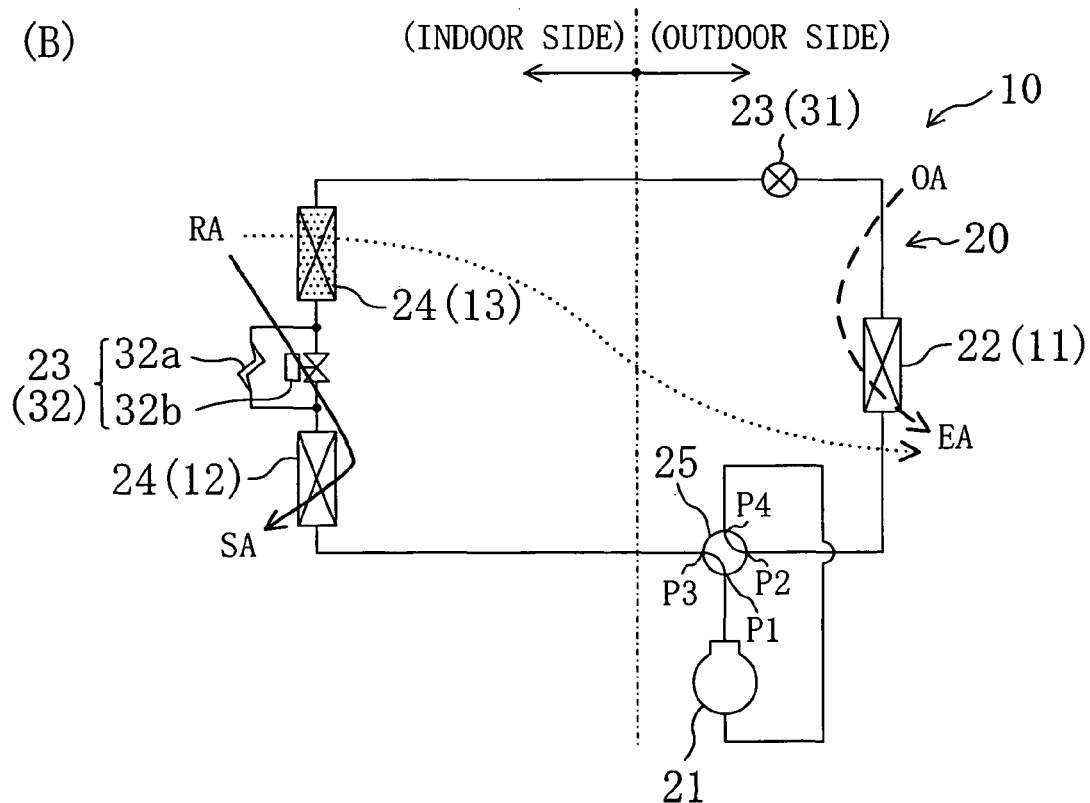

FIG. 3
(A)
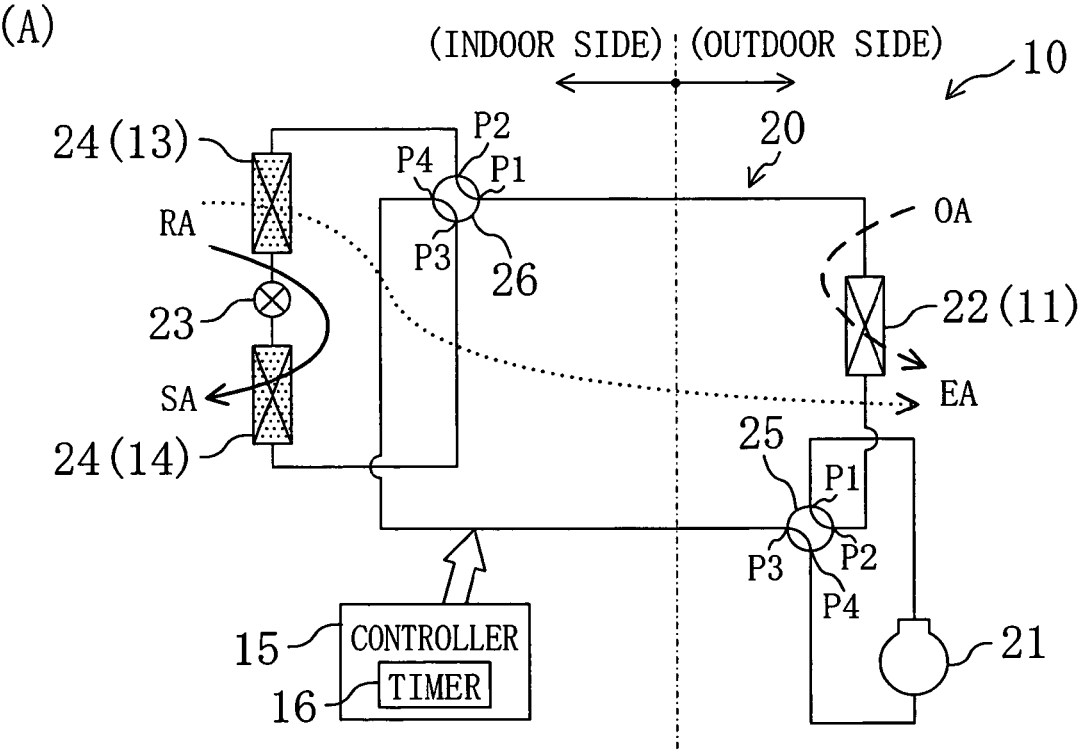
(B)
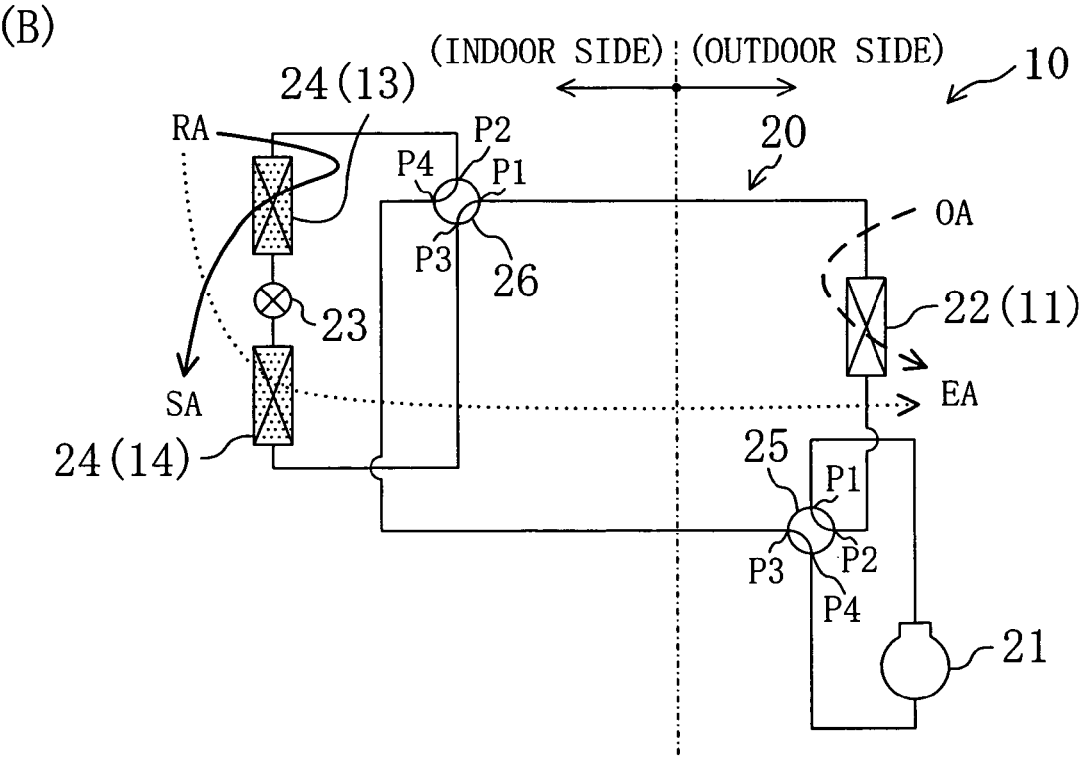

FIG. 4
(A)
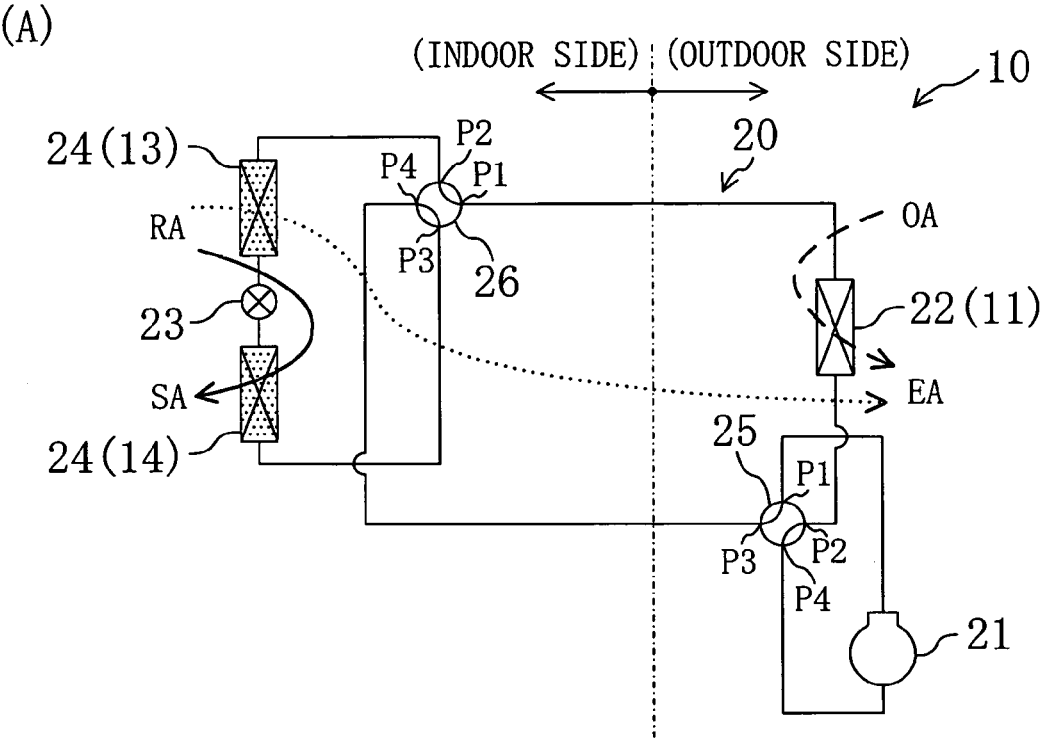
(B)
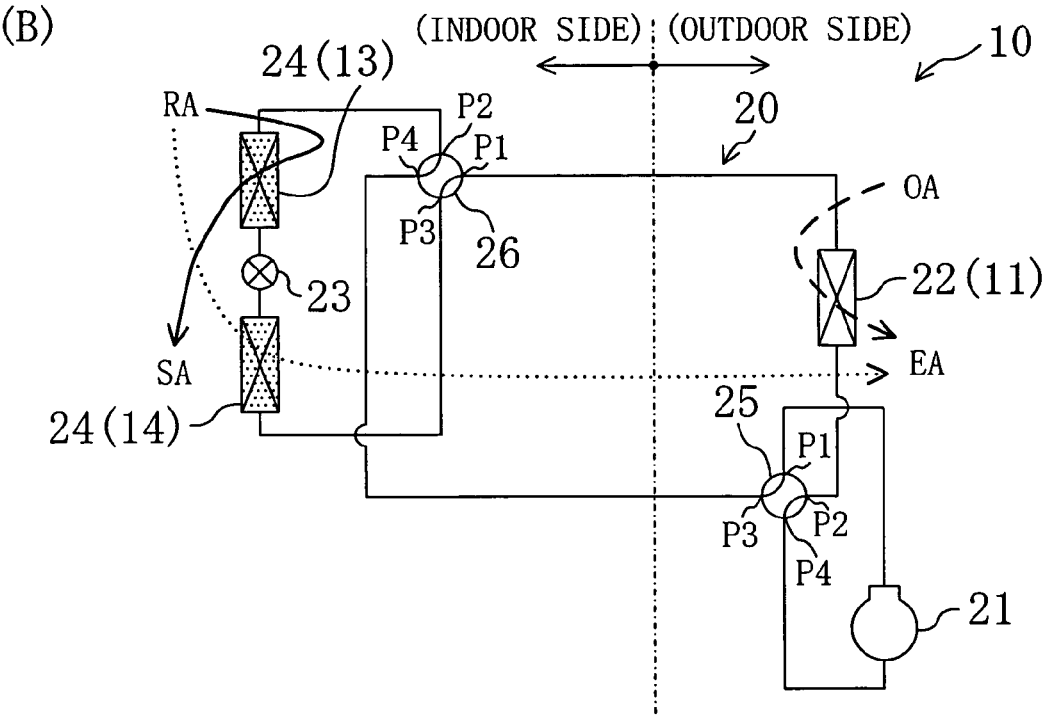

FIG. 5
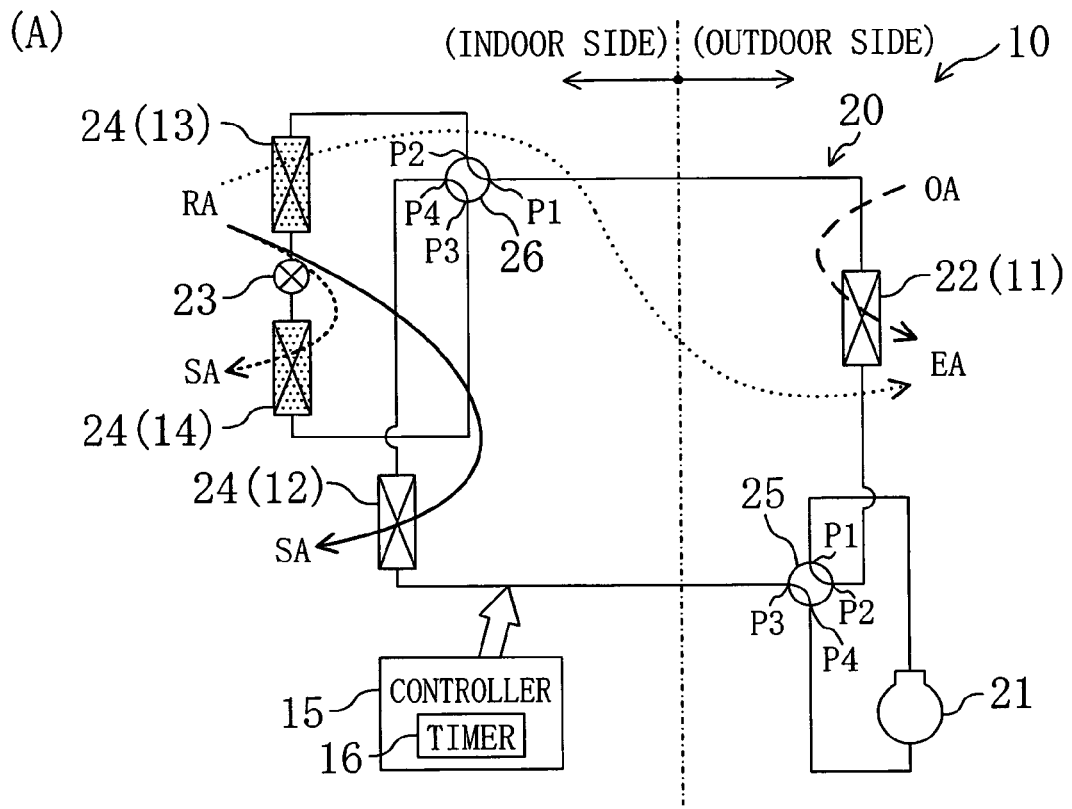
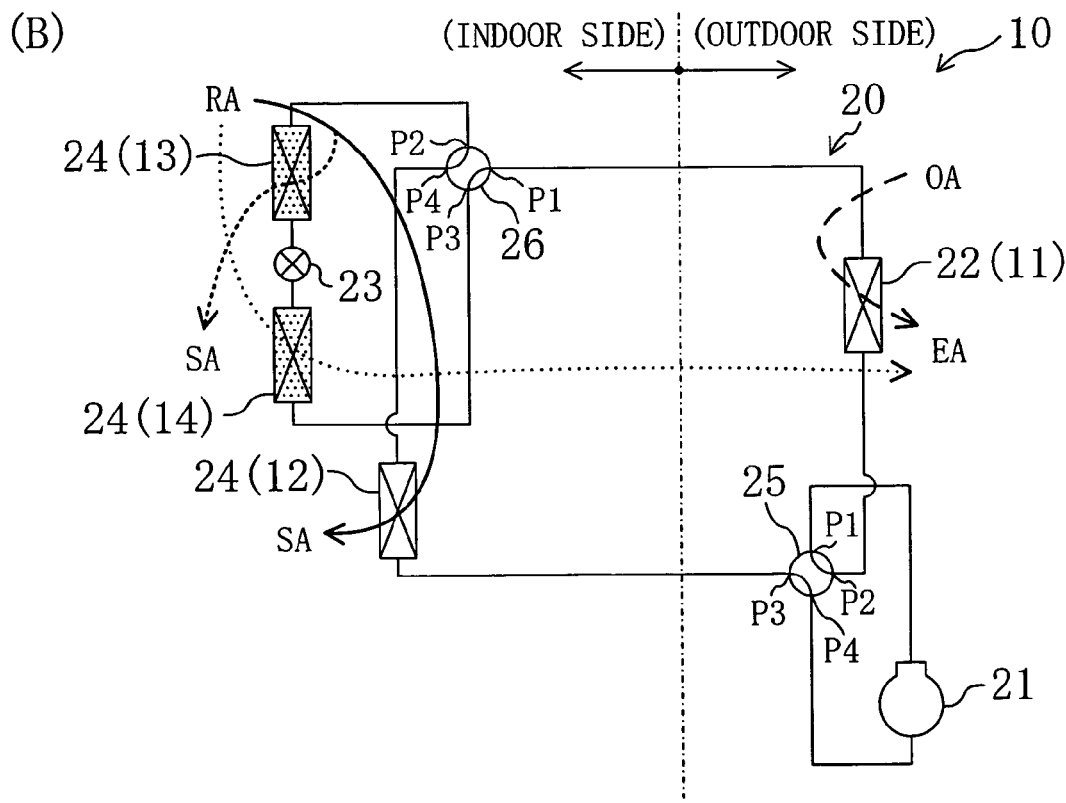

FIG. 6
(A)
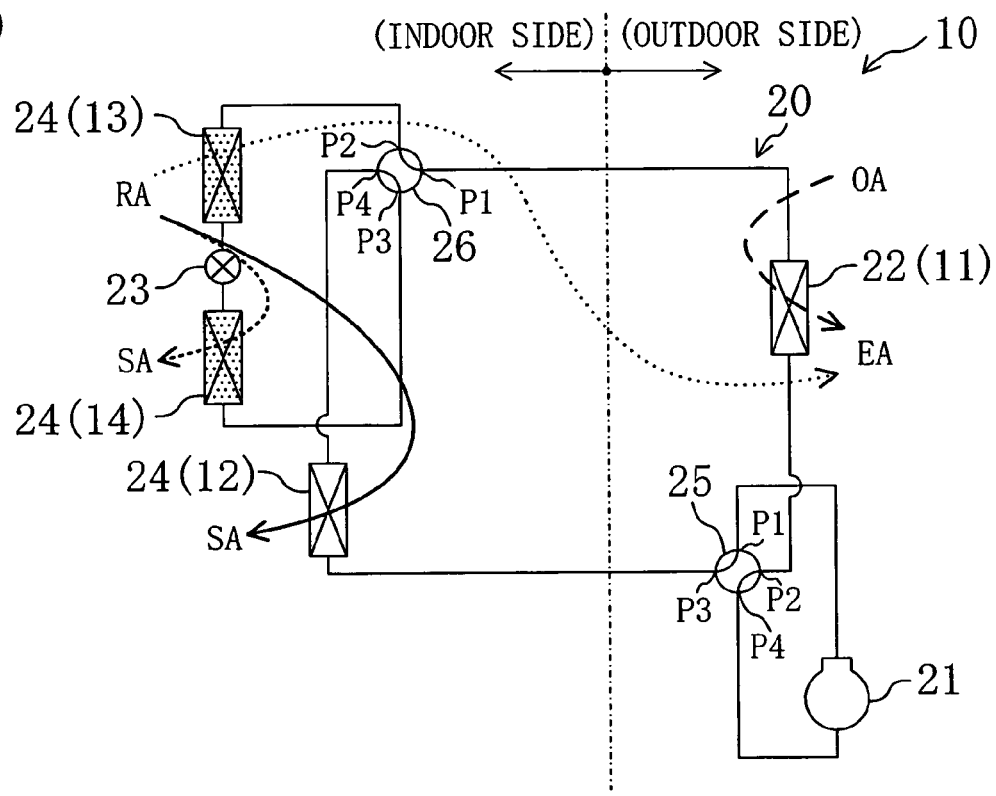
(B)
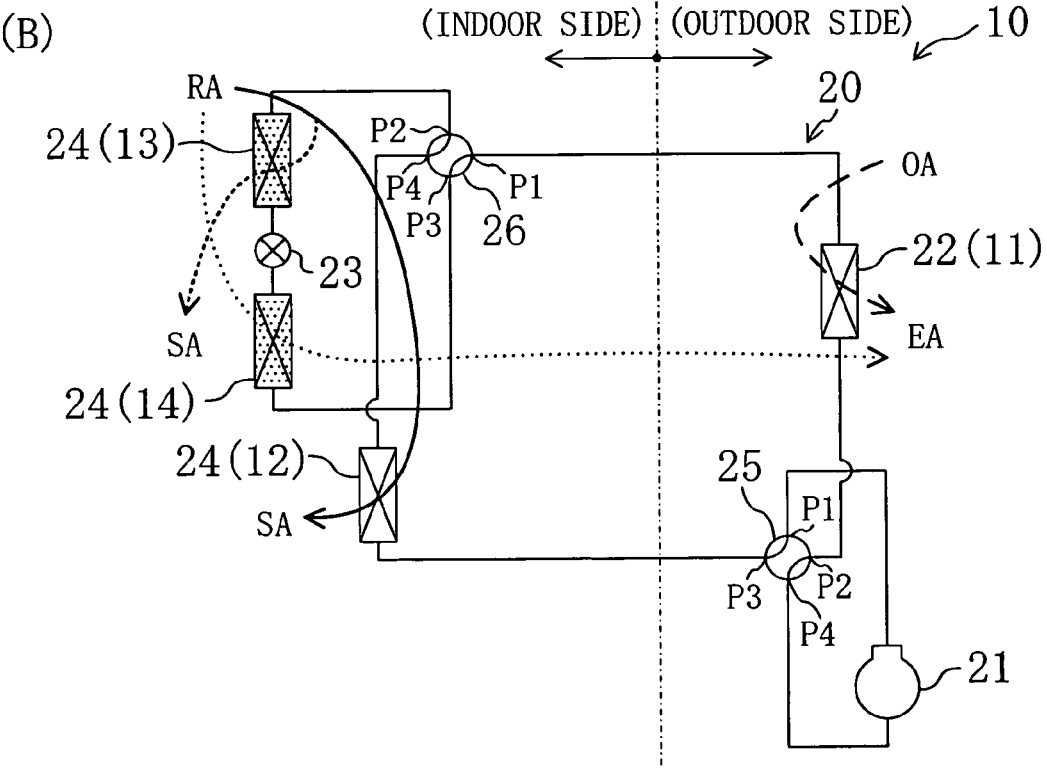

FIG. 10
(A)
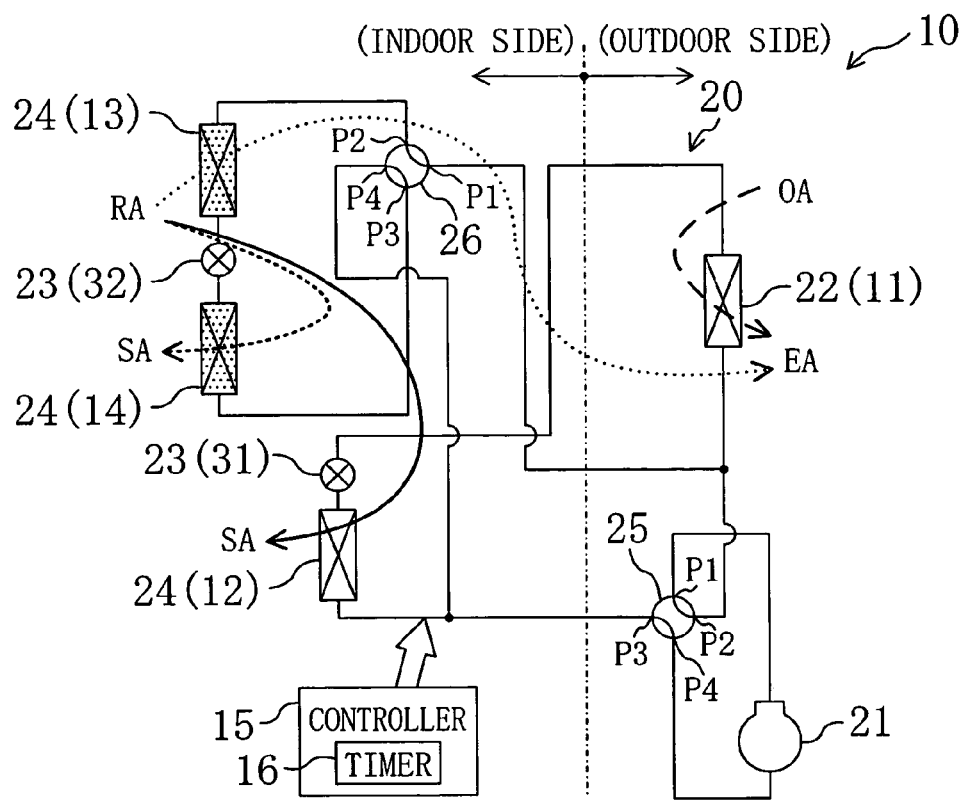
(B)
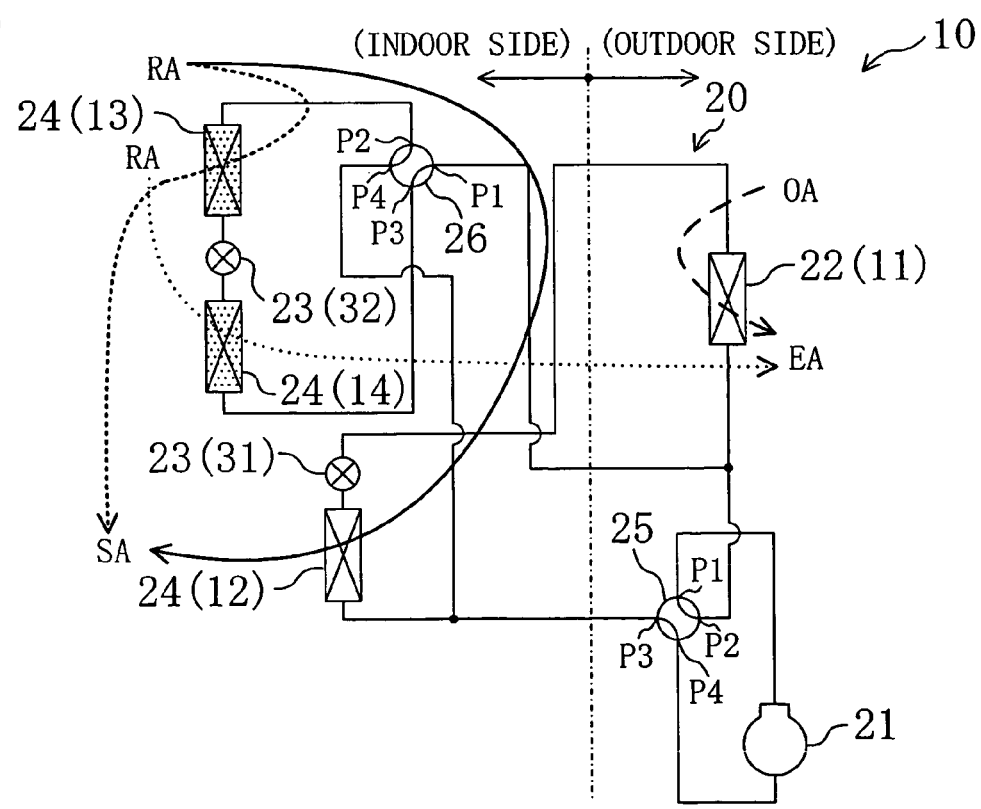

FIG. 11
(A)
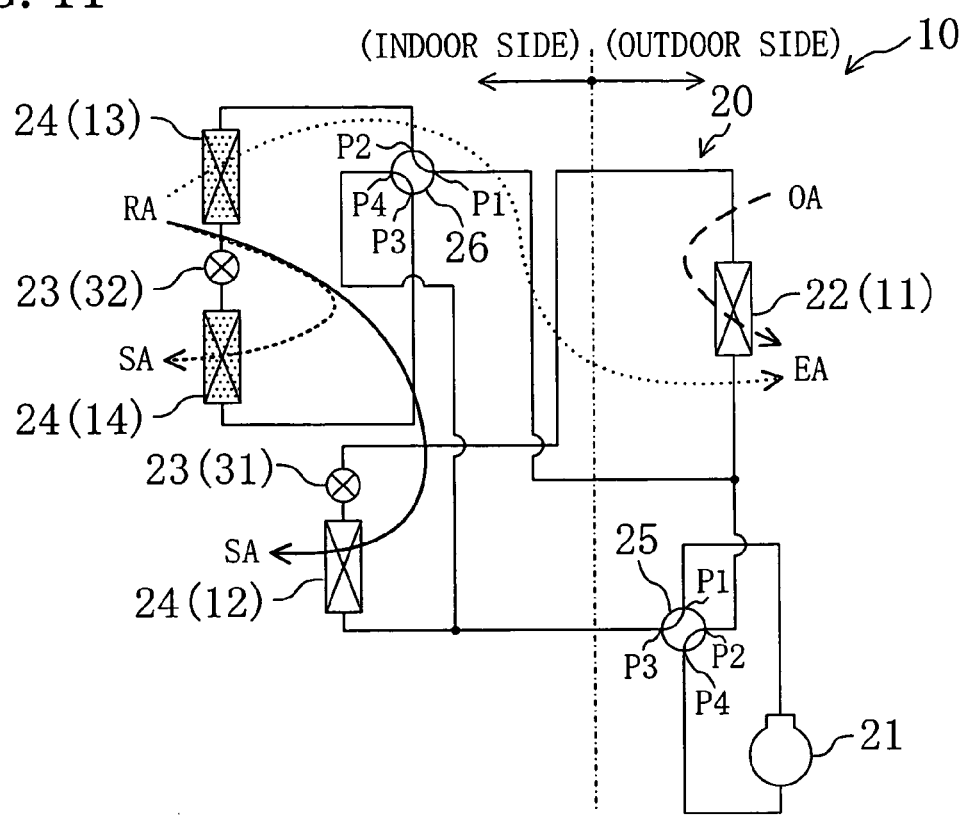
(B)
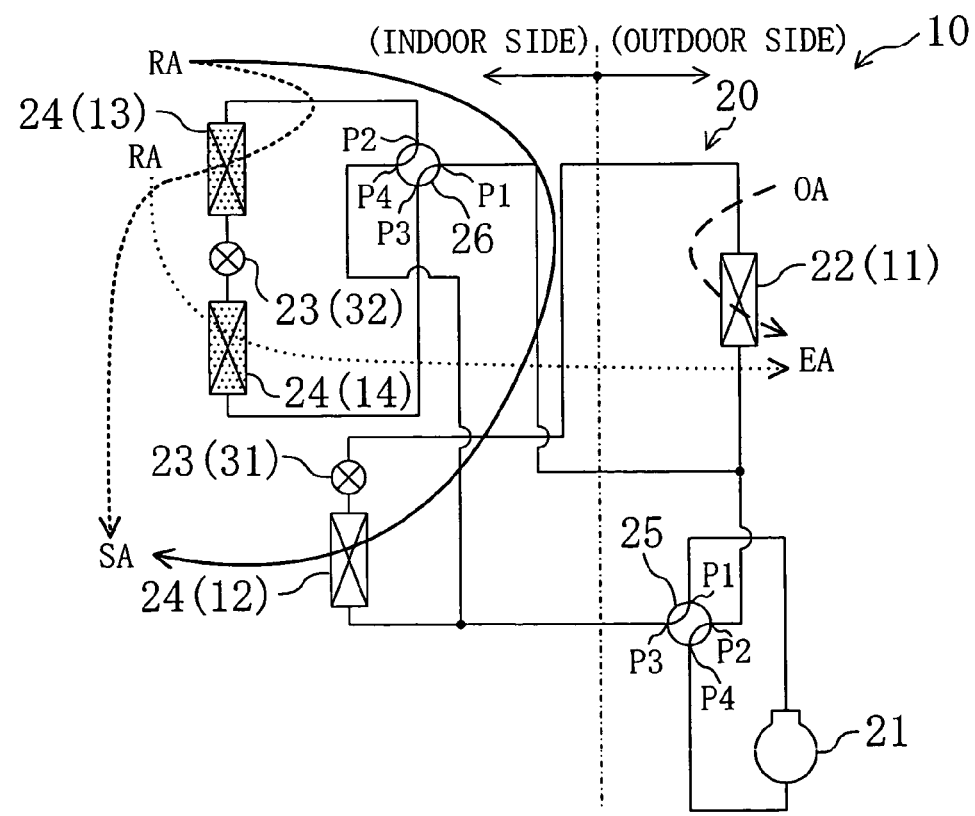

FIG. 12
(A)
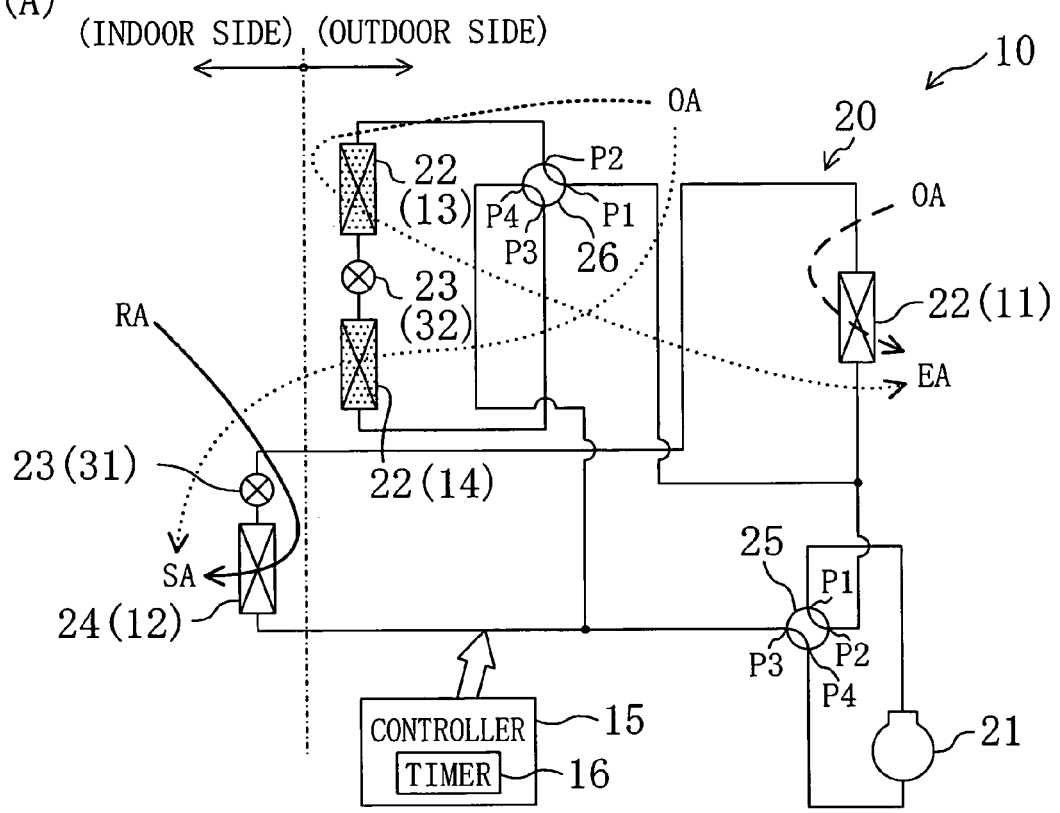
(B)
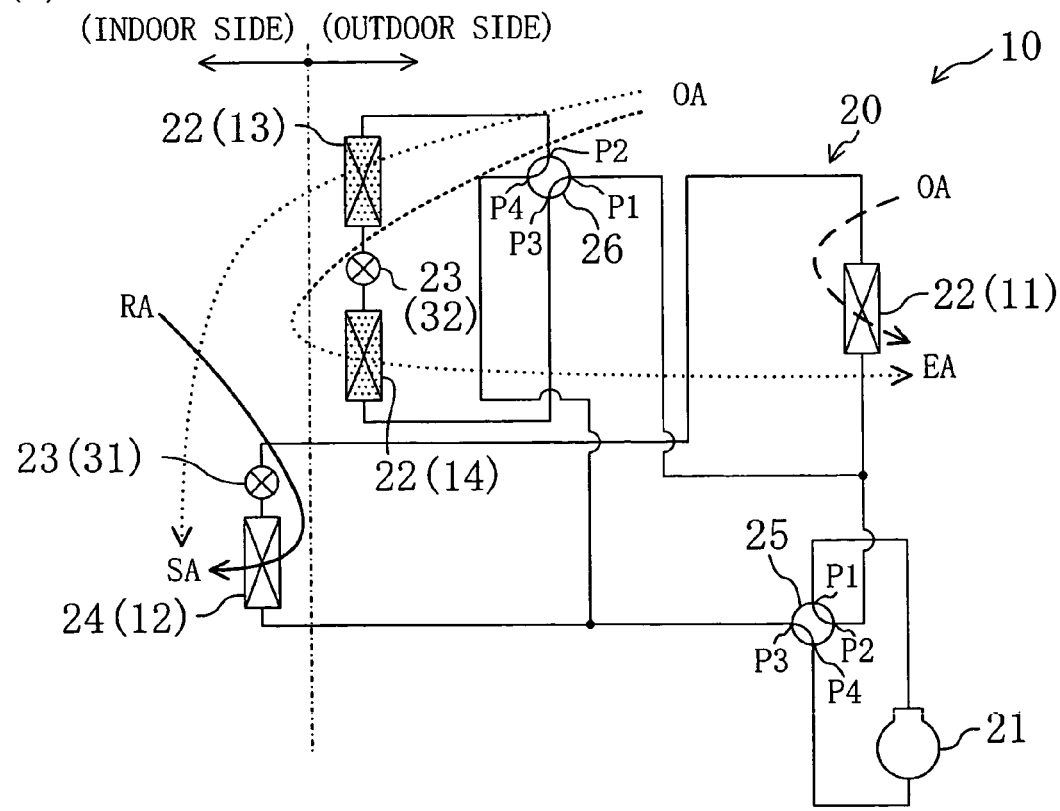

FIG. 13
(A)
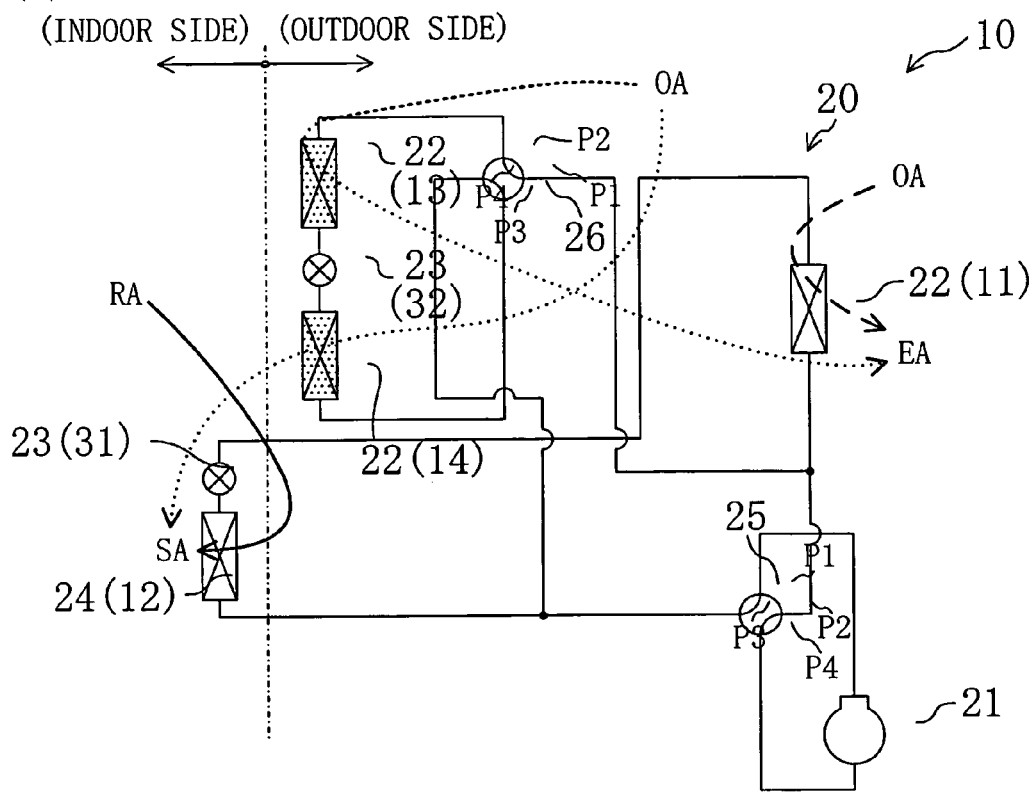
(B)
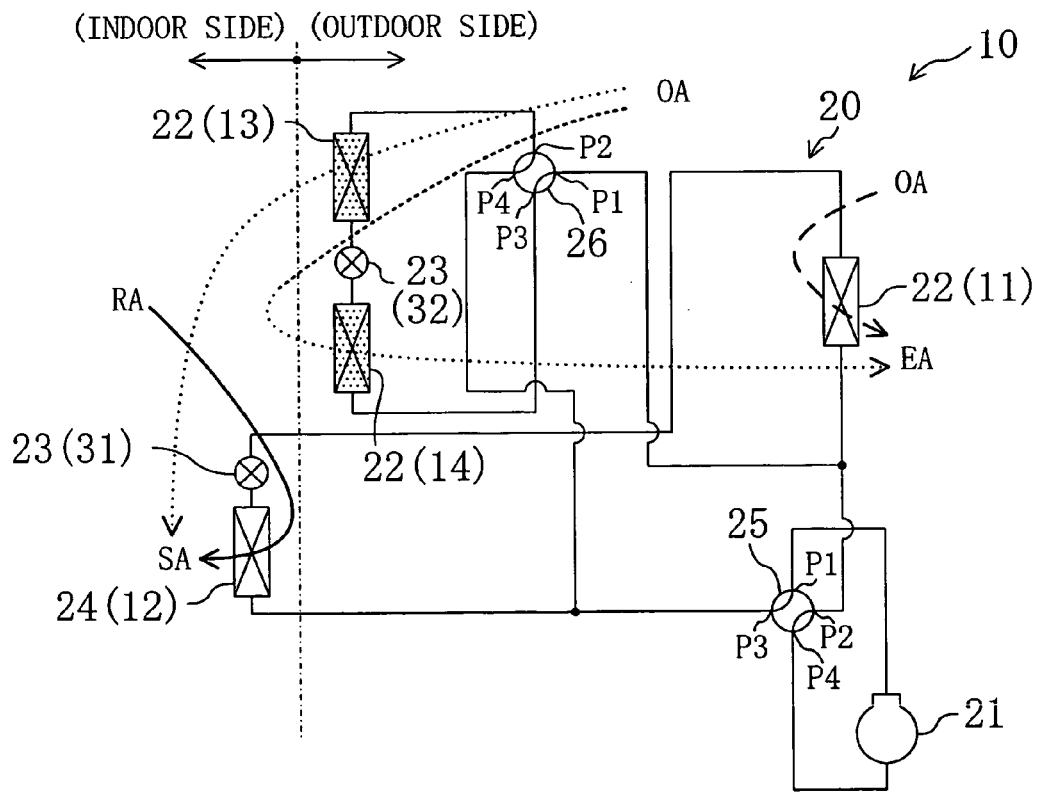

FIG. 15
(A)
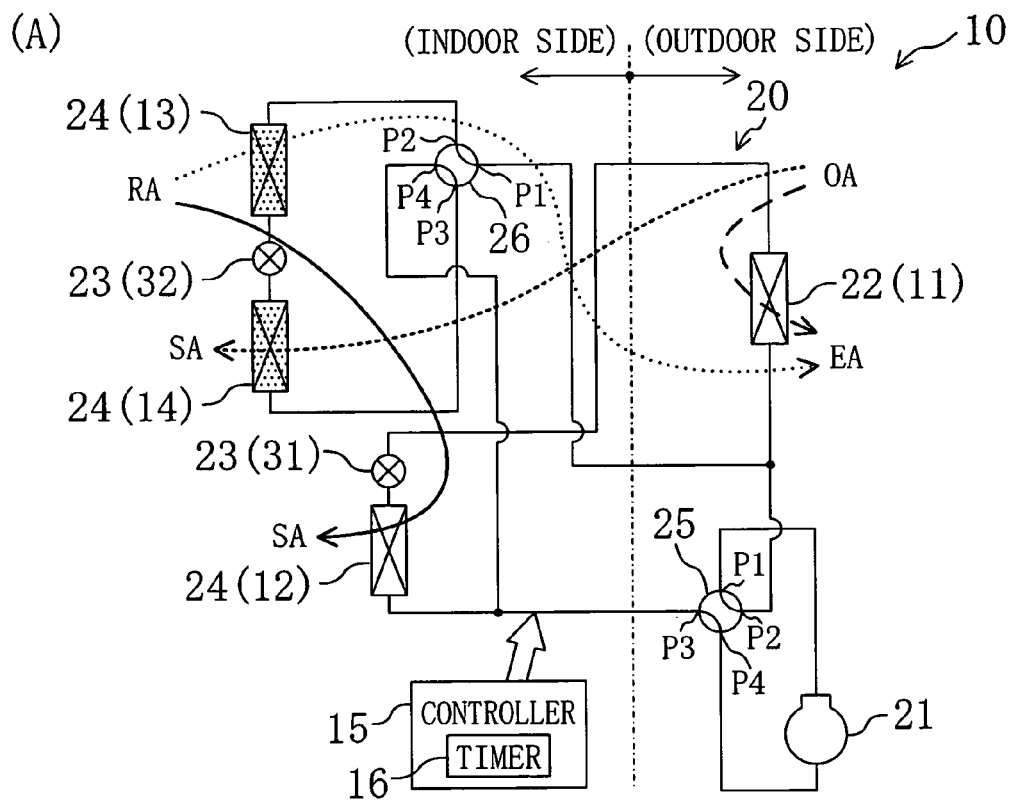
(B)
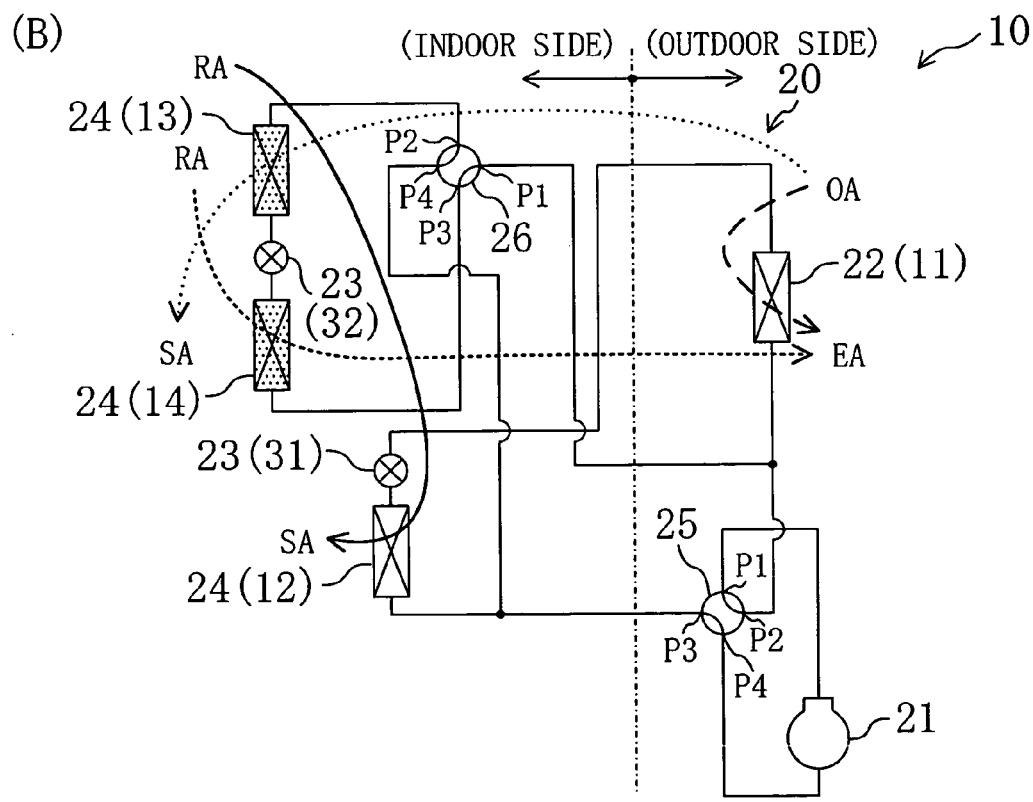

FIG. 16
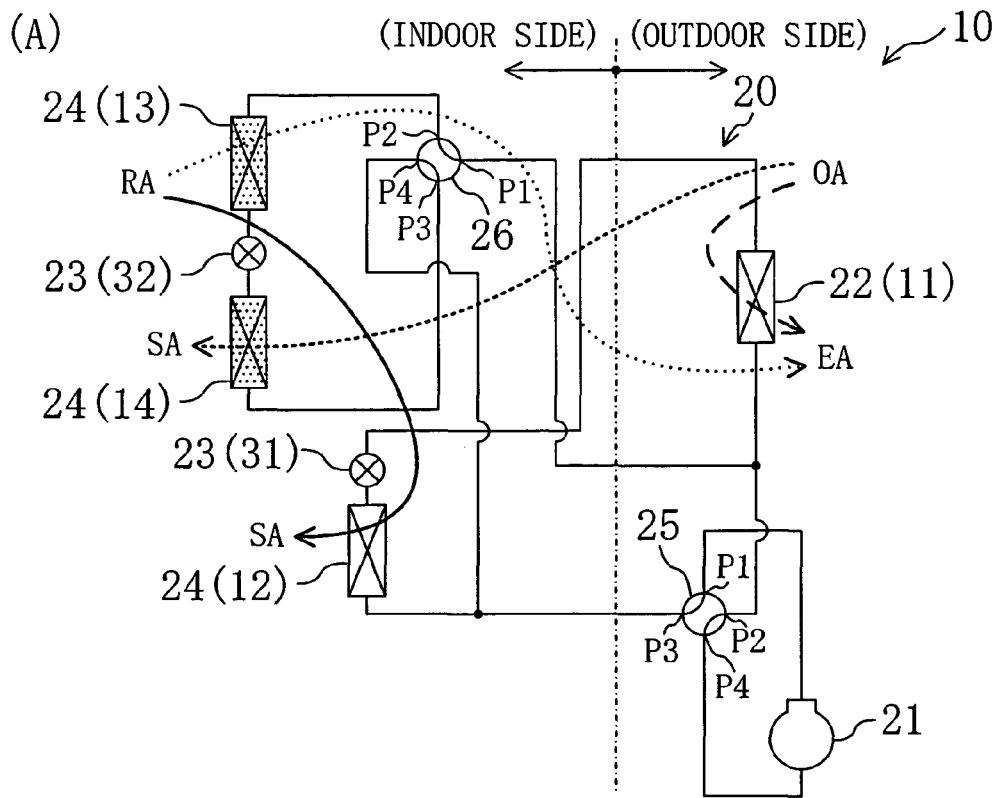
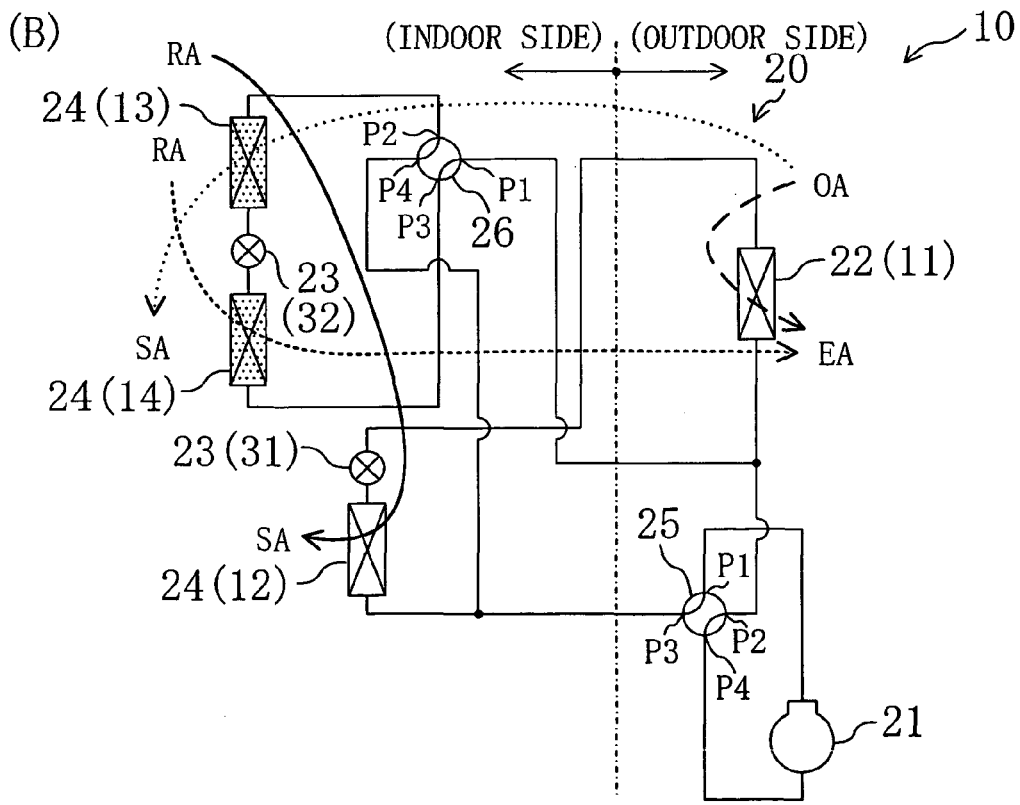

FIG. 21
(A)
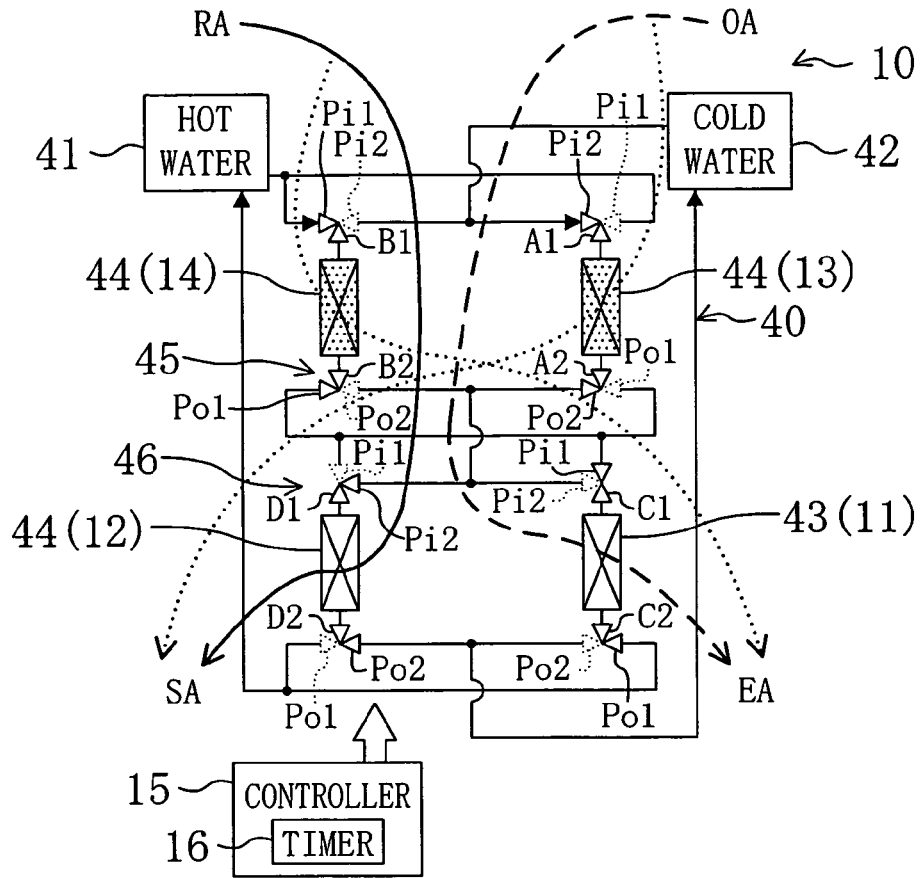
(B)
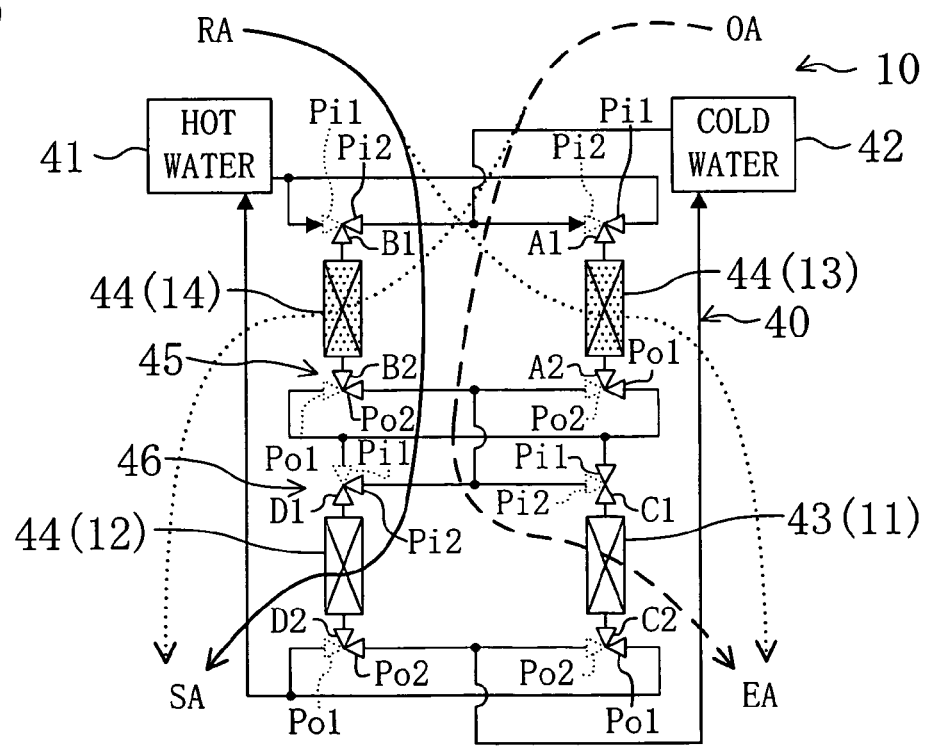

FIG. 22
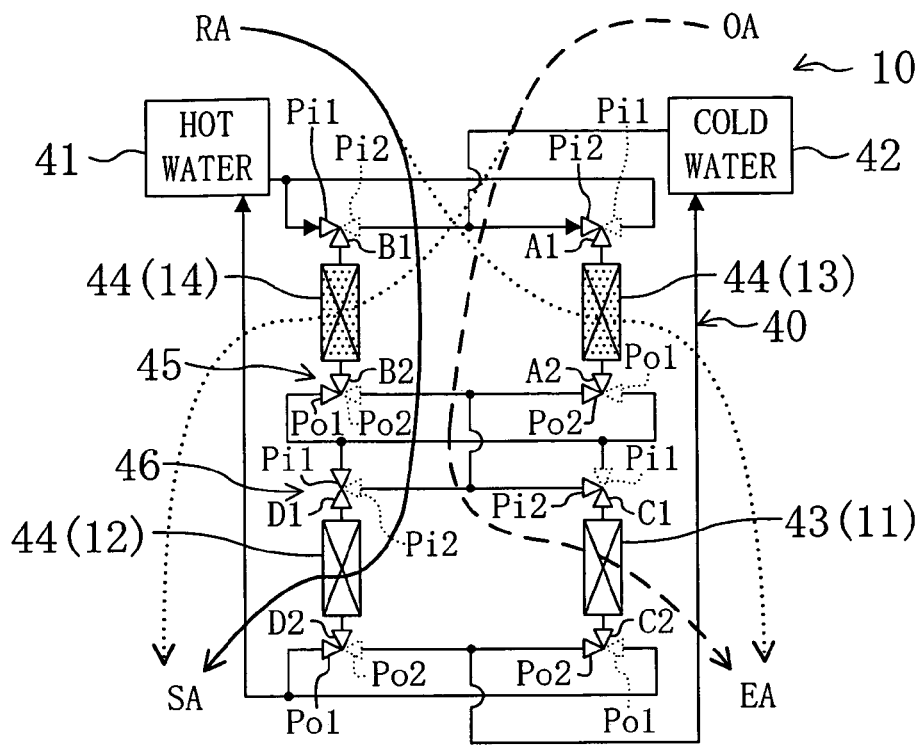
(A)
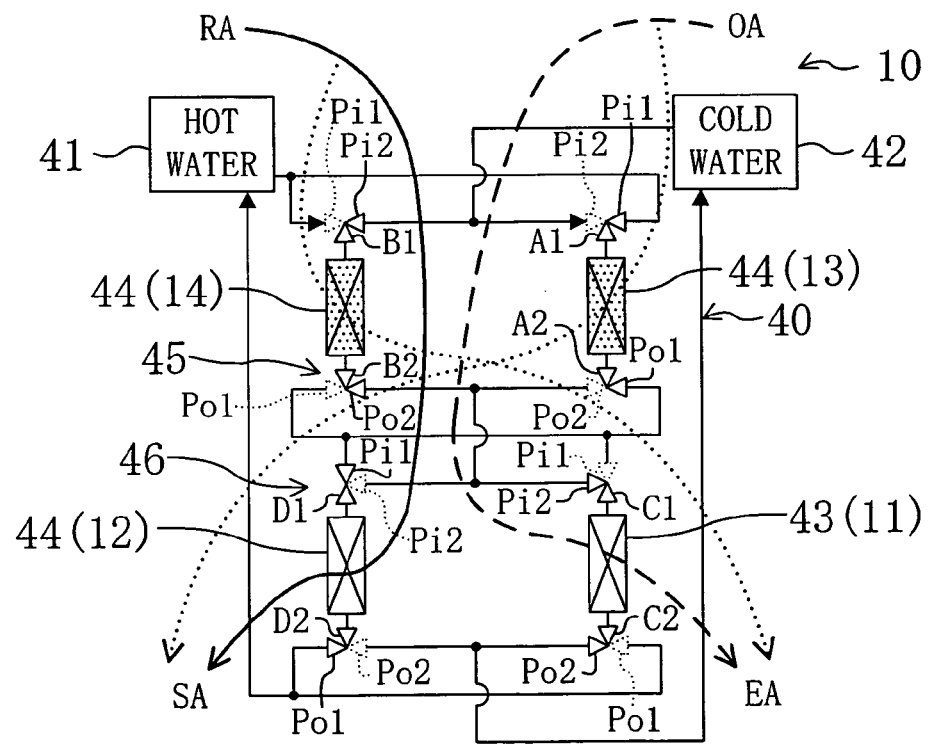
(B)

FIG. 23
(A)
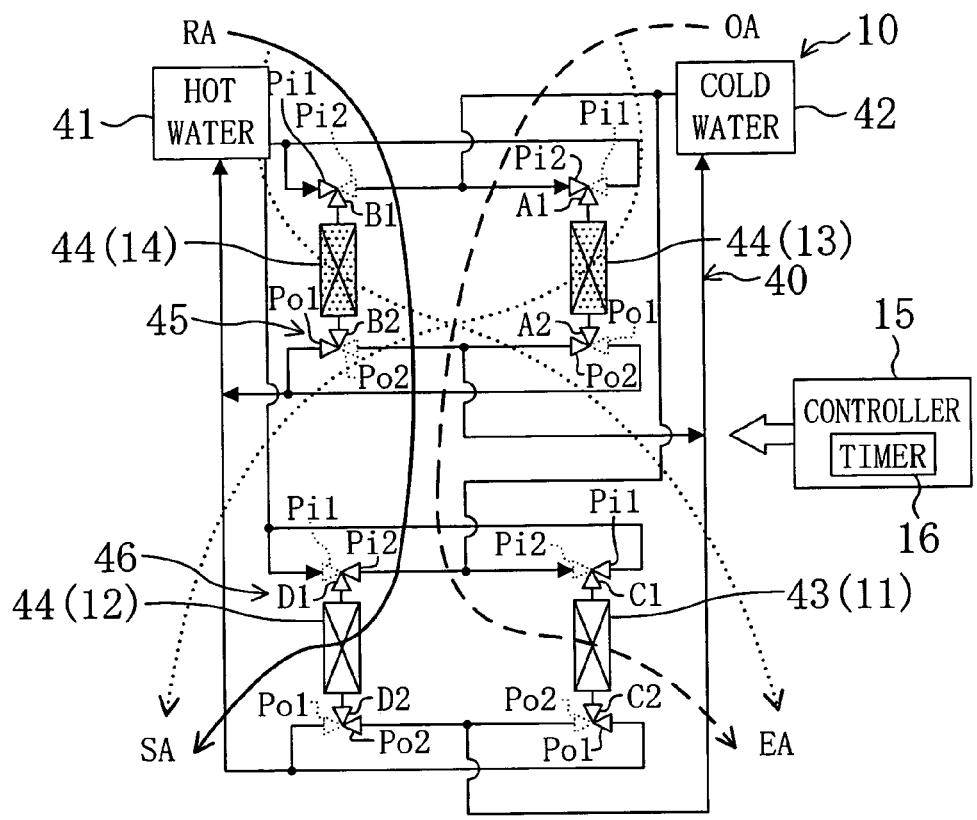
(B)
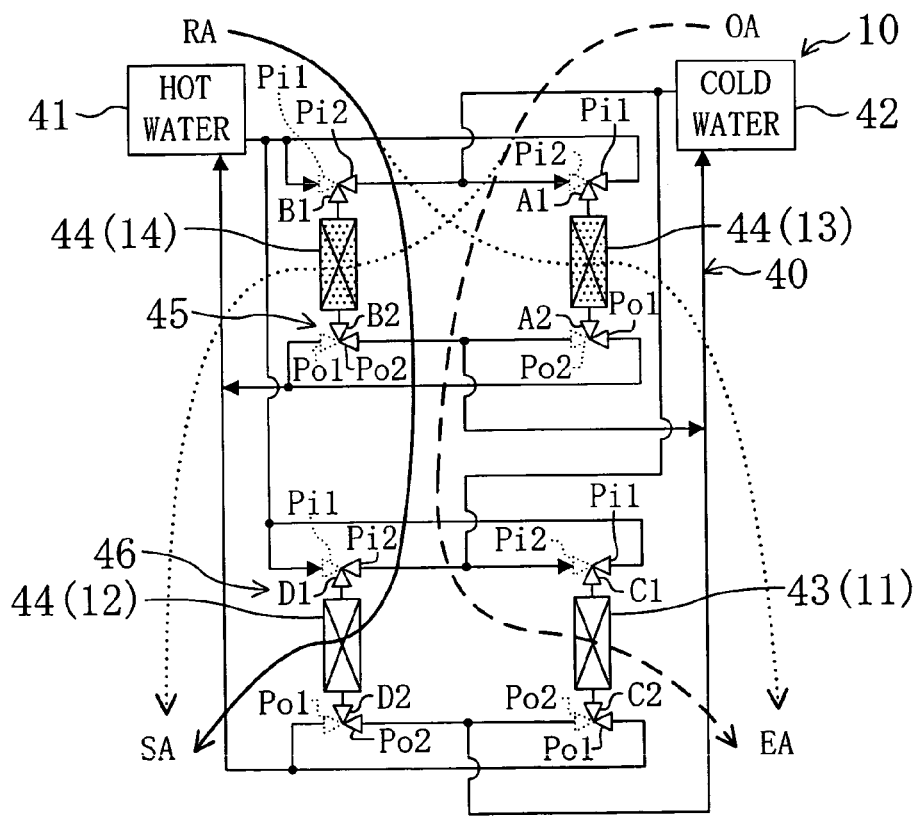

FIG. 24
(A)
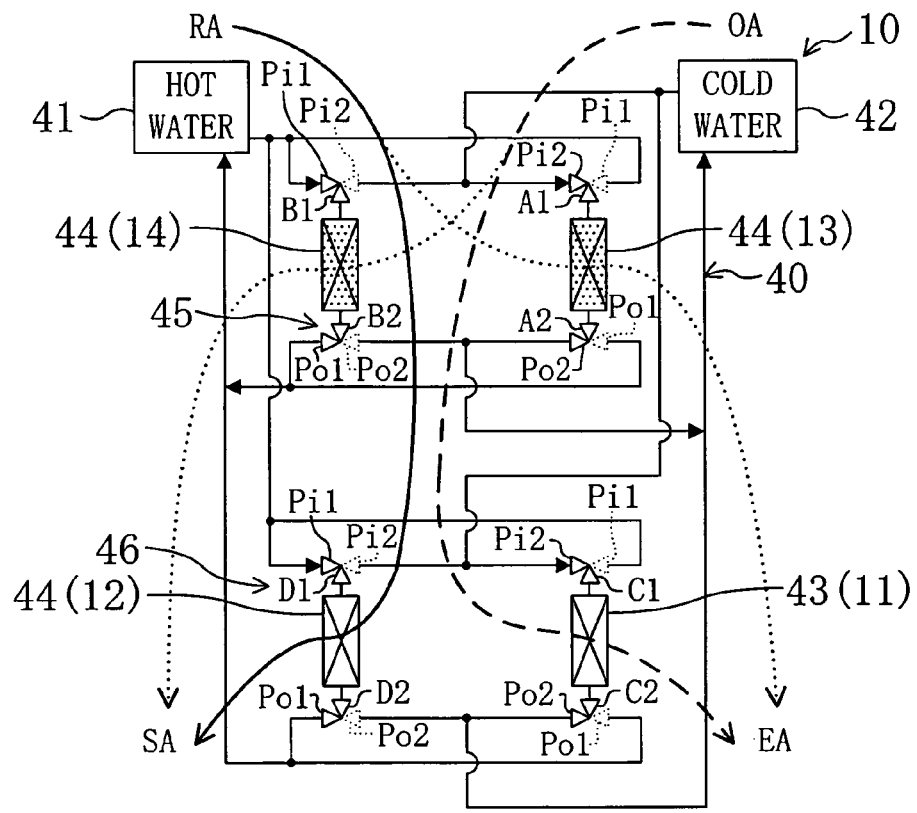
(B)
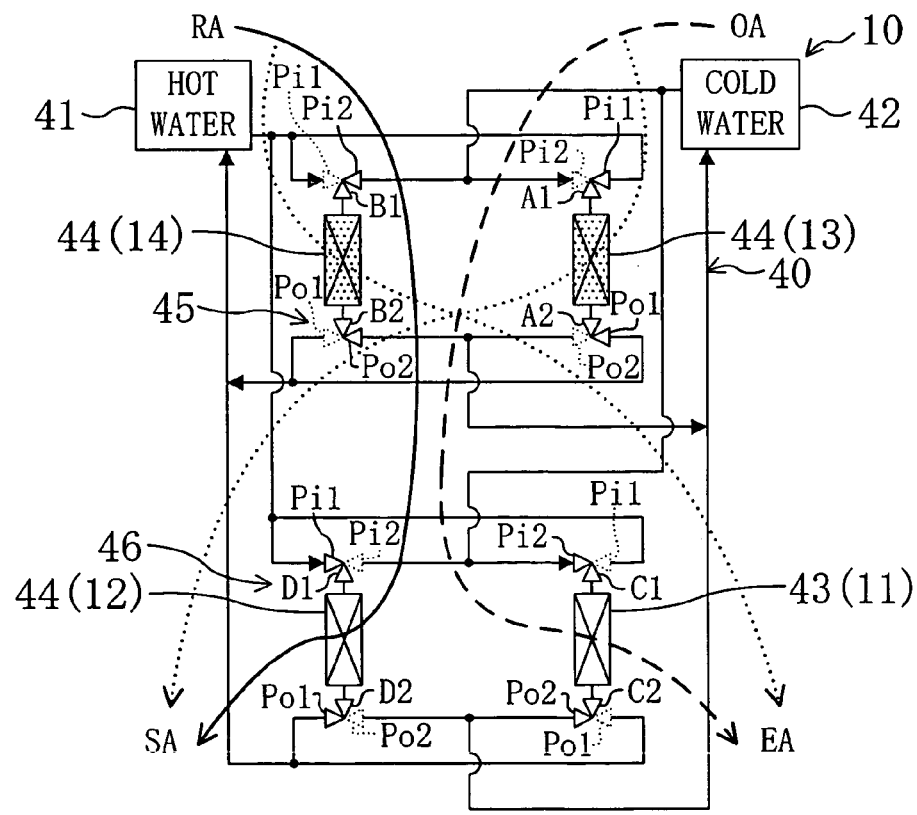

FIG. 25
(A)
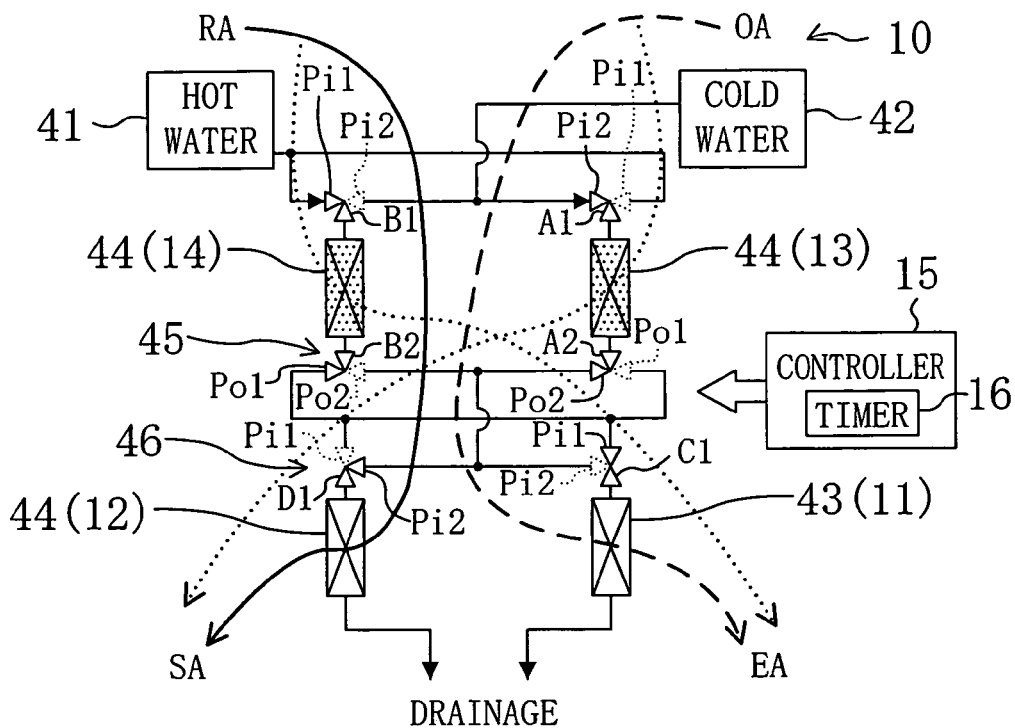
(B)
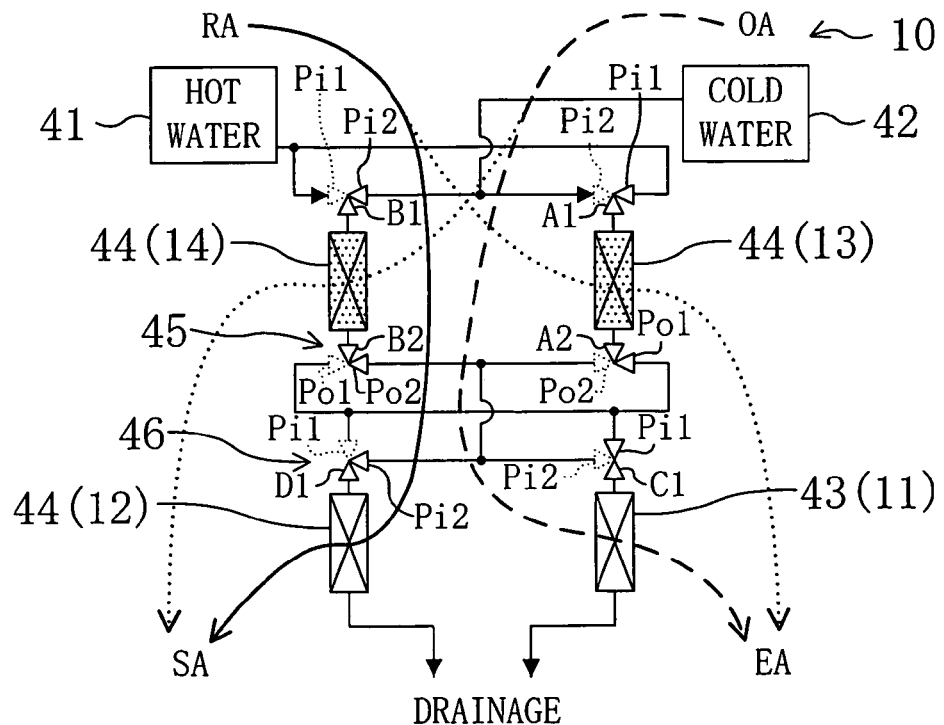

FIG. 26
(A)
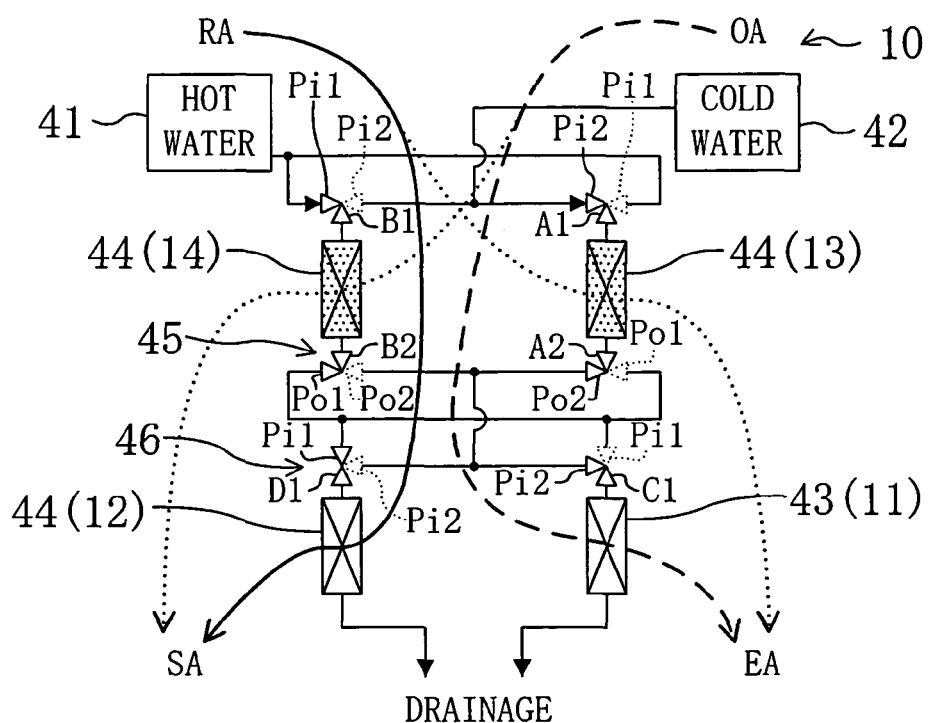
(B)
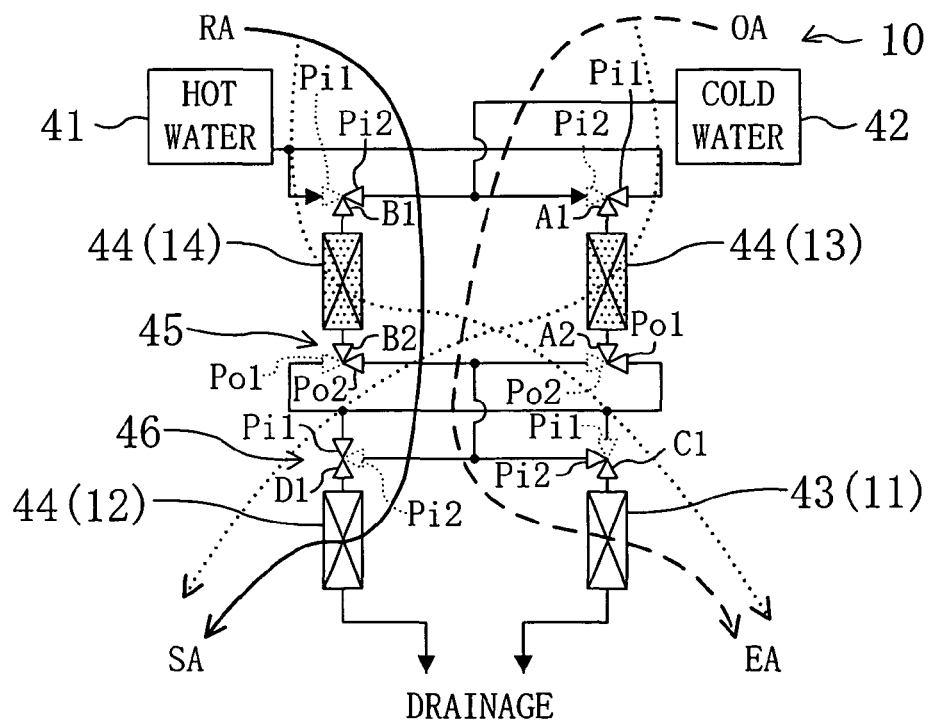

FIG. 27
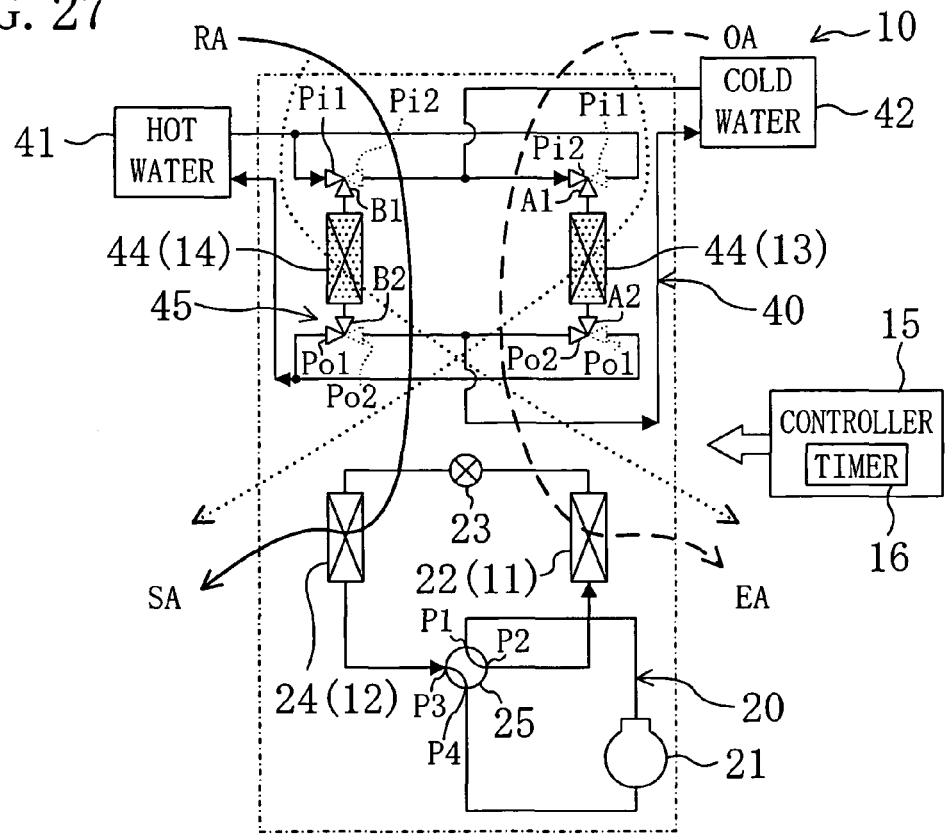
(A)
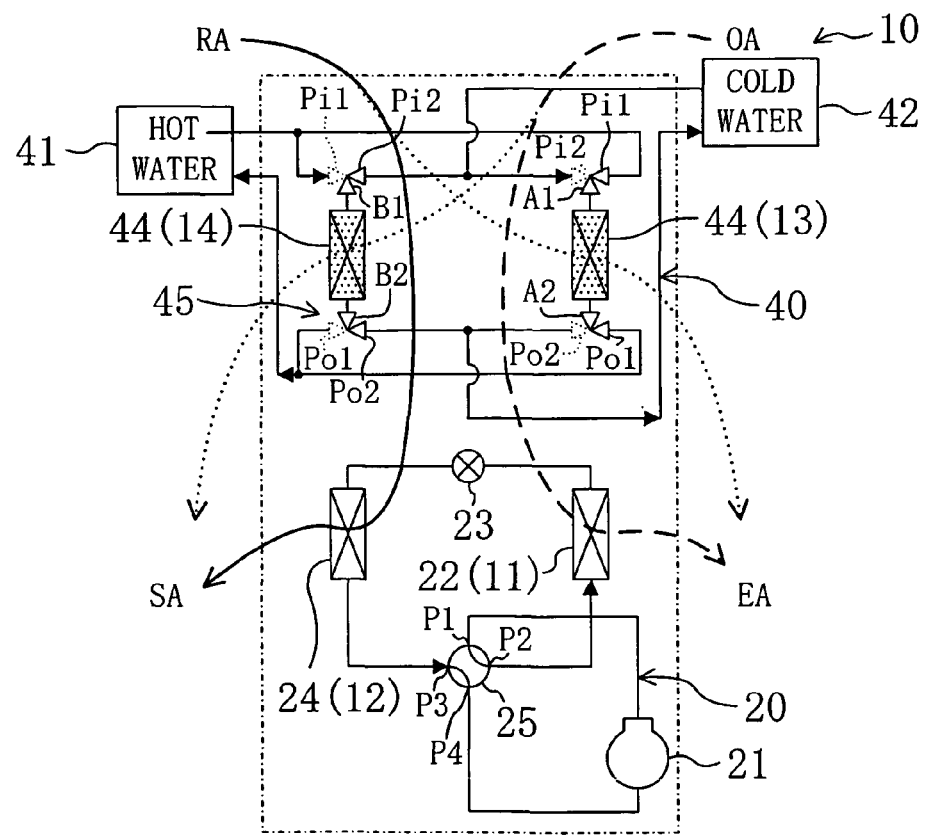
(B)

FIG. 28
(A)
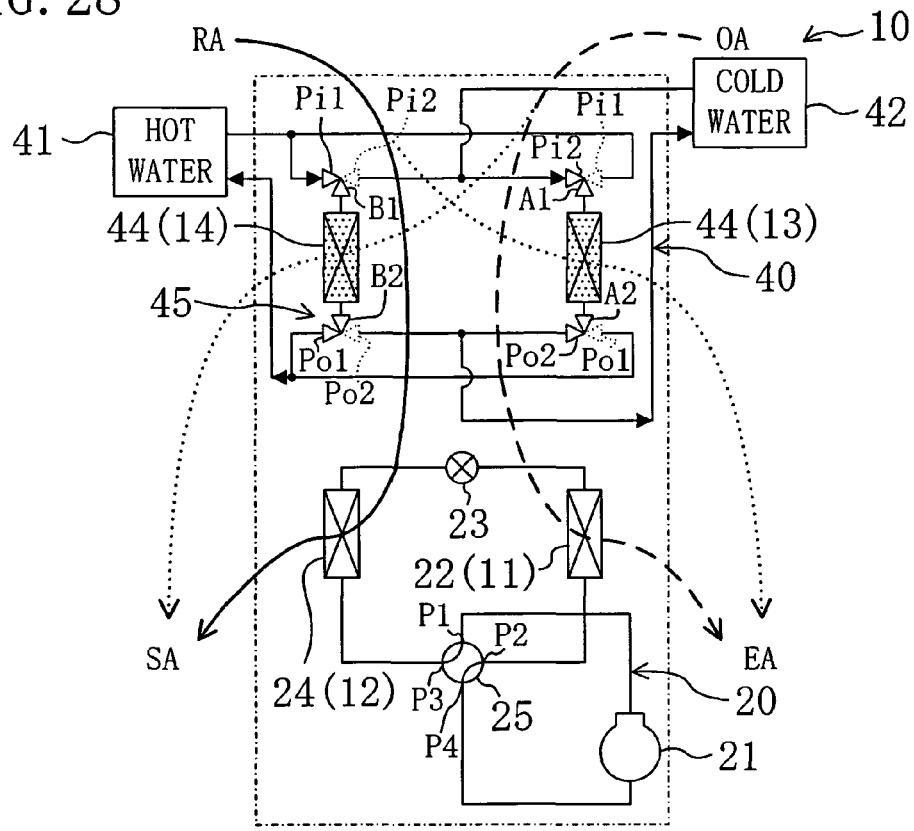
(B)
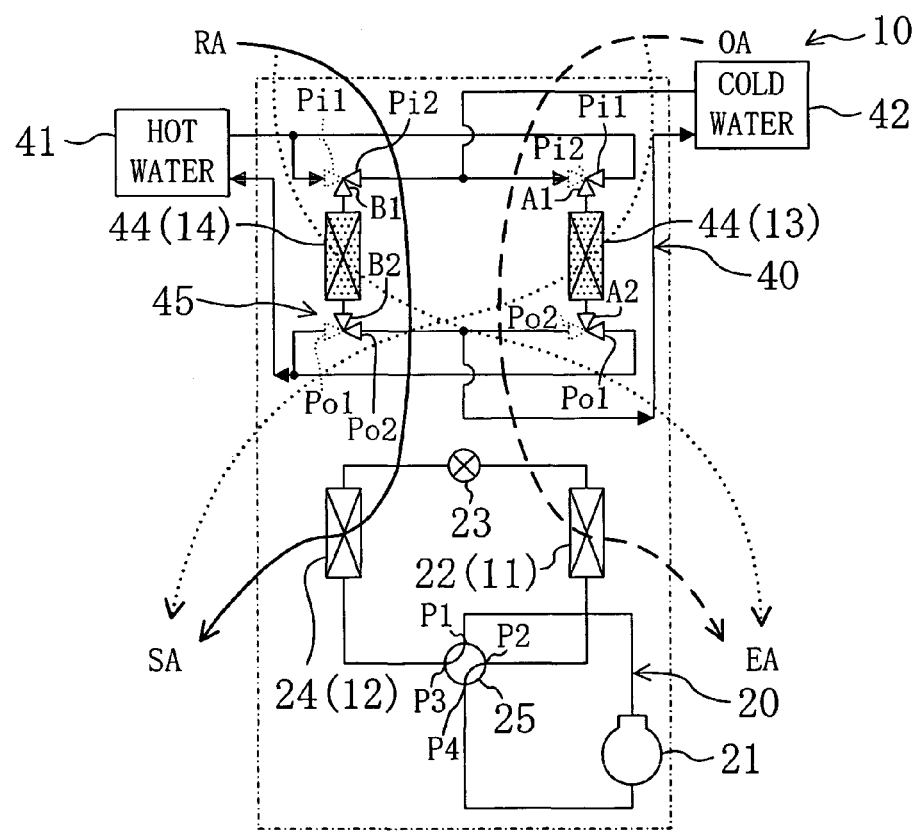

FIG. 29
(A)
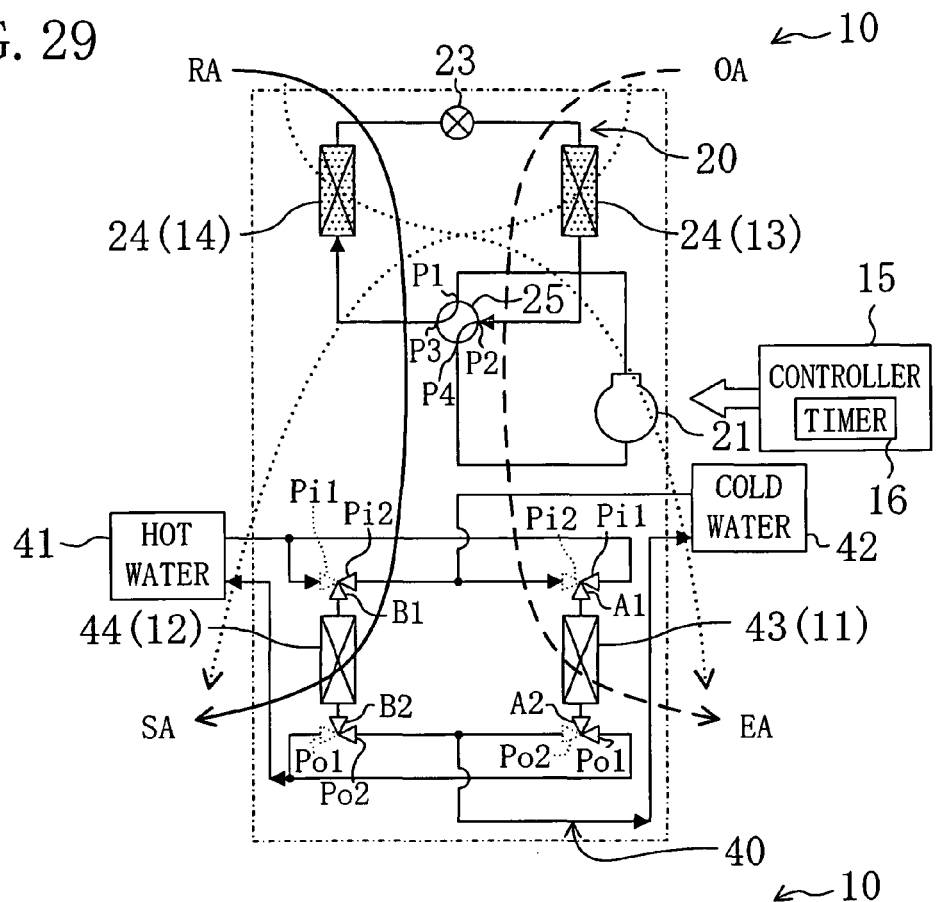
(B)
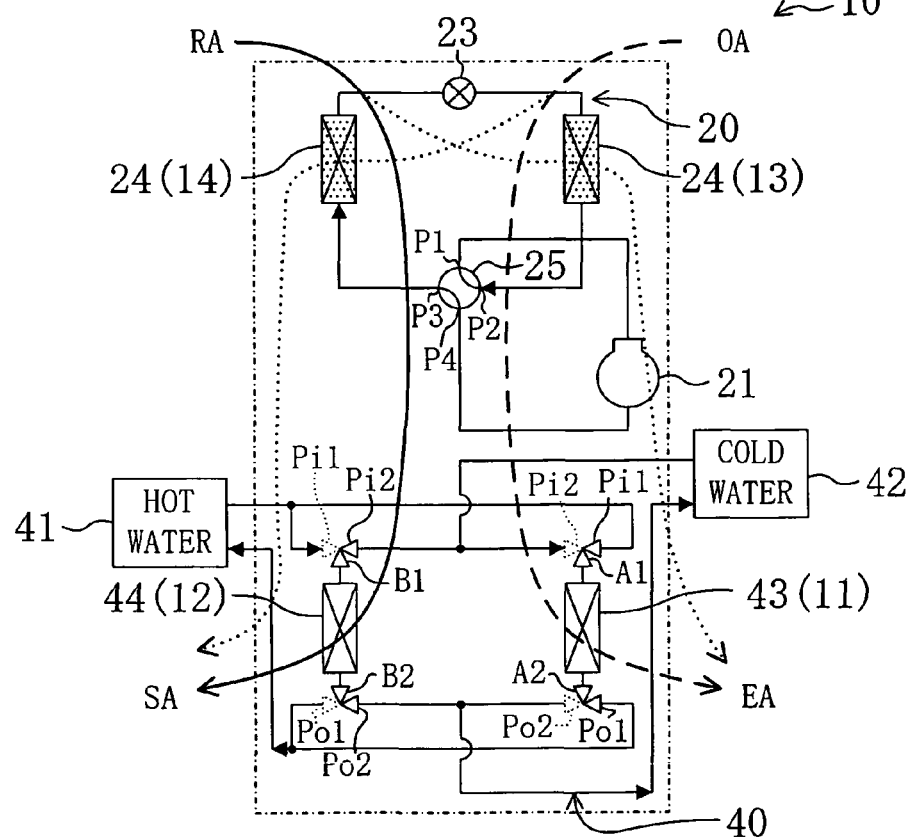

FIG. 30
(A)
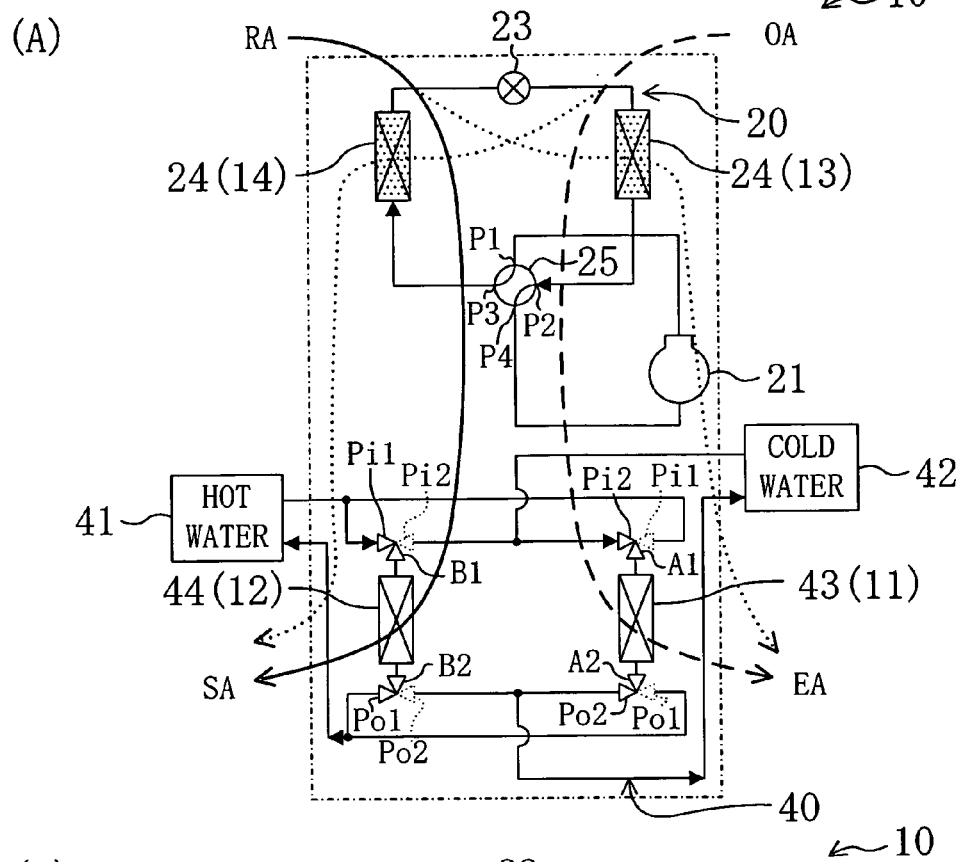
(B)
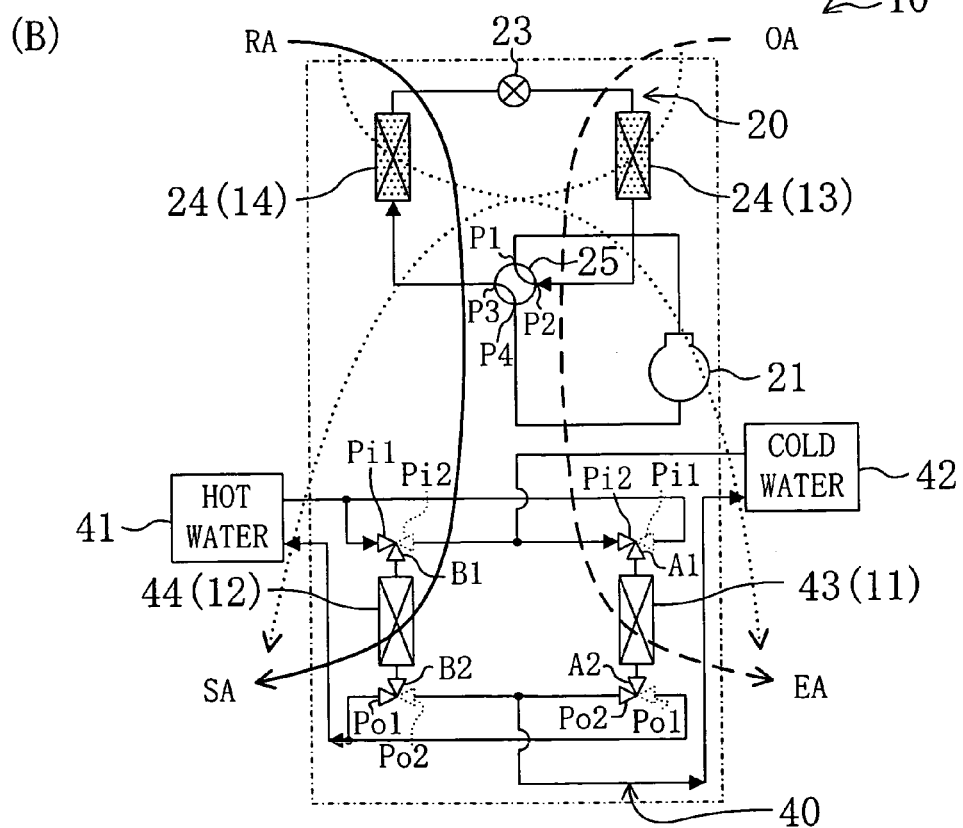

FIG. 31
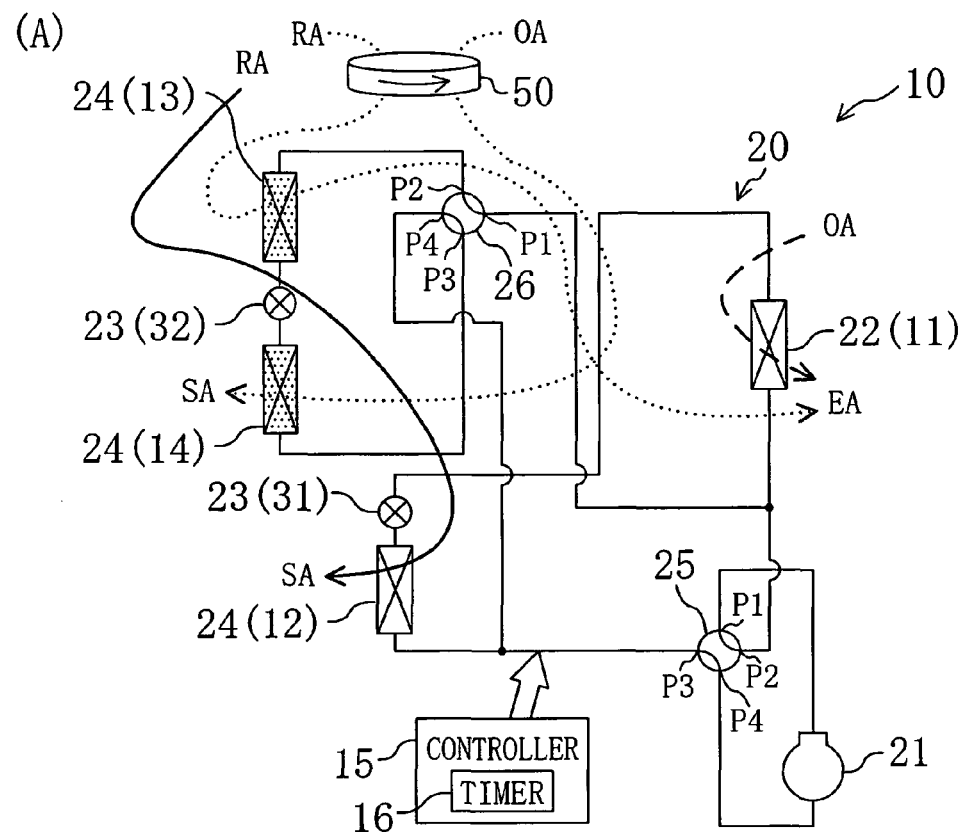
(A)
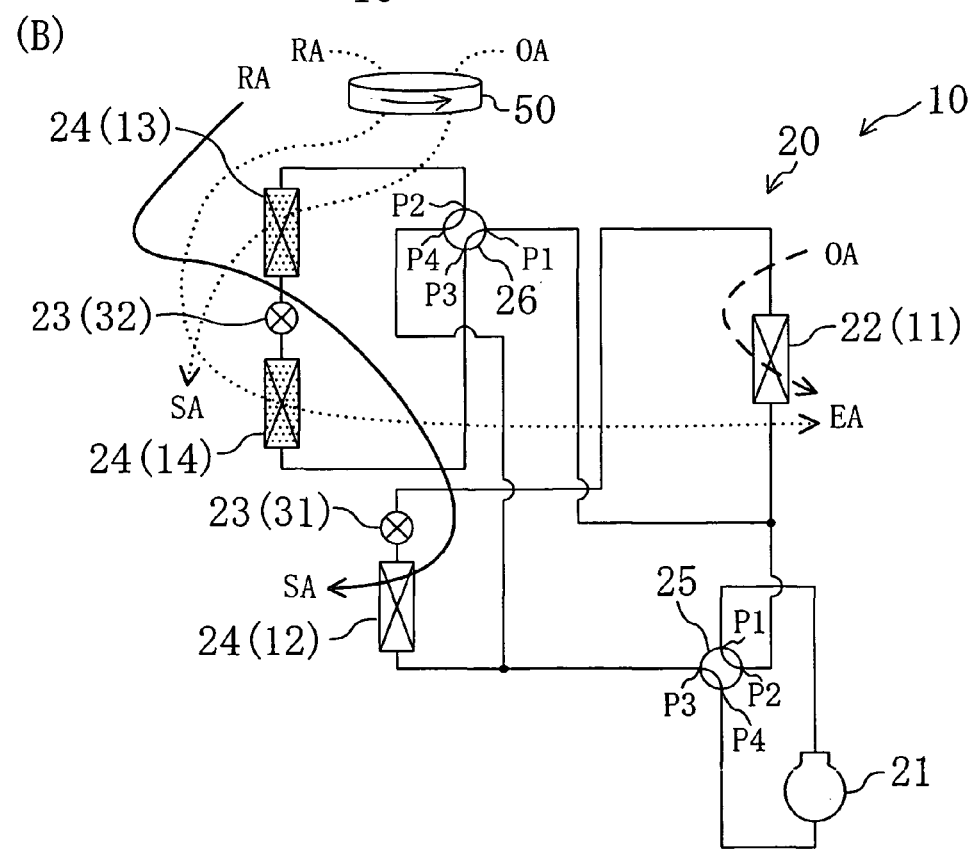
(B)

FIG. 32
(A)
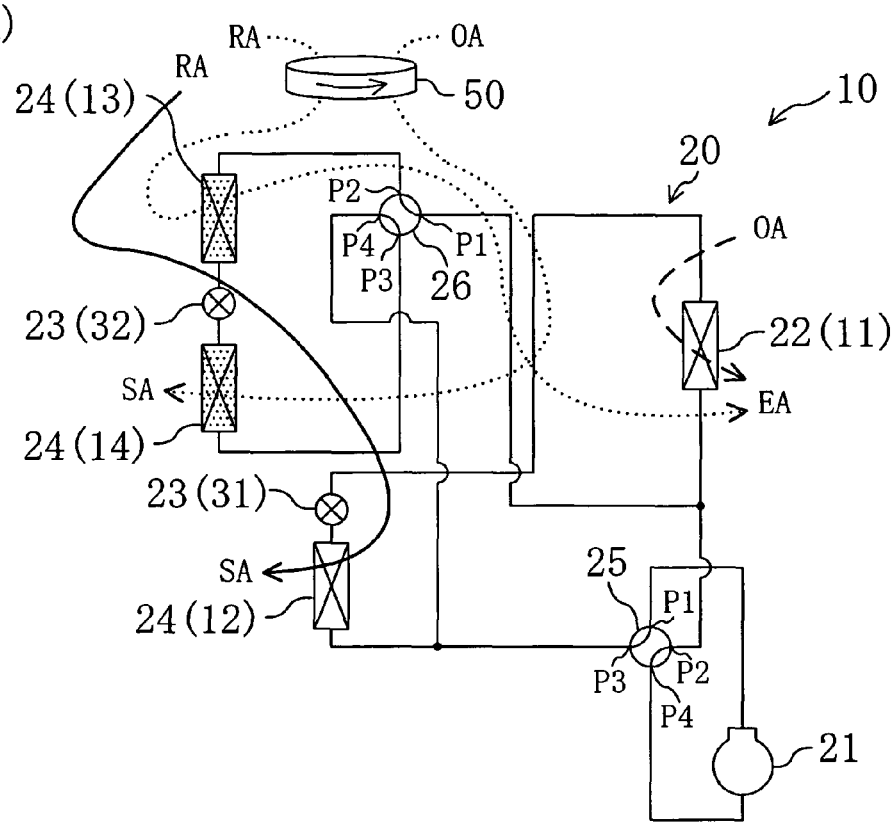
(B)
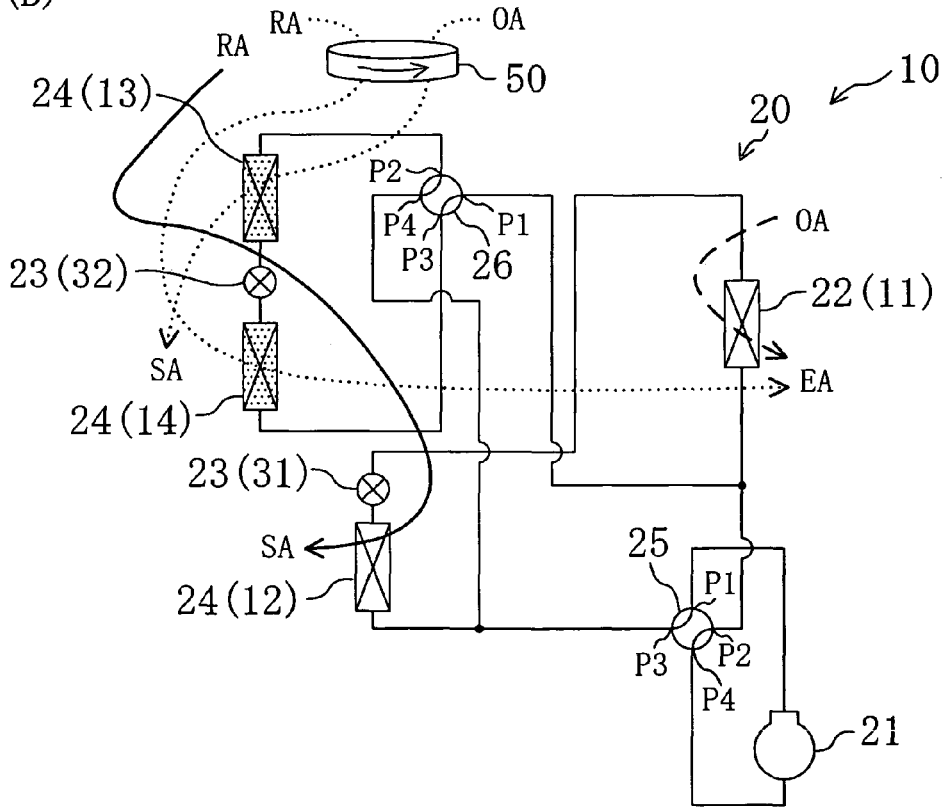

FIG. 36
(A)
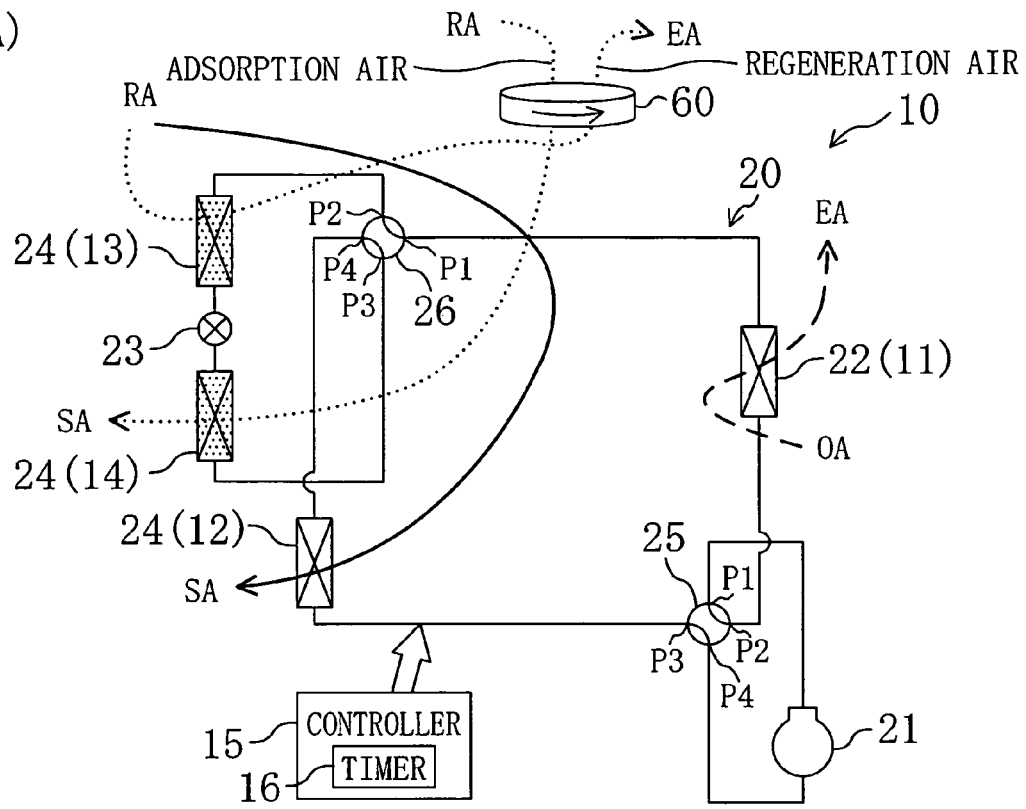
(B)
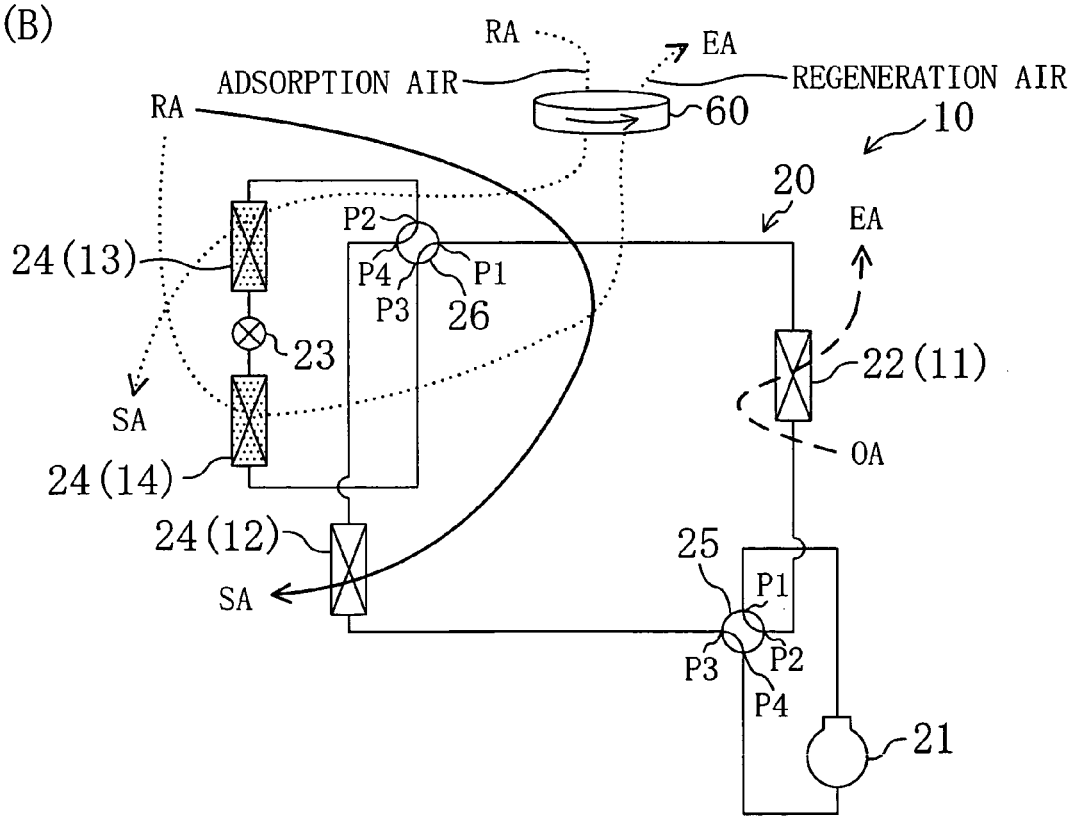

FIG. 37
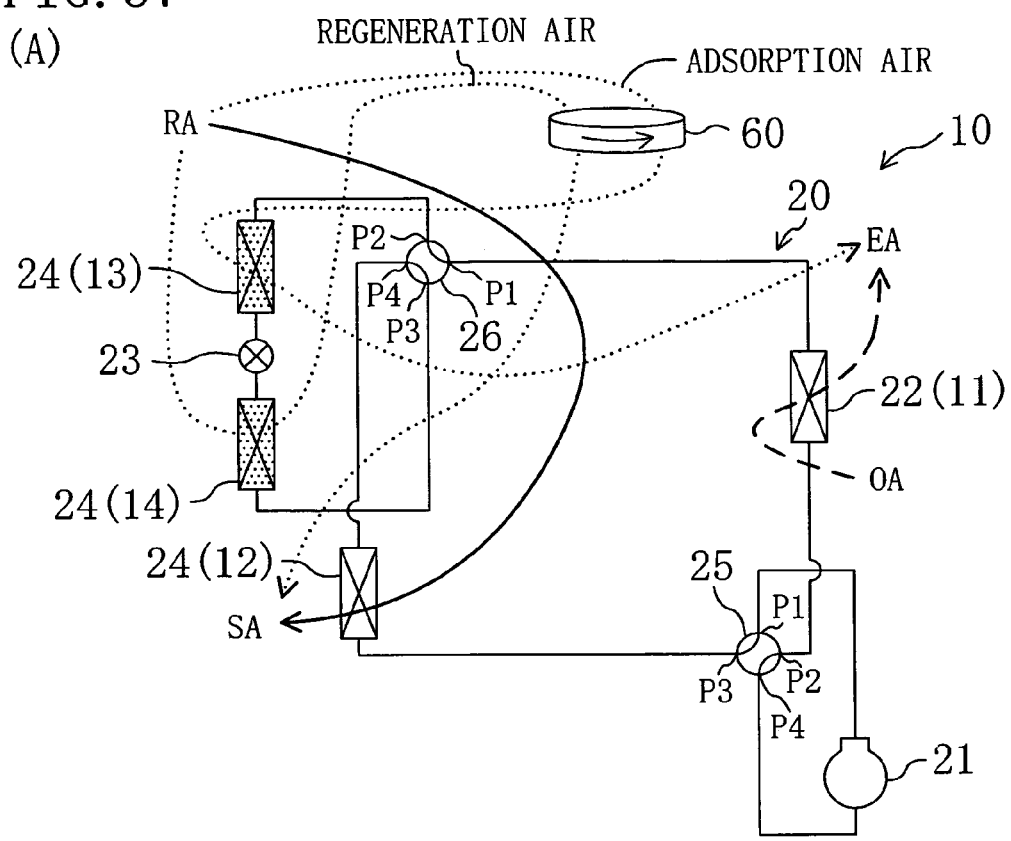
(A)
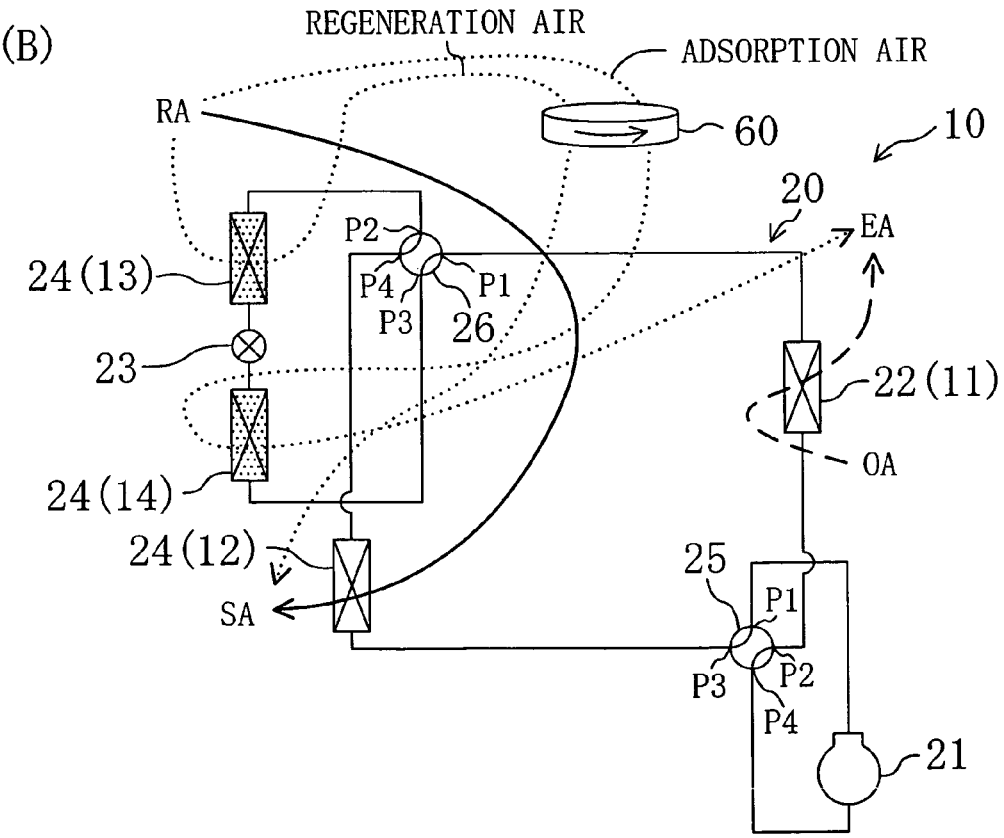
(B)

AIR CONDITIONING APPARATUS

TECHNICAL FIELD

This invention relates to air conditioning apparatus, and in particular, to air conditioning apparatus which are adapted to separately perform room-air sensible heat processing and room-air latent heat processing.

BACKGROUND ART

Air conditioning apparatus (air conditioning systems) of the type capable of separately performing room-air sensible heat processing and room-air latent heat processing have been known in the conventional art. As such an air conditioning apparatus, there is an air conditioning apparatus which mainly performs air sensible heat processing by a vapor compression refrigeration cycle and which performs air latent heat processing with an adsorbent capable of adsorption/desorption of moisture in the air (see for example JP, H09-318126, A). This air conditioning system includes an air conditioner which performs sensible heat processing by circulating air in an indoor space, and a desiccant type outdoor air makeup unit which performs latent heat processing by controlling the humidity of outside air and then supplying the humidity-controlled outside air to the indoor space.

PROBLEMS THAT THE INVENTION INTENDS TO SOLVE

In this conventional system, the air conditioner and the desiccant type outdoor air makeup unit are installed independently. This requires a large installation space and the cost is likely to increase as well. On the contrary, even if the air conditioner and the desiccant type outdoor air makeup unit are housed integrally within a single casing so that they may be installed in one location, this also produces problems. That is, the apparatus grows in size. Additionally, the configuration tends to become complicated.

In addition, the desiccant type outdoor air makeup unit requires provision of a heating means for adsorbent regeneration, and the system of the aforesaid gazette employs a heat pump unit as a heating means. And in a conventional configuration, it is required that the vapor compression refrigeration cycle of the air conditioner and the heat pump unit of the desiccant type outdoor air makeup unit be activated independently. There is a possibility of the COP (coefficient of performance) drop.

With these problems in mind, the present invention was devised. Accordingly an object of the present invention is to prevent air conditioning apparatus which are adapted to separately perform air sensible heat processing and air latent heat processing from growing in size, and to make it possible to perform operations at high COP.

DISCLOSURE OF THE INVENTION

The present invention provides an air conditioning apparatus which includes a plurality of heat exchangers (11, 12, 13, 14) for effecting heat exchange between a heating medium (refrigerant, cold water, hot water et cetera) and air. In the air conditioning apparatus of the present invention, at least one heat exchanger (13, 14) is made up of an adsorption heat exchanger (13, 14) with an adsorbent supported on its surface.

More specifically, a first invention is directed to an air conditioning apparatus which is provided with a heating medium circuit (20, 40) for the flow of heating medium and which includes in the heating medium circuit (20, 40) a plurality of heat exchangers (11, 12, 13, 14) for effecting heat exchange between a heating medium and an airstream. And in the air conditioning apparatus of the first invention, at least one heat exchanger (13, 14) is made up of an adsorption heat exchanger (13, 14) with an adsorbent supported on a surface thereof.

In the first invention, at least one adsorption heat exchanger (13, 14) of the heat exchangers (11, 12, 13, 14) performs room-air latent heat processing, while another heat exchanger (13, 14) performs sensible heat processing. When the adsorption heat exchanger (13, 14) serves as an evaporator of the refrigerant circuit (20) or as a cooler of the cold and hot water circuit (40), it is possible to dehumidify air by adsorbing moisture in the air while cooling the adsorbent. On the other hand, when the adsorption heat exchanger (13, 14) serves as a condenser of the refrigerant circuit (20) or as a heater of the cold and hot water circuit (40), it is possible to humidify air by releasing moisture to the air while heating the adsorbent. During the air humidification, the adsorbent is regenerated. In this invention, any dedicated device for adsorbent regeneration other than the heating medium circuit (20, 40) is no longer required, thereby making it possible to perform high-efficiency operations.

A second invention provides an air conditioning apparatus according to the air conditioning apparatus of the first invention which is characterized in that the heating medium circuit (20, 40) includes at least two air heat exchangers (11, 12) which mainly perform air sensible heat processing and a single adsorption heat exchanger (13) which mainly performs air latent heat processing.

In the second invention, the adsorption heat exchanger (13) performs room-air latent heat processing, while at least one air heat exchanger, i.e., the air heat exchanger (11), performs room-air sensible heat processing. In this case, in the adsorption heat exchanger (13), adsorption of moisture in room air by the adsorbent and adsorbent regeneration are performed alternately, while in the air heat exchangers (11, 12) room-air cooling or heating is continuously performed. In other words, in this invention, it becomes possible to intermittently provide dehumidification during the cooling operating mode or to intermittently provide humidification during the heating operating mode.

A third invention provides an air conditioning apparatus according to the air conditioning apparatus of the first invention which is characterized in that the heating medium circuit (20, 40) includes a single air heat exchanger (11) which mainly performs air sensible heat processing and at least two adsorption heat exchangers (13, 14) which mainly perform air latent heat processing.

In the third invention, one of the two adsorption heat exchangers (13, 14) is made to serve as an evaporator (or a cooler) while the other adsorption heat exchanger is made to serve as a condenser (or a heater), wherein the adsorption heat exchanger (13, 14) that serves as an evaporator (or a cooler) and the adsorption heat exchanger (13, 14) that serves as a condenser (or a heater) are switched alternately, thereby making it possible to continuously provide room-air dehumidification or humidification. In this case, the adsorption heat exchangers (13, 14) mainly perform room-air latent heat processing, while they perform sensible heat processing as well. Especially during the moisture adsorption, the amount of air sensible heat processing, i.e. the amount of cooling, increases as the amount of adsorption approaches to saturation, while during the regeneration the amount of air sensible heat processing, i.e. the amount of heating, increases as the amount of moisture decreases.

A fourth invention provides an air conditioning apparatus according to the air conditioning apparatus of the first invention which is characterized in that the heating medium circuit (20, 40) includes at least two air heat exchangers (11, 12) which mainly perform air sensible heat processing and at least two adsorption heat exchangers (13, 14) which mainly perform air latent heat processing.

In the fourth invention, one of the two adsorption heat exchangers (13, 14) is made to serve as an evaporator (or a cooler) while the other adsorption heat exchanger is made to serve as a condenser (or a heater), wherein the adsorption heat exchanger (13, 14) that serves as an evaporator (or a cooler) and the adsorption heat exchanger (13, 14) that serves as a condenser (or a heater) are switched alternately, thereby making it possible to continuously provide room-air dehumidification or humidification. Besides, it is possible to provide continuous room-air cooling or heating by making use of at least one of the two air heat exchangers (11, 12). Consequently, in this invention, by making utilization of both the air heat exchanger (11, 12) which performs sensible heat processing and the adsorption heat exchanger (13, 14) which performs latent heat processing, it becomes possible to provide not only continuous dehumidification during the cooling operating mode but also continuous humidification during the heating operating mode.

A fifth invention provides an air conditioning apparatus according to the air conditioning apparatus of the first invention which is characterized in that the heating medium circuit (20) is made up of a refrigerant circuit (20) through which a refrigerant is circulated to thereby perform a vapor compression refrigeration cycle.

In the fifth invention, the adsorption heat exchanger (13, 14) is made to serve as an evaporator or condenser of the refrigerant circuit (20), thereby making it possible to effect moisture adsorption or adsorbent regeneration, while the air heat exchanger (11, 12) is made to serve as a condenser or evaporator of the refrigerant circuit (20), thereby making it possible to provide air heating or cooling. Also in this case, the adsorbent can be regenerated by making at least one of the heat exchangers (11, 12, 13, 14) of the refrigerant circuit (20) serve as an adsorption heat exchanger (13, 14). This eliminates the need for provision of a dedicated device for adsorbent regeneration, thereby making it possible to perform operations at improved efficiencies.

A sixth invention provides an air conditioning apparatus according to the air conditioning apparatus of the first invention which is characterized in that the heating medium circuit (40) is made up of a cold and hot water circuit (40) for the flow of cold and hot water.

In the sixth invention, the adsorption heat exchanger (13, 14) is made to serve as a heater or cooler of the cold and hot water circuit (40), thereby making it possible to effect moisture adsorption or adsorbent regeneration, while the air heat exchanger (11, 12) is made to serve as a heater or cooler of the cold and hot water circuit (40), thereby making it possible to provide air heating or air cooling. Also in this case, just by making at least one of the heat exchangers (11, 12, 13, 14) of the cold and hot water circuit (40) serve as an adsorption heat exchanger (13, 14), the need for provision of a dedicated device for adsorbent regeneration is eliminated, thereby making it possible to perform operations at improved efficiencies.

A seventh invention provides an air conditioning apparatus according to the air conditioning apparatus of the first invention which is characterized in that the heating medium circuit (20, 40) is made up of a refrigerant circuit (20) through which a refrigerant is circulated to thereby perform a vapor compression refrigeration cycle, and a cold and hot water circuit (40) for the flow of cold and hot water.

In the seventh invention, the adsorption heat exchanger (13, 14) is made to serve as a condenser or evaporator of the refrigerant circuit (20) or as a heater or cooler of the cold and hot water circuit (40), thereby making it possible to effect moisture adsorption or adsorbent regeneration, while the air heat exchanger (11, 12) is made to serve as a condenser or evaporator of the refrigerant circuit (20) or as a heater or cooler of the cold and hot water circuit (40), thereby making it possible to provide air heating or air cooling. Also in this case, just by making at least one of the heat exchangers (11, 12, 13, 14) of the refrigerant circuit (20) and cold and hot water circuit (40) serve as an adsorption heat exchanger (13, 14), the need for provision of a dedicated device for adsorbent regeneration is eliminated, thereby making it possible to perform operations at improved efficiencies.

An eighth invention provides an air conditioning apparatus according to the air conditioning apparatus of the first invention which is characterized in that the air conditioning apparatus is provided with a control unit (15) which switches the flow of heating medium in the heating medium circuit (20, 40) and the distribution of air to thereby perform (a) a moisture absorbing operation in which, while cooling an adsorbent in an adsorption heat exchanger (13, 14), moisture in an airstream flowing through the adsorption heat exchanger (13, 14) is adsorbed by the adsorbent, and (b) a moisture releasing operation in which, while heating an adsorbent in an adsorption heat exchanger (13, 14), moisture is released to an airstream flowing through the adsorption heat exchanger (13, 14).

In the eighth invention, during the moisture absorbing operation, an adsorbent is cooled in an adsorption heat exchanger (13, 14), while moisture in an airstream flowing through the adsorption heat exchanger (13, 14) is adsorbed by the adsorbent. In addition, during the moisture releasing operation, an adsorbent is heated in an adsorption heat exchanger (13, 14), while moisture is released to an airstream flowing through the adsorption heat exchanger (13, 14), thereby regenerating the adsorbent. And the moisture absorbing operation and the moisture releasing operation are switched alternately by the control unit (15).

A ninth invention provides an air conditioning apparatus according to the air conditioning apparatus of the eighth invention which is characterized in that the control unit (15) is provided with a switching interval setting part (16) for setting, depending on the latent heat load, a time interval at which switching between the moisture absorbing operation and the moisture releasing operation is accomplished.

A tenth invention provides an air conditioning apparatus according to the air conditioning apparatus of the ninth invention which is characterized in that the switching interval setting part (16) is configured such that as the latent heat load increases the time interval at which switching between the moisture absorbing operation and the moisture releasing operation is accomplished is set to a lower setting value.

The amount of moisture adsorbed by the adsorbent and the amount of moisture released by the adsorbent are large immediately after the start, but they gradually decrease with time. Therefore, in the ninth and tenth inventions, when the indoor latent heat load is large, the frequency of switching is increased to thereby increase the amount of dehumidification or the amount of humidification, while on the other hand when the indoor latent heat load is small the frequency of switching is decreased to thereby reduce the amount of dehumidification or the amount of humidification. In other words, it becomes possible to assuredly perform operations depending upon the latent heat load.

An eleventh invention provides an air conditioning apparatus according to the air conditioning apparatus of the first invention which is characterized in that the air conditioning apparatus includes a heat exchange element (50) for effecting heat exchange between a first airstream and a second airstream, and that at least one of the first and second airstreams is adsorption air or regeneration air prior to its passage through the adsorption heat exchanger (13, 14).

In the eleventh invention, while cooling the adsorbent, moisture in an airstream is adsorbed, thereby making it possible to provide air dehumidification. On the other hand, while heating the adsorbent, moisture is released to an airstream (adsorbent regeneration), thereby making it possible to provide air humidification. At this time, adsorption air or regeneration air that passes through the adsorption heat exchanger (13, 14) has already passed through the heat exchange element (50). Therefore, in this invention, after adsorption air is cooled in the heat exchange element (50) or after regeneration air is heated in the heat exchange element (50), it is possible to cause the adsorption or regeneration air to be passed through the adsorption heat exchanger (13, 14). This makes it possible to efficiently perform air dehumidification or air humidification in the adsorption heat exchanger (13, 14).

A twelfth invention provides an air conditioning apparatus which is characterized in that a latent heat processing element (60) for performing air latent heat processing is provided in a distribution passageway for the distribution of adsorption or regeneration air that passes through the adsorption heat exchanger (13, 14).

In the twelfth invention, while cooling the adsorbent, moisture in an air stream is adsorbed, and this airstream is supplied into an indoor space, thereby making it possible to provide room dehumidification. On the other hand, while heating the adsorbent, moisture is released to an airstream (adsorbent regeneration), and this airstream is supplied into the room, thereby making it possible to provide room humidification. At this time, adsorption air or regeneration air that passes through the adsorption heat exchanger (13, 14) also passes through the latent heat processing element (60). Therefore, in this invention, adsorption air dehumidification or regeneration air humidification in the latent heat processing element (60), and adsorption air dehumidification or regeneration air humidification in the adsorption heat exchanger (13, 14) can be carried out.

EFFECTS

In accordance with the first invention, it is arranged such that, of the plural heat exchangers (11, 12, 13, 14) of the heating medium circuit (20, 40), at least one heat exchanger (13, 14) is made up of an adsorption heat exchanger (13, 14). As a result of this arrangement, room-air latent heat processing is performed in the adsorption heat exchanger (13, 14) and sensible heat processing is performed in another heat exchanger (11, 12), thereby making it possible to freely control the amount of latent heat to be processed and the amount of sensible heat to be processed. In addition, room-air latent and sensible heat processing and adsorbent regeneration can be performed just by driving the heating medium circuit (20, 40), thereby eliminating the need for provision of a dedicated heating means for adsorbent regeneration, and it becomes possible to perform operations at high COP. Furthermore, the air conditioning apparatus can be made up of the heating medium circuit (20, 40) alone, thereby allowing the apparatus to have a compact configuration.

In accordance with the second invention, it becomes possible to intermittently provide dehumidification during the cooling operating mode or to intermittently provide humidification during the heating operating mode by the use of two air heat exchangers (11, 12) and a single adsorption heat exchanger (13). In addition, in this invention, the provision of these three heat exchangers (11, 12, 13) suffices, thereby making it possible to provide a simplified apparatus configuration.

In accordance with the third invention, it becomes possible to continuously provide cooling and dehumidification or to continuously provide heating and humidification by the use of a single air heat exchanger (11) and two adsorption heat exchangers (13, 14). In addition, also in this invention, the provision of these three heat exchangers (11, 13, 14) suffices, thereby making it possible to provide a simplified apparatus configuration.

In accordance with the fourth invention, it becomes possible to continuously provide cooling and dehumidification or to continuously provide heating and humidification by the use of two air heat exchangers (11, 12) and two adsorption heat exchangers (13, 14). In addition, both during the cooling and dehumidification operating mode and during the heating and humidification operating mode, by the use of both the air heat exchanger (11, 12) which performs sensible heat processing and the adsorption heat exchanger (13, 14) which performs latent heat processing, it becomes possible to freely control the amount of latent heat to be processed and the amount of sensible heat to be processed. This accomplishes improvement in room comfort.

In accordance with the fifth invention, the refrigerant circuit (20) which performs a vapor compression refrigeration cycle is used as a heating medium circuit (20, 40), thereby making it possible to separately perform indoor latent heat load processing and indoor sensible heat load processing, and it becomes possible to perform efficient operations. In addition, any heating means for adsorbent regeneration other than the refrigerant circuit (20) is no longer required, thereby making it also possible to prevent the apparatus configuration from becoming complicated.

In accordance with the sixth invention, the cold and hot water circuit (40) for the flow of cold and hot water is used as a heating medium circuit (20, 40), thereby making it possible to separately perform indoor latent heat load processing and indoor sensible heat load processing, and it becomes possible to perform efficient operations. In addition, any heating means for adsorbent regeneration other than the cold and hot water circuit (40) is no longer required, thereby also making it possible to prevent the apparatus configuration from becoming complicated.

In accordance with the seventh invention, the refrigerant circuit (20) and the cold and hot water circuit (40) are used as a heating medium circuit (20, 40), thereby making it possible to separately perform indoor latent heat load processing and indoor sensible heat load processing, and it becomes possible to perform efficient operations. In addition, any heating means for adsorbent regeneration other than the refrigerant circuit (20) and the cold and hot water circuit (40) is no longer required, thereby making it also possible to prevent the apparatus configuration from becoming complicated.

In accordance with the eighth invention, a moisture absorbing operation and a moisture releasing operation are carried out one after the other by the control unit (15). And room dehumidification is provided by supplying into the room an airstream moisture-adsorbed by the adsorbent during the moisture absorbing operation, while room humidification is provided by supplying into the room an airstream which was used to regenerate the adsorbent during the moisture releasing operation.

In accordance with the ninth invention, the switching interval setting part (16), for setting, depending on the latent heat load, a time interval at which switching between the moisture absorbing operation and the moisture releasing operation is accomplished, is provided. Especially in accordance with the tenth invention, it is arranged such that as the latent heat load increases the setting value of the time interval at which switching between the moisture absorbing operation and the moisture releasing operation is accomplished is decreased. As a result of this arrangement, when the indoor latent heat load is large, the frequency of switching is increased to thereby increase the amount of dehumidification or the amount of humidification. On the other hand, when the indoor latent heat load is small, the frequency of switching is decreased to thereby reduce the amount of dehumidification or the amount of humidification. Accordingly, it becomes possible to achieve comfortable operating control depending upon the indoor latent heat load.

In accordance with the eleventh invention, it is arranged such that the heat exchange element (50) for effecting heat exchange between a first airstream and a second airstream is provided to thereby allow adsorption air or regeneration air to pass through the heat exchange element (50), thereby making it possible to either cool adsorption air or heat regeneration air in the heat exchange element (50). Therefore it becomes possible to efficiently perform air dehumidification or humidification in the adsorption heat exchanger (13, 14), thereby making it possible to prevent a drop in dehumidification or humidification capability.

In accordance with the twelfth invention, it is arranged such that the latent heat processing element (60) for performing air latent heat processing is provided in a distribution passageway for the distribution of adsorption air or regeneration air which passes through the adsorption heat exchanger (13, 14). As a result of this arrangement, adsorption air or regeneration air which passes through the adsorption heat exchanger (13, 14) is made to pass also through the latent heat processing element (60). Therefore it becomes possible to process adsorption air or regeneration air in the latent heat processing element (60) and in the adsorption heat exchanger (13, 14), thereby making it possible to accomplish improvement in air dehumidification or humidification capability.

BRIEF DESCRIPTION OF THE DRAWING

FIG. 1 is a circuitry diagram which illustrates a first operation (A) and a second operation (B) in a cooling and dehumidification operating mode of an air conditioning apparatus according to a first embodiment of the present invention;

FIG. 2 is a circuitry diagram which illustrates a first operation (A) and a second operation (B) in a heating and humidification operating mode of the air conditioning apparatus of the first embodiment;

FIG. 3 is a circuitry diagram which illustrates a first operation (A) and a second operation (B) in a cooling and dehumidification operating mode of an air conditioning apparatus according to a second embodiment of the present invention;

FIG. 4 is a circuitry diagram which illustrates a first operation (A) and a second operation (B) in a heating and humidification operating mode of the air conditioning apparatus of the second embodiment;

FIG. 5 is a circuitry diagram which illustrates a first operation (A) and a second operation (B) in a cooling and dehumidification operating mode of an air conditioning apparatus according to a third embodiment of the present invention;

FIG. 6 is a circuitry diagram which illustrates a first operation (A) and a second operation (B) in a heating and humidification operating mode of the air conditioning apparatus of the third embodiment;

FIG. 10 is a circuitry diagram which illustrates a first operation (A) and a second operation (B) in a cooling and dehumidification operating mode of an air conditioning apparatus according to a fourth embodiment of the present invention;

FIG. 11 is a circuitry diagram which illustrates a first operation (A) and a second operation (B) in a heating and humidification operating mode of the air conditioning apparatus of the fourth embodiment;

FIG. 12 is a circuitry diagram which illustrates a first operation (A) and a second operation (B) in a cooling and dehumidification operating mode of an air conditioning apparatus according to a fifth embodiment of the present invention;

FIG. 13 is a circuitry diagram which illustrates a first operation (A) and a second operation (B) in a heating and humidification operating mode of the air conditioning apparatus of the fifth embodiment;

FIG. 15 is a circuitry diagram which illustrates a first operation (A) and a second operation (B) in a cooling and dehumidification operating mode of an air conditioning apparatus according to a sixth embodiment of the present invention;

FIG. 16 is a circuitry diagram which illustrates a first operation (A) and a second operation (B) in a heating and humidification operating mode of the air conditioning apparatus of the sixth embodiment;

FIG. 21 is a circuitry diagram which illustrates a first operation (A) and a second operation (B) in a cooling and dehumidification operating mode of an air conditioning apparatus according to an eighth embodiment of the present invention;

FIG. 22 is a circuitry diagram which illustrates a first operation (A) and a second operation (B) in a heating and humidification operating mode of the air conditioning apparatus of the eighth embodiment;

FIG. 23 is a circuitry diagram which illustrates a first operation (A) and a second operation (B) in a cooling and dehumidification operating mode of an air conditioning apparatus according to a ninth embodiment of the present invention;

FIG. 24 is a circuitry diagram which illustrates a first operation (A) and a second operation (B) in a heating and humidification operating mode of the air conditioning apparatus of the ninth embodiment;

FIG. 25 is a circuitry diagram which illustrates a first operation (A) and a second operation (B) in a cooling and dehumidification operating mode of an air conditioning apparatus according to a tenth embodiment of the present invention;

FIG. 26 is a circuitry diagram which illustrates a first operation (A) and a second operation (B) in a heating and humidification operating mode of the air conditioning apparatus of the tenth embodiment;

FIG. 27 is a circuitry diagram which illustrates a first operation (A) and a second operation (B) in a cooling and dehumidification operating mode of an air conditioning apparatus according to an eleventh embodiment of the present invention;

FIG. 28 is a circuitry diagram which illustrates a first operation (A) and a second operation (B) in a heating and humidification operating mode of the air conditioning apparatus of the eleventh embodiment;

FIG. 29 is a circuitry diagram which illustrates a first operation (A) and a second operation (B) in a cooling and dehumidification operating mode of an air conditioning apparatus according to a twelfth embodiment of the present invention;

FIG. 30 is a circuitry diagram which illustrates a first operation (A) and a second operation (B) in a heating and humidification operating mode of the air conditioning apparatus of the twelfth embodiment;

FIG. 31 is a circuitry diagram which illustrates a first operation (A) and a second operation (B) in a cooling and dehumidification operating mode of an air conditioning apparatus according to a thirteenth embodiment of the present invention;

FIG. 32 is a circuitry diagram which illustrates a first operation (A) and a second operation (B) in a heating and humidification operating mode of the air conditioning apparatus of the thirteenth embodiment;

FIG. 36 is a circuitry diagram which illustrates a first operation (A) and a second operation (B) in a cooling and dehumidification operating mode of an air conditioning apparatus according to a fourteenth embodiment of the present invention; and FIG. 37 is a circuitry diagram which illustrates a first operation (A) and a second operation (B) in a heating and humidification operating mode of the air conditioning apparatus of the fourteenth embodiment.

BEST MODE FOR CARRYING OUT THE INVENTION

Figure 7:
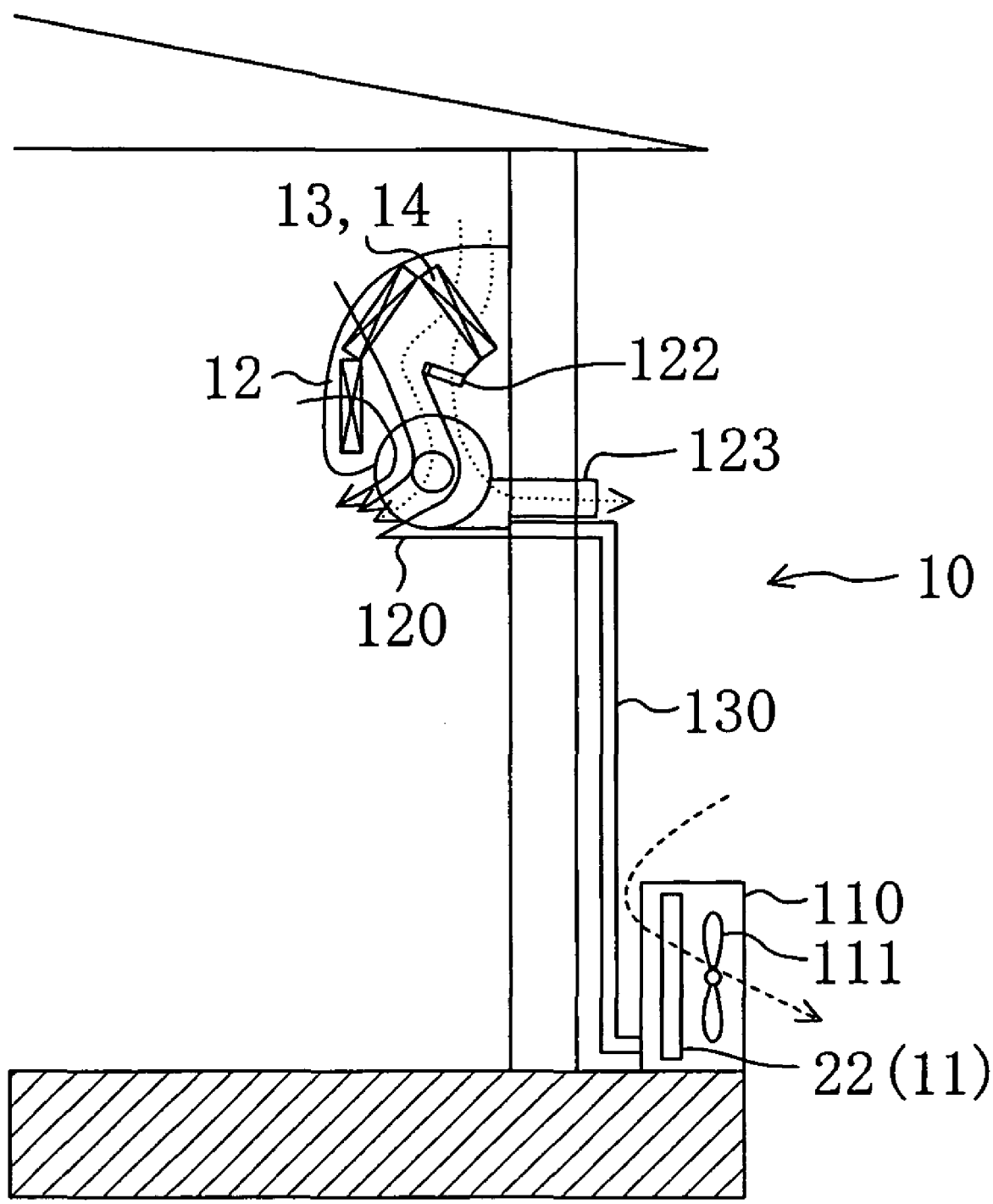
FIG. 7 is an illustration which depicts how the air conditioning apparatus of the third embodiment is installed.

Embodiments of the present invention will be described below in detail with reference to the accompanying drawings.

Further, of the following embodiments as will be described, first to fourth and fourteenth embodiments are examples obtained as a result of the application of the present invention to air conditioning apparatus of the air exhaust fan type in which the amount of air to be expelled from an indoor space to the outdoors exceeds the amount of air to be supplied to the indoor space; a fifth embodiment is an example obtained as a result of the application of the present invention to an air conditioning apparatus of the air supply fan type in which the amount of air to be supplied to an indoor space exceeds the amount of air to be expelled to the outdoors; and sixth to thirteenth embodiments are examples obtained as a result of the application of the present invention to air conditioning apparatus of the air ventilation fan type in which the amount of air to be expelled to the outdoors is in balance with the amount of air to be supplied to an indoor space.

First Embodiment of the Invention

Referring to FIGS. 1 and 2, an air conditioning apparatus (10) according to the first embodiment is provided with a refrigerant circuit (20) through which refrigerant is circulated to thereby perform a vapor compression refrigeration cycle. The air conditioning apparatus (10) has a plurality of heat exchangers (11, 12, 13) for effecting heat exchange between refrigerant and air. In addition, the refrigerant circuit (20) is provided with three heat exchangers as the heat exchangers (11, 12, 13), namely two air heat exchangers (11, 12) which mainly perform air sensible heat processing and a single adsorption heat exchanger (13) which mainly performs air latent heat processing. This adsorption heat exchanger (13) is a heat exchanger which supports on its surface an adsorbent with which to perform air latent heat processing.

Although not shown diagrammatically, the air heat exchangers (11, 12) and the adsorption heat exchanger (13) are fin and tube heat exchangers of the cross fin type and each heat exchanger is provide with a large number of rectangular plate-shaped fins and a heat transfer tube extending through the fins. And in the adsorption heat exchanger (13), an adsorbent is supported on the external surface of each fin and on the external surface of the heat transfer tube by dip molding (immersion molding). As an adsorbent, zeolite, silica gel, activated carbon, organic macromolecule polymer-family material having hydrophilic properties or water-absorbing properties, ion-exchange resin-family material having carboxylic acid groups or sulfonic acid groups, functional macromolecule material (e.g. temperature-sensitive macromolecule), and other material may be used.

In addition, the air heat exchangers (11, 12) and the adsorption heat exchanger (13) are not necessarily made up of fin and tube heat exchangers of the cross fin type. Alternatively, the heat exchangers (11, 12, 13) may be made up of the other type of heat exchanger. They may be made up of for example heat exchangers of the corrugate fin type. Additionally, the adsorbent is supported on the external surface of each fin and the external surface of the tube by means of dip molding, which is in no way to be considered restrictive. Any technique other than the dip molding may be employed as long as it does not cause damage to the performance of the adsorbent.

The refrigerant circuit (20) is configured in the form of a closed circuit along which a compressor (21), an outdoor heat exchanger (22), an expansion mechanism (23), and an indoor heat exchanger (24) are fluidly connected. The refrigerant circuit (20) is provided with a four way switching valve (25) as a switching mechanism for reversing the circulation direction of refrigerant flow. And the outdoor heat exchanger (22) is made up of the first air heat exchanger (11). The indoor heat exchanger (24) is made up of the adsorption heat exchanger (13) and the second air heat exchanger (12). Additionally, the expansion mechanism (23) is made up of an expansion valve (31) as a first expansion mechanism by which the refrigerant is reduced in pressure between the first air heat exchanger (11) and the adsorption heat exchanger (13), and a capillary tube (32a) and an electromagnetic valve (32b) which together form a second expansion mechanism (32) by which the refrigerant is reduced in pressure between the adsorption heat exchanger (13) and the second air heat exchanger (12). The capillary tube (32a) and the electromagnetic valve (32b) are connected in parallel with each other. In addition, the second expansion mechanism (32) may be an electric expansion valve.

In the refrigerant circuit (20), the discharge side of the compressor (21) is connected in fluid communication with a first port (P1) of the four way switching valve (25). A second port (P2) of the four way switching valve (25) is connected in fluid communication with the first air heat exchanger (11). The first expansion mechanism (31), the adsorption heat exchanger (13), the second expansion mechanism (32), and the second air heat exchanger (12) are connected, in that order, in series fluid communication with the first air heat exchanger (11). The second air heat exchanger (12) is connected in fluid communication with a third port (P3) of the four way switching valve (25). A fourth port (P4) of the four way switching valve (25) is connected in fluid communication with the suction side of the compressor (21).

The four way switching valve (25) is operative to switch between a first state which allows fluid communication between the first port (P1) and the second port (P2) and fluid communication between the third port (P3) and the fourth port (P4) (as indicated by solid line in FIGS. 1(A) and 1(B)), and a second state which allows fluid communication between the first port (P1) and the third port (P3) and fluid communication between the second port (P2) and the fourth port (P4) (as indicated by solid line in FIGS. 2(A) and 2(B)). Switching of the four way switching valve (25) between the first and second states makes it possible to reverse the direction of refrigerant flow in the refrigerant circuit (20).

Although its configuration is not described specifically, the air conditioning apparatus (10) is provided with a switching mechanism for establishing, during operation, switching between a state in which room air after passage through the adsorption heat exchanger (13) is supplied into an indoor space (see FIGS. 1(A) and 2(A)), and a state in which room air after passage through the adsorption heat exchanger (13) is expelled to the outdoors (see FIGS. 1(B) and 2(B)).

Furthermore, the air conditioning apparatus (10) is constructed and configured to be able to perform both a moisture absorbing operation (see FIGS. 1(A) and 2(B)) and a moisture releasing operation (see FIGS. 1(B) and 2(A)). More specifically, in the moisture absorbing operation, while cooling the adsorbent in the adsorption heat exchanger (13), moisture in an airstream flowing through the adsorption heat exchanger (13) is adsorbed by the adsorbent. On the other hand, in the moisture releasing operation, while heating the adsorbent in the adsorption heat exchanger (13), moisture is released to an airstream flowing through the adsorption heat exchanger (13) to thereby regenerate the adsorbent. To this end, the air conditioning apparatus (10) is provided with a controller (control unit) (15). This controller (15) controls the four way switching valve (25), the expansion mechanism (23), and the switching mechanism (not shown), thereby changing the flow of refrigerant in the refrigerant circuit (20) and the distribution of air between the moisture absorbing operation and the moisture releasing operation. The controller (15) includes a switching timer (switching interval setting part) (16) which sets, depending on the indoor latent heat load, a time interval at which switching between the moisture absorbing operation and the moisture releasing operation is made. This switching timer (16) is constructed and configured such that as the latent heat load increases, the time interval at which switching between the moisture absorbing operation and the moisture releasing operation is made is set to a lower value.

Running Operation

In the following, the running operation of the air conditioning apparatus (10) is descried.

Cooling/Dehumidification Operating Mode

During the cooling and dehumidification operating mode, the four way switching valve (25) changes state to the first state. And a first operation (moisture absorbing operation) of FIG. 1(A) and a second operation (moisture releasing operation) of FIG. 1(B) are carried out alternately. And in the first operation, the degree of opening of the expansion valve (31) is reduced to a predetermined value and the electromagnetic valve (32b) is placed in the open state. On the other hand, in the second operation, the expansion valve (31) is placed in the open state and the electromagnetic valve (32b) is placed in the closed state.

In this state, in the first operation, refrigerant discharged out of the compressor (21) condenses in the first air heat exchanger (11). Subsequently, the refrigerant expands in the expansion valve (31), evaporates in the adsorption heat exchanger (13) and in the second air heat exchanger (12), and is drawn back into the compressor (21). At this time, a stream of outside air (OA) after passage through the first air heat exchanger (11) is expelled to the outdoors as exhaust air (EA), while streams of room air (RA) after passage respectively through the adsorption heat exchanger (13) and through the second air heat exchanger (12) return into the room as supply air (SA).

At that time, air latent heat processing is performed mainly in the adsorption heat exchanger (13), while air sensible heat processing is performed mainly in the second air heat exchanger (12). More specifically, one part of room air (RA) passing through the indoor heat exchanger (24) flows through the adsorption heat exchanger (13), thereby being mainly dehumidified and then returning into the room, while the remaining other part flows through the second air heat exchanger (12), thereby being mainly cooled and then returning into the room. As a result of this arrangement, it becomes possible to efficiently provide room cooling and dehumidification.

On the other hand, in the second operation, refrigerant discharged out of the compressor (21) condenses in the first air heat exchanger (11) and in the adsorption heat exchanger (13), expands in the capillary tube (32a), evaporates in the second air heat exchanger (12), and is drawn back into the compressor (21). At this time, a stream of outside air (OA) after passage through the first air heat exchanger (11) is expelled to the outdoors as exhaust air (EA); a stream of room air (RA) after passage through the adsorption heat exchanger (13) is expelled to the outdoors as exhaust air (EA); and another stream of room air (RA) after passage through the second air heat exchanger (12) returns into the room as supply air (SA).

At that time, one part of the room air (RA) which passes through the indoor heat exchanger (24), when it is flowing through the adsorption heat exchanger (13), regenerates the adsorbent and is then expelled to outside the room, while the remaining other part passes through the second air heat exchanger (12), thereby being mainly cooled and then returning into the room. In other words, in the second operation, the state is that only indoor sensible heat load processing is mainly performed whereas latent heat load processing is hardly performed (to be exact, the second air heat exchanger (12) somewhat performs latent heat load processing). Consequently, room cooling is mainly provided.

By alternate repetition of the first operation and the second operation in the way described above, it becomes possible to intermittently perform indoor latent heat load processing while continuously performing indoor sensible heat load processing. At that time, the controller (15) operates such that as the indoor latent heat load increases the time interval at which switching between the first operation and the second operation is accomplished is made to decrease. Consequently, when the indoor latent heat load is large, the frequency of switching is increased to thereby increase the amount of dehumidification so that room comfort is enhanced. On the other hand, when the indoor latent heat load is small, the frequency of switching is decreased to thereby reduce the amount of dehumidification so that energy-savings are enhanced.

Heating/Humidification Operating Mode

During the heating and humidification operating mode, the four way switching valve (25) changes state to the second state. And a first operation (moisture releasing operation) of FIG. 2(A) and a second operation (moisture absorbing operation) of FIG. 2(B) are carried out alternately. And in the first operation, the degree of opening of the expansion valve (31) is reduced to a predetermined value and the electromagnetic valve (32b) is placed in the open state. On the other hand, in the second operation, the expansion valve (31) is placed in the open state and the electromagnetic valve (32b) is placed in the closed state.

In this state, in the first operation, refrigerant discharged out of the compressor (21) condenses in the second air heat exchanger (12) and in the adsorption heat exchanger (13). Subsequently, the refrigerant expands in the expansion valve (31), evaporates in the first air heat exchanger (11), and is drawn back into the compressor (21). At this time, a stream of outside air (OA) after passage through the first air heat exchanger (11) is expelled to the outdoors as exhaust air (EA), while streams of room air (RA) after passage respectively through the adsorption heat exchanger (13) and through the second air heat exchanger (12) return into the room as supply air (SA).

At that time, air latent heat processing is performed mainly in the adsorption heat exchanger (13), while air sensible heat processing is performed mainly in the second air heat exchanger (12). In other words, one part of the room air (RA) which passes through the indoor heat exchanger (24), when it is flowing through the adsorption heat exchanger (13), regenerates the adsorbent, thereby being mainly humidified and then returning into the room, while the remaining other part flows through the second air heat exchanger (12), thereby being mainly heated and then returning into the room. As a result of this arrangement, it becomes possible to efficiently provide room heating and humidification.

On the other hand, in the second operation, refrigerant discharged out of the compressor (21) condenses in the second air heat exchanger (12). Subsequently, the refrigerant expands in the capillary tube (32a), evaporates in the adsorption heat exchanger (13) and in the first air heat exchanger (11), and is drawn back into the compressor (21). At this time, a stream of outside air (OA) after passage through the first air heat exchanger (11) is expelled to the outdoors as exhaust air (EA); a stream of room air (RA) after passage through the adsorption heat exchanger (13) is expelled to the outdoors as exhaust air (EA); and another stream of room air (RA) after passage through the second air heat exchanger (12) returns into the room as supply air (SA).

At that time, one part of the room air (RA) which passes through the indoor heat exchanger (24), when it is passing through the adsorption heat exchanger (13), gives moisture to the adsorbent and is then expelled to outside the room, while the remaining other part passes through the second air heat exchanger (12), thereby being mainly heated and then returning into the room. In other words, in the second operation, the state is that only indoor sensible heat load processing is mainly performed, while no latent heat load processing is performed. Consequently, room heating is mainly provided.

As described above, by alternate repetition of the first operation and the second operation, it becomes possible to intermittently perform indoor latent heat load processing while continuously performing indoor sensible heat load processing. Also at this time, switching between the first and second operations is accomplished at time intervals depending on the indoor latent heat load.

Effects of the First Embodiment

In accordance with the first embodiment, the air conditioning apparatus (10) is made up of the refrigerant circuit (20) including the two air heat exchangers (11, 12) and the single adsorption heat exchanger (13). Since it suffices if the adsorption heat exchanger (13) and the second air heat exchanger (12) are provided within the indoor unit, this prevents an increase in apparatus size and cuts down costs, in comparison with the case where an air conditioner and a desiccant type outdoor air makeup unit are separately installed.

In addition, since it is arranged such that the adsorption heat exchanger (13) which supports on its surface an adsorbent is used to perform latent heat load processing, this makes it possible to utilize heat of condensation of the refrigerant during regeneration of the adsorbent. Accordingly, since there is no need for providing a dedicated means for adsorbent heating separately from the refrigerant circuit (20), this prevents an increase in apparatus size. Besides, complicated configurations are avoided.

Furthermore, any dedicated means for adsorbent heating is unnecessary, and high-COP operations can be carried out because it is possible to provide cooling/dehumidification or heating/humidification by driving only the refrigerant circuit (20).

Additionally, in the first embodiment, the frequency of switching between the first operation and the second operation is increased if the indoor latent heat load is large, while on the other hand the frequency of switching between the first operation and the second operation is decreased if the indoor latent heat load is small. Hereby, it becomes possible to perform operations with a balance between room comfort and energy-savings.

Second Embodiment of the Invention

As shown in FIGS. 3 and 4, an air conditioning apparatus according to a second embodiment of the present invention is an example obtained by modification of the configuration of the refrigerant circuit (20) of the first embodiment. The refrigerant circuit (20) of the second embodiment includes, as a plurality of heat exchangers (11, 13, 14) for effecting refrigerant/air heat exchange, a single air heat exchanger (11) and two adsorption heat exchangers (13, 14). In the second embodiment, the adsorption heat exchangers (13, 14) mainly perform air latent heat processing, but they also perform sensible heat processing.

Like the refrigerant circuit (20) of the first embodiment, the refrigerant circuit (20) of the present embodiment is configured into a closed circuit along which a compressor (21), an outdoor heat exchanger (22), an expansion mechanism (23), and an indoor heat exchanger (24) are fluidly connected. The refrigerant circuit (20) is provided with a four way switching valve (25, 26) as a switching mechanism for reversing the circulation direction of refrigerant flow. The outdoor heat exchanger (22) is made up of the air heat exchanger (11). The indoor heat exchanger (24) is made up of the first adsorption heat exchanger (13) and the second adsorption heat exchanger (14) which are connected in series fluid communication with each other by way of the expansion mechanism (23).

The expansion mechanism (23) is made up of an expansion valve. In addition, the switching mechanism (25, 26) is made up of a first four way switching valve (first switching mechanism) (25) for reversing the general circulation direction of refrigerant flow in the refrigerant circuit (20) and a second four way switching valve (second switching mechanism) (26) for reversing the direction of refrigerant flow between the first adsorption heat exchanger (13) and the second adsorption heat exchanger (14).

In the refrigerant circuit (20), the discharge side of the compressor (21) is connected in fluid communication with a first port (P1) of the first four way switching valve (25). A second port (P2) of the first four way switching valve (25) is connected in fluid communication with the air heat exchanger (11). The air heat exchanger (11) is connected in fluid communication with a first port (P1) of the second four way switching valve (26). A second port (P2) of the second four way switching valve (26) is connected in fluid communication with the first adsorption heat exchanger (13). The expansion valve (23) and the second adsorption heat exchanger (14) are sequentially connected in series fluid communication with the first adsorption heat exchanger (13). The second adsorption heat exchanger (14) is connected in fluid communication with a third port (P3) of the second four way switching valve (26). A fourth port (P4) of the second four way switching valve (26) is connected in fluid communication with a third port (P3) of the first four way switching valve (25). In addition, a fourth port (P4) of the first four way switching valve (25) is connected in fluid communication with the suction side of the compressor (21).

The first four way switching valve (25) is operative to switch between a first state which allows fluid communication between the first port (P1) and the second port (P2) and fluid communication between the third port (P3) and the fourth port (P4) (as indicated by solid line in FIGS. 3(A) and 3(B)), and a second state which allows fluid communication between the first port (P1) and the third port (P3) and fluid communication between the second port (P2) and the fourth port (P4) (as indicated by solid line in FIGS. 4(A) and 4(B)).

The second four way switching valve (26) is operative to switch between a first state which allows fluid communication between the first port (P1) and the second port (P2) and fluid communication between the third port (P3) and the fourth port (P4) (as indicated by solid line in FIGS. 3(A) and 4(A)), and a second state which allows fluid communication between the first port (P1) and the third port (P3) and fluid communication between the second port (P2) and the fourth port (P4) (as indicated by solid line in FIGS. 3(B) and 4(B)).

Running Operation

In the following, the running operation of the air conditioning apparatus (10) is described.

Cooling/Dehumidification Operating Mode

During the cooling and dehumidification operating mode, the first four way switching valve (25) changes state to the first state. And a first operation of FIG. 3(A) and a second operation of FIG. 3(B) are carried out alternately. In the first operation, the second four way switching valve (26) changes state to the first state. In the second operation, the second four way switching valve (26) changes state to the second state. In both the first operation and the second operation, the degree of opening of the expansion valve (23) is reduced to a predetermined value.

In this state, in the first operation, refrigerant discharged out of the compressor (21) condenses in the air heat exchanger (11) and in the first adsorption heat exchanger (13). Subsequently, the refrigerant expands in the expansion valve (23), evaporates in the second adsorption heat exchanger (14), and is drawn back into the compressor (21). At this time, a stream of outside air (OA) after passage through the air heat exchanger (11) is expelled to the outdoors as exhaust air (EA); a stream of room air (RA) after passage through the first adsorption heat exchanger (13) is expelled to the outdoors as exhaust air (EA); and a stream of room air (RA) after passage through the second adsorption heat exchanger (14) returns into the room as supply air (SA).

At that time, in the room, the second adsorption heat exchanger (14) performs air latent heat processing and air sensible heat processing. To sum up, a stream of room air (RA) which passes through the second adsorption heat exchanger (14) is mainly moisture-adsorbed by the adsorbent, is gradually cooled, and is then returned into the room. On the other hand, another stream of room air (RA) passing through the first adsorption heat exchanger (13) regenerates, during its passage therethrough, the adsorbent, and is expelled to the outdoors.

On the other hand, in the second operation, refrigerant discharged out of the compressor (21) condenses in the air heat exchanger (11) and in the second adsorption heat exchanger (14). Subsequently, the refrigerant expands in the expansion valve (23), evaporates in the first adsorption heat exchanger (13), and is drawn back into to the compressor (21). At this time, a stream of outside air (OA) after passage through the air heat exchanger (11) is expelled to the outdoors as exhaust air (EA); a stream of room air (RA) after passage through the first adsorption heat exchanger (13) returns into the room as supply air (SA); and another stream of room air (RA) after passage through the second adsorption heat exchanger (14) is expelled to the outdoors as exhaust air (EA).

At that time, in the room, the first adsorption heat exchanger (13) performs air latent heat processing and air sensible heat processing. To sum up, a stream of room air (RA) which passes through the first adsorption heat exchanger (13) is mainly moisture-adsorbed by the adsorbent, is gradually cooled, and is then returned into the room. On the other hand, another stream of room air (RA) passing through the second adsorption heat exchanger (14) regenerates, during its passage therethrough, the adsorbent, and is expelled to the outdoors.

By alternate repetition of the first operation and the second operation in the way described above, it becomes possible to continuously perform indoor latent heat load processing while continuously performing also indoor sensible heat load processing. At that time, the controller (15) operates such that as the indoor latent heat load increases the time interval at which switching between the first operation and the second operation is accomplished is made to decrease. Consequently, when the indoor latent heat load is large, the frequency of switching is increased to thereby increase the amount of dehumidification so that room comfort is enhanced. On the other hand, when the indoor latent heat load is small, the frequency of switching is decreased to thereby reduce the amount of dehumidification so that energy-savings are enhanced.

Heating/Humidification Operating Mode

During the heating and humidification operating mode, the first four way switching valve (25) changes state to the second state. And a first operation of FIG. 4(A) and a second operation of FIG. 4(B) are carried out alternately. In the first operation, the second four way switching valve (26) changes state to the first state. On the other hand, in the second operation, the second four way switching valve (26) changes state to the second state. In both the first operation and the second operation, the degree of opening of the expansion valve (23) is reduced to a predetermined value.

In this state, in the first operation, refrigerant discharged out of the compressor (21) condenses in the second adsorption heat exchanger (14). Subsequently, the refrigerant expands in the expansion valve (23), evaporates in the first adsorption heat exchanger (13) and in the air heat exchanger (11), and is drawn back into the compressor (21). At this time, a stream of outside air (OA) after passage through the air heat exchanger (11) is expelled to the outdoors as exhaust air (EA); a stream of room air (RA) after passage through the first adsorption heat exchanger (13) is expelled to the outdoors as exhaust air (EA); and another stream of room air (RA) after passage through the second adsorption heat exchanger (14) returns into the room as supply air (SA).

At that time, the second adsorption heat exchanger (14) performs air latent processing and air sensible heat processing. To sum up, a stream of room air (RA) which passes through the second adsorption heat exchanger (14) mainly regenerates the adsorbent, thereby being humidified. Subsequently, this room air stream is gradually heated and returns into the room. On the other hand, another stream of room air (RA) which passes through the first adsorption heat exchanger (13) gives, during its passage therethrough, moisture to the adsorbent and is then expelled to the outdoors.

On the other hand, in the second operation, refrigerant discharged out of the compressor (21) condenses in the first adsorption heat exchanger (13). Subsequently, the refrigerant expands in the expansion valve (23), evaporates in the second adsorption heat exchanger (14) and in the air heat exchanger (11), and is drawn back into the compressor (21). At this time, a stream of outside air (OA) after passage through the air heat exchanger (11) is expelled to the outdoors as exhaust air (EA); a stream of room air (RA) after passage through the first adsorption heat exchanger (13) returns into the room as supply air (SA); and another stream of room air (RA) after passage through the second air heat exchanger (12) is expelled to the outdoors as exhaust air (EA).

At that time, the first adsorption heat exchanger (13) performs air latent heat processing and air sensible heat processing. To sum up, a stream of room air (RA) which passes through the first adsorption heat exchanger (13) mainly regenerates the adsorbent, thereby being humidified. Subsequently, this room air stream is gradually heated and returns into the room. On the other hand, another stream of room air (RA) which passes through the second adsorption heat exchanger (14) gives, during its passage therethrough, moisture to the adsorbent and is then expelled to the outdoors.

By alternate repetition of the first operation and the second operation in the way described above, it becomes possible to continuously perform indoor latent heat load processing while continuously performing also indoor sensible heat load processing. Also in this case, switching between the first operation and the second operation can be made at time intervals depending on the indoor latent heat load.

Effects of the Second Embodiment

In accordance with the second embodiment, the same effects that the first embodiment provides are obtained. Besides, it becomes possible to continuously perform indoor latent heat load processing and indoor sensible heat load processing. This makes it possible to more stably provide room humidity control, when compared to the first embodiment.

Third Embodiment of the Invention

As shown in FIGS. 5 and 6, an air conditioning apparatus (10) according to a third embodiment of the present invention is an example obtained by modification of the configuration of the refrigerant circuit (20) of the first and second embodiments. The refrigerant circuit (20) of the present embodiment includes, as a plurality of heat exchangers (11, 12, 13, 14) for effecting refrigerant/air heat exchange, two air heat exchangers (11, 12) which mainly perform air sensible heat processing and two adsorption heat exchangers (13, 14) which mainly perform air latent heat processing.

Like the refrigerant circuit (20) of each of the foregoing embodiments, the refrigerant circuit (20) of the present embodiment is a closed circuit along which a compressor (21), an outdoor heat exchanger (22), an expansion mechanism (23), and an indoor heat exchanger (24) are fluidly connected. The refrigerant circuit (20) is provided with a four way switching valve (25, 26) as a switching mechanism for reversing the circulation direction of refrigerant flow. And the outdoor heat exchanger (22) is made up of the first air heat exchanger (11). The indoor heat exchanger (24) is made up of the first adsorption heat exchanger (13) and the second adsorption heat exchanger (14) which are connected in series fluid communication with each other by way of the expansion mechanism (23), and the second air heat exchanger (12).

The switching mechanism (25, 26) is made up of a first four way switching valve (first switching mechanism) (25) for reversing the general circulation direction of refrigerant flow in the refrigerant circuit (20) and a second four way switching valve (second switching mechanism) (26) for reversing the direction of refrigerant flow between the first adsorption heat exchanger (13) and the second adsorption heat exchanger (14).

In the refrigerant circuit (20), the discharge side of the compressor (21) is connected in fluid communication with a first port (P1) of the first four way switching valve (25). A second port (P2) of the first four way switching valve (25) is connected in fluid communication with the first air heat exchanger (11). And the first air heat exchanger (11) is connected in fluid communication with a first port (P1) of the second four way switching valve (26). A second port (P2) of the second four way switching valve (26) is connected in fluid communication with the first adsorption heat exchanger (13). And the expansion valve (23) and the second adsorption heat exchanger (14) are sequentially connected in series fluid communication with the first adsorption heat exchanger (13). The second adsorption heat exchanger (14) is connected in fluid communication with a third port (P3) of the second four way switching valve (26). And a fourth port (P4) of the second four way switching valve (26) is connected in fluid communication by way of the second air heat exchanger (12) with a third port (P3) of the first four way switching valve (25). In addition, a fourth port (P4) of the first four way switching valve (25) is connected in fluid communication with the suction side of the compressor (21).

The first four way switching valve (25) is operative to switch between a first state which allows fluid communication between the first port (P1) and the second port (P2) and fluid communication between the third port (P3) and the fourth port (P4) (as indicated by solid line in FIGS. 5(A) and 5(B)), and a second state which allows fluid communication between the first port (P1) and the third port (P3) and fluid communication between the second port (P2) and the fourth port (P4) (as indicated by solid line in FIGS. 6(A) and 6(B)).

The second four way switching valve (26) is operative to switch between a first state which allows fluid communication between the first port (P1) and the second port (P2) and fluid communication between the third port (P3) and the fourth port (P4) (as indicated by solid line in FIGS. 5(A) and 6(A)), and a second state which allows fluid communication between the first port (P1) and the third port (P3) and fluid communication between the second port (P2) and the fourth port (P4) (as indicated by solid line in FIGS. 5(B) and 6(B)).

Figure 8:
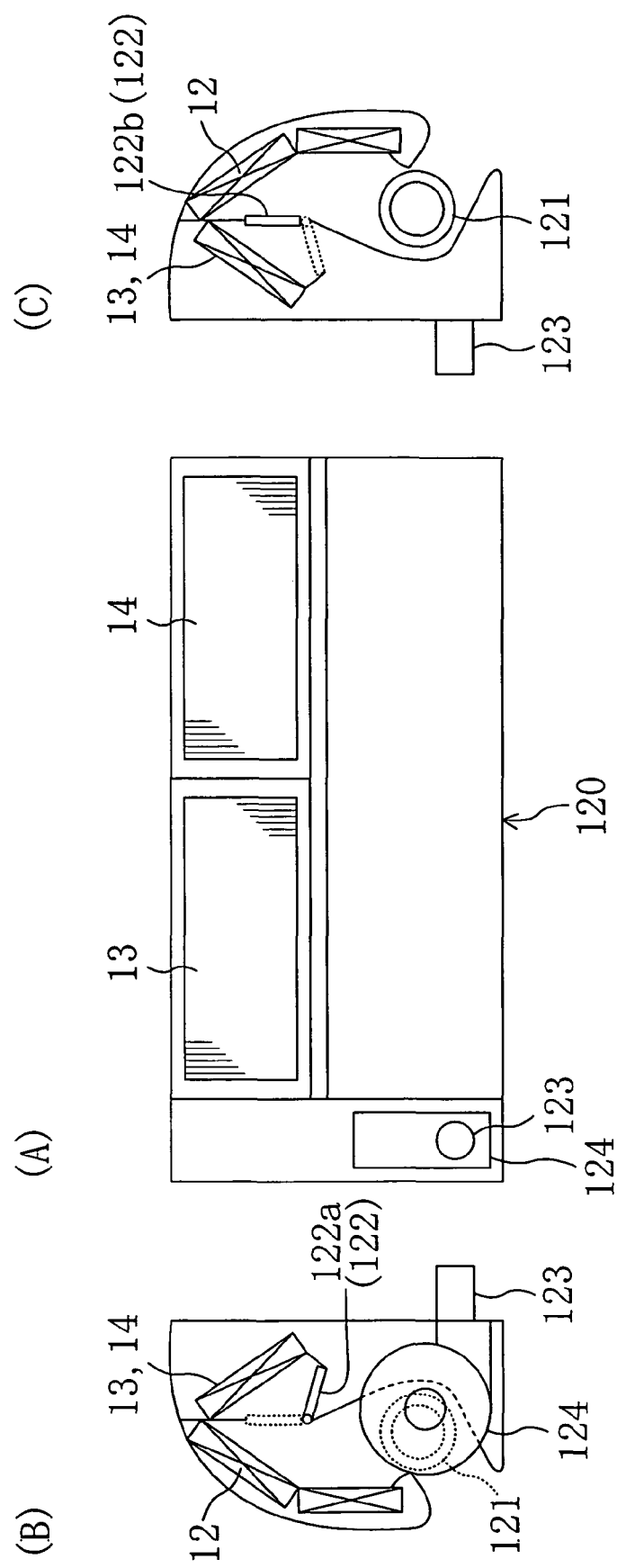
FIG. 8 is a diagram which shows an arrangement of an indoor unit of the air conditioning apparatus of the third embodiment.

With reference to FIG. 7 which is an installation diagram, the air conditioning apparatus (10) is made up of an outdoor unit (110) which is installed outdoors, an indoor unit (120) mounted on an indoor wall, and an interunit line (130) for establishing fluid communication between the outdoor unit (110) and the indoor unit (120). The outdoor unit (110) includes the first air heat exchanger (11) which is the outdoor heat exchanger (22) and an outdoor fan (111) for supplying air to the outdoor heat exchanger (22). Additionally, as illustrated in FIG. 8 which is an arrangement diagram, the indoor unit (120) includes: the first adsorption heat exchanger (13), the second adsorption heat exchanger (14), and the second air heat exchanger (12) which together form the indoor heat exchanger (24); an indoor fan (121) for supplying air to the indoor heat exchanger (24); and a damper (122) for air passage switching in the indoor unit (120). Within the indoor unit (120), the adsorption heat exchangers (13, 14) are disposed on the backside, while the second air heat exchanger (12) is disposed on the front side. In addition, in the example of FIG. 8, the second air heat exchanger (12) is made up of two heat exchangers.

The indoor unit (120) includes an air exhaust pipe (123) in fluid communication with the outdoors and an air exhaust fan (124) for discharging air to the outdoors from the air exhaust pipe (123). The damper (122) is composed of a first damper (122a) in association with the first adsorption heat exchanger (13) and a second damper (122b) in association with the second adsorption heat exchanger (14). The dampers (122a, 122b) are configured such that each damper is operative to switch between a first position which allows a stream of room air (RA) after passage through the adsorption heat exchanger (13, 14) to be supplied into the room by way of the indoor fan (121), and a second position which allows a stream of room air (RA) after passage through the adsorption heat exchanger (13, 14) to be discharged to the outdoors by way of the air exhaust fan (124) and the air exhaust pipe (123).

Figure 9:
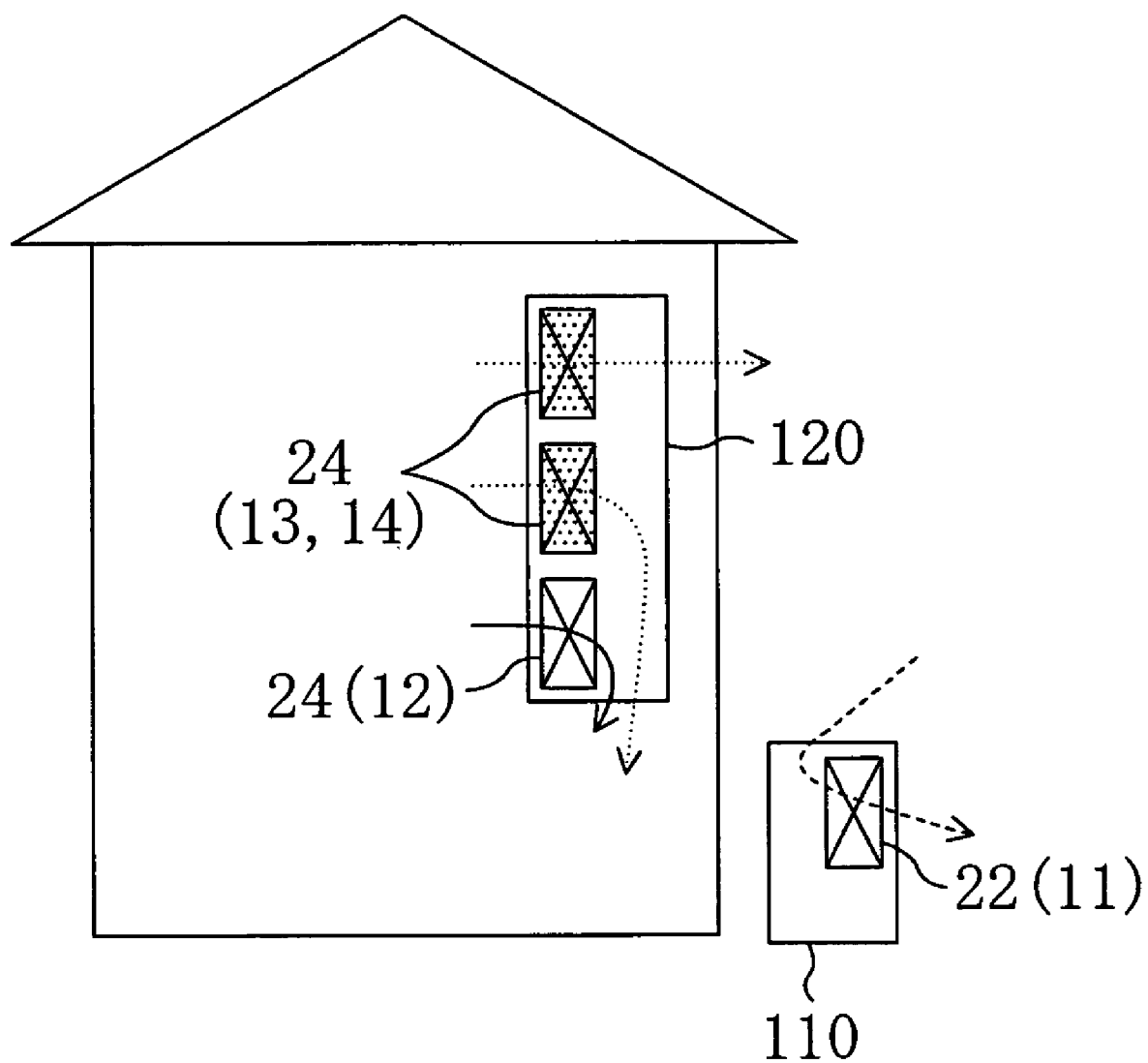
FIG. 9 is a conceptual diagram which shows an installation state of the air conditioning apparatus of the third embodiment as well as depicting air flow during operation.

FIG. 9 is a conceptual illustration which shows an installation state of the air conditioning apparatus (10) as well as depicting air flow during operation. As shown in the figure, in the indoor unit (120) of the air conditioning apparatus (10), a stream of room air (RA) after passage through one of the first and second adsorption heat exchangers (13, 14) is expelled to the outdoors, while another stream of room air (RA) after passage through the other adsorption heat exchanger and still another stream of room air (RA) after passage through the second air heat exchanger (12) circulate in the room. Additionally, in the outdoor unit (110), a stream of outside air (OA) passes through the first air heat exchanger (11) and circulates outside the room.

Running Operation

In the following, the running operation of the air conditioning apparatus (10) is described.

Cooling/Dehumidification Operating Mode

During the cooling and dehumidification operating mode, the first four way switching valve (25) changes state to the first state. And a first operation of FIG. 5(A) and a second operation of FIG. 5(B) are carried out alternately. In the first operation, the second four way switching valve (26) changes state to the first state. In the second operation, the second four way switching valve (26) changes state to the second state. In both the first operation and the second operation, the degree of opening of the expansion valve (23) is reduced to a predetermined value.

In this state, in the first operation, refrigerant discharged out of the compressor (21) condenses in the first air heat exchanger (11) and in the first adsorption heat exchanger (13). Subsequently, the refrigerant expands in the expansion valve (23), evaporates in the second adsorption heat exchanger (14) and in the second air heat exchanger (12), and is drawn back into the compressor (21). At this time, a stream of outside air (OA) after passage through the first air heat exchanger (11) is expelled to the outdoors as exhaust air (EA); a stream of room air (RA) after passage through the first adsorption heat exchanger (13) is expelled to the outdoors as exhaust air (EA); and another stream of room air (RA) after passage through the second adsorption heat exchanger (14) and still another stream of room air (RA) after passage through the second air heat exchanger (12) each return into the room as supply air (SA).

At that time, air latent heat processing is performed mainly in the second adsorption heat exchanger (14), while air sensible heat processing is performed mainly in the second air heat exchanger (12). To sum up, one part of room air (RA) which passes through the indoor heat exchanger (24) is dehumidified mainly by passage through the second adsorption heat exchanger (14) and returns into the room, while the other part is cooled mainly by passage through the second air heat exchanger (12) and returns into the room. Thereby, it becomes possible to efficiently provide room cooling and dehumidification. Additionally, exhaust air (EA), which is expelled to the outdoors after its passage through the indoor heat exchanger (24), regenerates the adsorbent when passing through the first adsorption heat exchanger (13).

On the other hand, in the second operation, refrigerant discharged out of the compressor (21) condenses in the first air heat exchanger (11) and in the second adsorption heat exchanger (14). Subsequently, the refrigerant expands in the expansion valve (23), evaporates in the first adsorption heat exchanger (13) and in the second air heat exchanger (12), and is drawn back into the compressor (21). At this time, a stream of outside air (OA) after passage through the first air heat exchanger (11) is expelled to the outdoors as exhaust air (EA); a stream of room air (RA) after passage through the second adsorption heat exchanger (14) is expelled to the outdoors as exhaust air (EA); and a stream of room air (RA) after passage through the first adsorption heat exchanger (13) and another stream of room air (RA) after passage through the second air heat exchanger (12) each return into the room as supply air (SA).

At that time, air latent heat processing is performed mainly in the first adsorption heat exchanger (13), while air sensible heat processing is performed mainly in the second air heat exchanger (12). To sum up, one part of room air (RA) which passes through the indoor heat exchanger (24) is dehumidified mainly by passage through the first adsorption heat exchanger (13) and returns into the room, while the other part is cooled mainly by passage through the second air heat exchanger (12) and returns into the room. Thereby, it becomes possible to efficiently provide room cooling and dehumidification. Additionally, exhaust air (EA), which is expelled to the outdoors after its passage through the indoor heat exchanger (24), regenerates the adsorbent when passing through the second adsorption heat exchanger (14).

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced. Consequently, when the indoor latent heat load is large, the frequency of switching is increased to thereby increase the amount of dehumidification for enhancing room comfort. On the other hand, when the indoor latent heat load is small, the frequency of switching is decreased to thereby reduce the amount of dehumidification for enhancing energy-savings.
Heating/Humidification Operating Mode During the heating and humidification operating mode, the first four way switching valve (25) changes state to the second state. And a first operation of FIG. 6(A) and a second operation of FIG. 6(B) are carried out alternately. In the first operation, the second four way switching valve (26) changes state to the first state. On the other hand, in the second operation, the second four way switching valve (26) changes state to the second state. In both the first operation and the second operation, the degree of opening of the expansion valve (23) is reduced to a predetermined value.

In this state, in the first operation, refrigerant discharged out of the compressor (21) condenses in the second air heat exchanger (12) and in the second adsorption heat exchanger (14). Subsequently, the refrigerant expands in the expansion valve (23), evaporates in the first adsorption heat exchanger (13) and in the first air heat exchanger (11), and is drawn back into the compressor (21). At this time, a stream of outside air (OA) after passage through the first air heat exchanger (11) is expelled to the outdoors as exhaust air (EA); a stream of room air (RA) after passage through the first adsorption heat exchanger (13) is expelled to the outdoors as exhaust air (EA); another stream of room air (RA) after passage through the second adsorption heat exchanger (14) and still another stream of room air (RA) after passage through the second air heat exchanger (12) each return into the room as supply air (SA).

At that time, air latent heat processing is performed mainly in the second adsorption heat exchanger (14), while air sensible heat processing is processed mainly in the second air heat exchanger (12). To sum up, one part of room air (RA) which passes through the indoor heat exchanger (24) is humidified mainly by passage through the second adsorption heat exchanger (14) and returns into the room, while the other part is heated mainly by passage through the second air heat exchanger (12) and returns into the room. Thereby, it becomes possible to efficiently provide room heating and humidification. Additionally, exhaust air (EA), which is expelled to the outdoors after passage through the indoor heat exchanger (24), gives moisture to the adsorbent when passing through the first adsorption heat exchanger (13).

On the other hand, in the second operation, refrigerant discharged out of the compressor (21) condenses in the second air heat exchanger (12) and in the first adsorption heat exchanger (13). Subsequently, the refrigerant expands in the expansion valve (23), evaporates in the second adsorption heat exchanger (14) and in the first air heat exchanger (11), and is drawn back into the compressor (21). At this time, a stream of outside air (OA) after passage through the first air heat exchanger (11) is expelled to the outdoors as exhaust air (EA); a stream of room air (RA) after passage through the second adsorption heat exchanger (14) is expelled to the outdoors as exhaust air (EA); and a stream of room air (RA) after passage through the first adsorption heat exchanger (13) and another stream of room air (RA) after passage through the second air heat exchanger (12) each return into the room as supply air (SA).

At that time, air latent heat processing is performed mainly in the first adsorption heat exchanger (13), while air sensible heat processing is performed mainly in the second air heat exchanger (12). To sum up, one part of room air (RA) which passes through the indoor heat exchanger (24) is humidified mainly by passage through the first adsorption heat exchanger (13) and returns into the room, while the other part is heated mainly by passage through the second air heat exchanger (12) and returns into the room. Thereby, it becomes possible to efficiently provide room heating and humidification. Additionally, exhaust air (EA), which is expelled to the outdoors after passage through the indoor heat exchanger (24), gives moisture to the adsorbent when passing through the second adsorption heat exchanger (14).

By alternate repetition of the first operation and the second operation in the way described above, it becomes possible to continuously perform indoor latent heat load processing while continuously performing also indoor sensible heat load processing. Also at this time, switching between the first operation and the second operation is accomplished at time intervals depending on the indoor latent heat load.
Effects of the Third Embodiment In accordance with the third embodiment, during both of the cooling and dehumidification operating mode and the heating and humidification operating mode, by switching between the first adsorption heat exchanger (13) and the second adsorption heat exchanger (14), either one of them is used to perform latent heat processing, thereby making it possible to continuously performing indoor latent heat load processing. Additionally, indoor sensible heat load processing can be performed continuously in the second air heat exchanger (12). Accordingly, in comparison with the first embodiment, it becomes possible to more stably control room humidity, and it also becomes possible to more stably control room temperature in comparison with the second embodiment.

Fourth Embodiment of the Invention

As shown in FIGS. 10 and 11, an air conditioning apparatus (10) according to a fourth embodiment of the present invention is an example obtained by modification of the configuration of the refrigerant circuit (20) of the first to third embodiments. The refrigerant circuit (20) of the present embodiment includes, as a plurality of heat exchangers (11, 12, 13, 14) for effecting refrigerant/air heat exchange, two air heat exchangers (11, 12) which mainly perform air sensible heat processing and two adsorption heat exchangers (13, 14) which mainly perform air latent heat processing, as in the third embodiment.

Like the refrigerant circuit (20) of each of the foregoing embodiments, the refrigerant circuit (20) of the present embodiment is a closed circuit along which a compressor (21), an outdoor heat exchanger (22), an expansion mechanism (23), and an indoor heat exchanger (24) which are connected in fluid communication. The refrigerant circuit (20) is provided with a four way switching valve (25, 26) as a switching mechanism for reversing the circulation direction of refrigerant flow. The expansion mechanism (23) is made up of a first expansion valve (first expansion mechanism) (31) and a second expansion valve (second expansion mechanism) (32). Additionally, the outdoor heat exchanger (22) is made up of the first air heat exchanger (11). The indoor heat exchanger (24) is made up of the first adsorption heat exchanger (13) and the second adsorption heat exchanger (14) which are connected in series fluid communication with each other by way of the second expansion mechanism (32), and the second air heat exchanger (12).

The switching mechanism (25, 26) is made up of a first four way switching valve (first switching mechanism) (25) for reversing the general circulation direction of refrigerant flow in the refrigerant circuit (20), and a second four way switching valve (second switching mechanism) (26) for reversing the direction of refrigerant flow between the first adsorption heat exchanger (13) and the second adsorption heat exchanger (14).

In the refrigerant circuit (20), the discharge side of the compressor (21) is connected in fluid communication with a first port (P1) of the first four way switching valve (25). A second port (P2) of the first four way switching valve (25) is connected in fluid communication with the first air heat exchanger (11). The first expansion valve (31) and the second air heat exchanger (12) are sequentially connected in series fluid communication with the first air heat exchanger (11). The second air heat exchanger (12) is connected in fluid communication with a third port (P3) of the first four way switching valve (25). A fourth port (P4) of the first four way switching valve (25) is connected in fluid communication with the suction side of the compressor (21).

In parallel with the first air heat exchanger (11), a first port (P1) of the second four way switching valve (26) is connected in fluid communication with the second port (P2) of the first four way switching valve (25). The first adsorption heat exchanger (13), the second expansion valve (32), and the second adsorption heat exchanger (14) are sequentially connected in series fluid communication with a second port (P2) of the second four way switching valve (26). The second adsorption heat exchanger (14) is connected in fluid communication with a third port (P3) of the second four way switching valve (26). A fourth port (P4) of the second four way switching valve (26) is fluidly connected, in parallel with the second air heat exchanger (12), to the first port (P1) of the first four way switching valve (25).

In the refrigerant circuit (20), the compressor (21), the first air heat exchanger (11), the first expansion mechanism (31), and the second air heat exchanger (12) are fluidly connected in sequence, and the first adsorption heat exchanger (13), the second expansion mechanism (32), and the second adsorption heat exchanger (14) are fluidly connected in parallel with the first air heat exchanger (11), the first expansion mechanism (31), and the second air heat exchanger (12).

The first four way switching valve (25) is operative to switch between a first state which allows fluid communication between the first port (P1) and the second port (P2) and fluid communication between the third port (P3) and the fourth port (P4) (as indicated by solid line in FIGS. 10(A) and 10(B)), and a second state which allows fluid communication between the first port (P1) and the third port (P3) and fluid communication between the second port (P2) and the fourth port (P4) (as indicated by solid line in FIGS. 11(A) and 11(B)).

The second four way switching valve (26) is operative to switch between a first state which allows fluid communication between the first port (P1) and the second port (P2) and fluid communication between the third port (P3) and the fourth port (P4) (as indicated by solid line in FIGS. 10(A) and 11(A)), and a second state which allows fluid communication between the first port (P1) and the third port (P3) and fluid communication between the second port (P2) and the fourth port (P4) (as indicated by solid line in FIGS. 10(B) and 11(B)).

Running Operation

In the following, the running operation of the air conditioning apparatus (10) is described.

Cooling/Dehumidification Operating Mode

During the cooling and dehumidification operating mode, the first four way switching valve (25) changes state to the first state. And a first operation of FIG. 10(A) and a second operation of FIG. 10(B) are carried out alternately. In the first operation, the second four way switching valve (26) changes state to the first state. On the other hand, in the second operation, the second four way switching valve (26) changes state to the second state. In both the first operation and the second operation, the degree of opening of each of the first and second expansion valves (31, 32) is reduced to a respective predetermined value.

In this state, in the first operation, one part of refrigerant discharged out of the compressor (21) condenses in the first air heat exchanger (11). Subsequently, the one part of the refrigerant expands in the first expansion valve (31), evaporates in the second air heat exchanger (12), and is drawn back into the compressor (21). On the other hand, the remaining other part of the refrigerant discharged from the compressor (21) condenses in the first adsorption heat exchanger (13), expands in the second expansion valve (32), evaporates in the second adsorption heat exchanger (14), and is drawn back to the compressor (21). At this time, a stream of outside air (OA) after passage through the first air heat exchanger (11) is expelled to the outdoors as exhaust air (EA); a stream of room air (RA) after passage through the first adsorption heat exchanger (13) is expelled to the outdoors as exhaust air (EA), another stream of room air (RA) after passage through the second adsorption heat exchanger (14) and still another stream of room air (RA) after passage through the second air heat exchanger (12) each return into the room as supply air (SA).

At that time, air latent heat processing is performed mainly in the second adsorption heat exchanger (14), while air sensible heat processing is performed mainly in the second air heat exchanger (12). To sum up, one part of room air (RA) which passes through the indoor heat exchanger (24) is dehumidified mainly by passage through the second adsorption heat exchanger (14) and returns into the room, while the other part is cooled mainly by passage through the second air heat exchanger (12) and returns into the room. Thereby, it becomes possible to efficiently provide room cooling and dehumidification. Additionally, exhaust air (EA), which is expelled to outside the room after passage through the indoor heat exchanger (24), regenerates the adsorbent when passing through the first adsorption heat exchanger (13).

On the other hand, in the second operation, one part of refrigerant discharged out of the compressor (21) condenses in the first air heat exchanger (11). Subsequently, the one part of the refrigerant expands in the first expansion valve (31), evaporates in the second air heat exchanger (12), and is drawn back into the compressor (21). On the other hand, the remaining other part of the refrigerant discharged from the compressor (21) condenses in the second adsorption heat exchanger (14), expands in the second expansion valve (32), evaporates in the first adsorption heat exchanger (13), and is drawn back into the compressor (21). At this time, a stream of outside air (OA) after passage through the first air heat exchanger (11) is expelled to the outdoors as exhaust air (EA); a stream of room air (RA) after passage through the second adsorption heat exchanger (14) is expelled to the outdoors as exhaust air (EA); and a stream of room air (RA) after passage through the first adsorption heat exchanger (13) and another stream of room air (RA) after passage through the second air heat exchanger (12) each return into the room as supply air (SA).

At that time, air latent heat processing is performed mainly in the first adsorption heat exchanger (13), while air sensible heat processing is performed mainly in the second air heat exchanger (12). To sum up, one part of room air (RA) which passes through the indoor heat exchanger (24) is dehumidified mainly by passage through the first adsorption heat exchanger (13) and returns into the room, while the remaining other part of the room air (RA) is cooled mainly by passage through the second air heat exchanger (12) and returns into the room. Thereby, it becomes possible to efficiently provide room cooling and dehumidification. Additionally, exhaust air (EA), which is expelled to outside the room after passage through the indoor heat exchanger (24), regenerates the adsorbent when passing through the second adsorption heat exchanger (14).

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced. Consequently, when the indoor latent heat load is large, the frequency of switching is increased to thereby increase the amount of dehumidification for enhancing room comfort. On the other hand, when the indoor latent heat load is small, the frequency of switching is decreased to thereby reduce the amount of dehumidification for enhancing energy-savings.

Heating/Humidification Operating Mode

During the heating and humidification operating mode, the first four way switching valve (25) changes state to the second state. And a first operation of FIG. 11(A) and a second operation of FIG. 11(B) are carried out alternately. In the first operation, the second four way switching valve (26) changes state to the first state. On the other hand, in the second operation, the second four way switching valve (26) changes state to the second state. In both the first operation and the second operation, the degree of opening of the expansion valve (23) is reduced to a predetermined value.

In this state, in the first operation, one part of refrigerant discharged out of the compressor (21) condenses in the second air heat exchanger (12). Subsequently, the one part of the refrigerant expands in the first expansion valve (31), evaporates in the first air heat exchanger (11), and is drawn back into the compressor (21). On the other hand, the remaining other part of the refrigerant discharged out of the compressor (21) condenses in the second adsorption heat exchanger (14). Subsequently, the refrigerant expands in the second expansion valve (32), evaporates in the first adsorption heat exchanger (13), and returns into the compressor (21). At this time, a stream of outside air (OA) after passage through the first air heat exchanger (11) is expelled to the outdoors as exhaust air (EA); a stream of room air (RA) after passage through the first adsorption heat exchanger (13) is expelled to the outdoors as exhaust air (EA); a stream of room air (RA) after passage through the second adsorption heat exchanger (14) and another stream of room air (RA) after passage through the second air heat exchanger (12) each return into the room as supply air (SA).

At that time, in the room, air latent heat processing is performed mainly in the second adsorption heat exchanger (14), while air sensible heat processing is performed mainly in the second air heat exchanger (12). To sum up, one part of room air (RA) passing through the indoor heat exchanger (24) is humidified mainly by passage through the second adsorption heat exchanger (14) and returns into the room, while the other part is heated mainly by passage through the second air heat exchanger (12) and returns into the room. Thereby, it becomes possible to efficiently provide room heating and humidification. Additionally, exhaust air (EA), which is expelled to outside the room after passage through the indoor heat exchanger (24), gives moisture to the adsorbent when passing through the first adsorption heat exchanger (13).

On the other hand, in the second operation, one part of refrigerant discharged out of the compressor (21) condenses in the second air heat exchanger (12). Subsequently, the one part of the refrigerant expands in the first expansion valve (31), evaporates in the first air heat exchanger (11), and is drawn back into the compressor (21). The remaining other part of the refrigerant discharged out of the compressor (21) condenses in the first adsorption heat exchanger (13). Subsequently, the remaining other part of the refrigerant expands in the second expansion valve (32), evaporates in the second adsorption heat exchanger (14), and returns into the compressor (21). At this time, a stream of outside air (OA) after passage through the first air heat exchanger (11) is expelled to the outdoors as exhaust air (EA); a stream of room air (RA) after passage through the second adsorption heat exchanger (14) is expelled to the outdoors as exhaust air (EA); and another stream of room air (RA) after passage through the first adsorption heat exchanger (13) and still another stream of room air (RA) after passage through the second air heat exchanger (12) each return into the room as supply air (SA).

At that time, air latent heat processing is performed mainly in the first adsorption heat exchanger (13), while air sensible heat processing is performed mainly in the second air heat exchanger (12). To sum up, one part of room air (RA) which passes through the indoor heat exchanger (24) is humidified mainly by passage through the first adsorption heat exchanger (13) and returns into the room, while the other part is heated mainly by passage through the second air heat exchanger (12) and returns into the room. Thereby, it becomes possible to efficiently provide room heating and humidification. Additionally, exhaust air (EA), which is expelled to outside the room after passage through the indoor heat exchanger (24), gives moisture to the adsorbent when passing through the second adsorption heat exchanger (14).

By alternate repetition of the first operation and the second operation in the way described above, it becomes possible to continuously perform indoor latent heat load processing while continuously performing also indoor sensible heat load processing. Also at this time, switching between the first operation and the second operation is accomplished at time intervals depending on the indoor latent heat load.

Effects of the Fourth Embodiment

In accordance with the fourth embodiment, during both of the cooling and dehumidification operating mode and the heating and humidification operating mode, by switching between the first adsorption heat exchanger (13) and the second adsorption heat exchanger (14), either one of them is used to perform latent heat processing, thereby making it possible to continuously perform indoor latent heat load processing. Additionally, it is possible to perform indoor sensible heat load processing in the second air heat exchanger (12). Accordingly, like the third embodiment, it becomes possible to stably control room humidity and it also becomes possible to stably control room temperature.

Additionally, in the fourth embodiment, the flow rate of refrigerant flowing through the air heat exchangers (11, 12) and the flow rate of refrigerant flowing through the adsorption heat exchangers (13, 14) are controlled, respectively, by the expansion valve (31) and by the expansion valve (32). This facilitates the control of performing indoor latent load processing and sensible heat load processing, when compared to the third embodiment.

Fifth Embodiment of the Invention

As can be seen from FIGS. 12 and 13, an air conditioning apparatus (10) according to a fifth embodiment of the present invention is provided with a refrigerant circuit (20) having the same configuration as that of the refrigerant circuit (20) of the fourth embodiment. The present embodiment, however, is an example in which the first adsorption heat exchanger (13) and the second adsorption heat exchanger (14) are both installed outdoors. In other words, in the refrigerant circuit (20) of the present embodiment, the outdoor heat exchanger (22) is made up of the first air heat exchanger (11), the first adsorption heat exchanger (13), and the second adsorption heat exchanger (14), while the indoor heat exchanger (24) is made up of the second air heat exchanger (12) alone. Additionally, the air conditioning apparatus (10) of the present embodiment is in the form of an air conditioning apparatus of the air supply fan type in which the amount of air which is supplied to an indoor space exceeds the amount of air which is expelled to the outdoors.

As mentioned above, the refrigerant circuitry of the present embodiment is the same as that of the fourth embodiment, and its specific description is omitted here.

Figure 14:
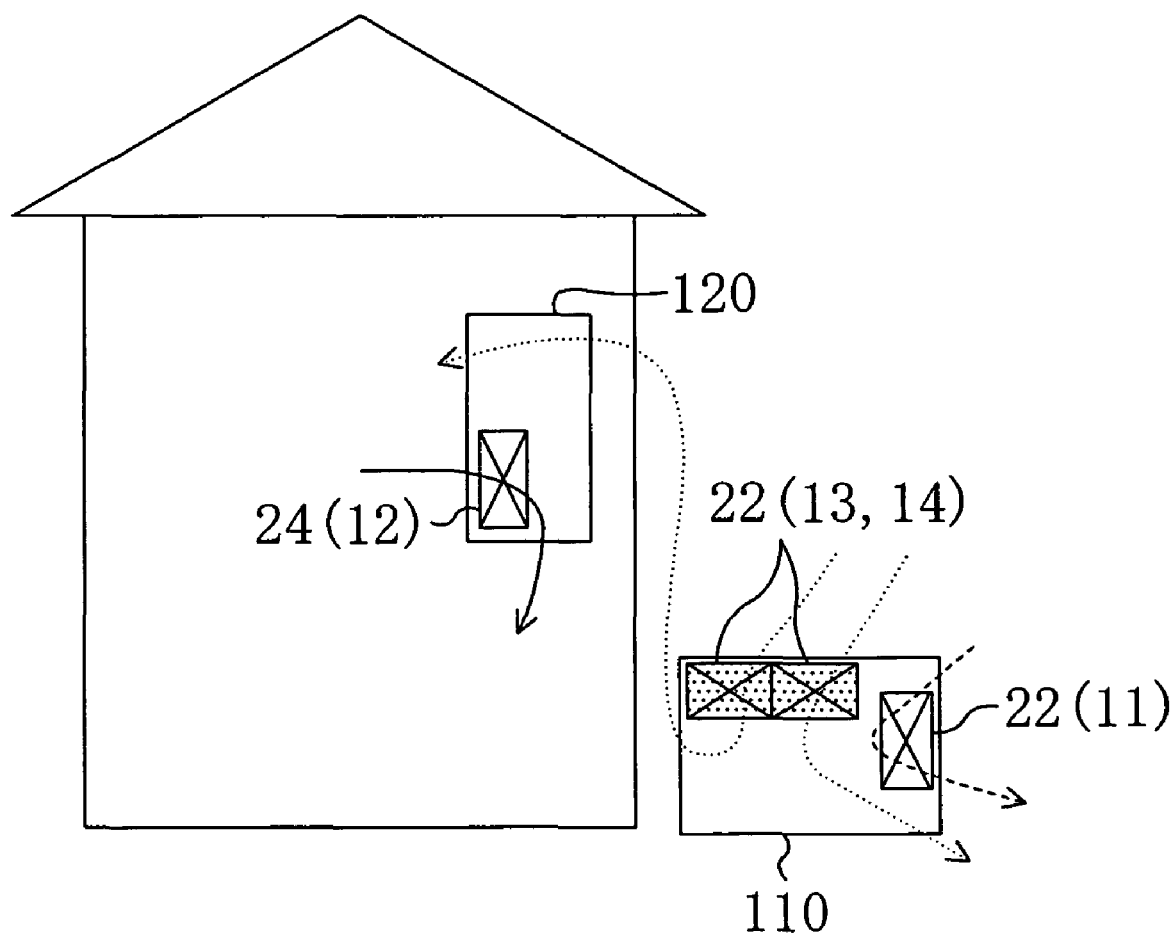
FIG. 14 is a conceptual diagram which shows an installation state of the air conditioning apparatus of the fifth embodiment as well as depicting air flow during operation.

FIG. 14 is a conceptual diagram which illustrates an installation state of the air conditioning apparatus (10) as well as depicting air flow during operation. As shown in the figure, in the outdoor unit (110) of the air conditioning apparatus (10), a stream of outside air (OA) which passes through one of the first and second adsorption heat exchangers (13, 14) is supplied into the room, while a stream of outside air (OA) which passes through the other adsorption heat exchanger and another stream of outside air (OA) which passes through the first air heat exchanger (11) circulate outside the room. Additionally, in the indoor unit (120), a stream of room air (RA) passes through the second air heat exchanger (12) and circulates in the room.

Running Operation

In the following, the running operation of the air conditioning apparatus (10) is described. Since the flow of refrigerant in the refrigerant circuit is the same as the fourth embodiment, the flow of air is mainly described here.

Cooling/Dehumidification Operating Mode

During the cooling and dehumidification operating mode, a first operation of FIG. 12(A) and a second operation of FIG. 12(B) are carried out alternately. In the first operation, the first air heat exchanger (11) and the first adsorption heat exchanger (13) operate as condensers, while the second air heat exchanger (12) and the second adsorption heat exchanger (14) operate as evaporators. And, a stream of outside air (OA) after passage through the first air heat exchanger (11) and another stream of outside air (OA) after passage through the first adsorption heat exchanger (13) are each expelled to the outdoors as exhaust air (EA); still another stream of outside air (OA) after passage through the second adsorption heat exchanger (14) is supplied as supply air (SA); and a stream of room air (RA) after passage through the second air heat exchanger (12) returns into the room as supply air (SA).

At that time, air latent heat processing is performed mainly in the second adsorption heat exchanger (14), while air sensible heat processing is performed mainly in the second air heat exchanger (12). To sum up, one part of outside air (OA) is dehumidified mainly by passage through the second adsorption heat exchanger (14) and supplied into the room, while room air (RA) is cooled mainly by passage through the second air heat exchanger (12) and returns into the room. Thereby, it becomes possible to efficiently provide room cooling and dehumidification. Additionally, another part of outside air (OA) regenerates the adsorbent when passing through the first adsorption heat exchanger (13).

In the second operation, the first air heat exchanger (11) and the second adsorption heat exchanger (14) operate as condensers, while the second air heat exchanger (12) and the first adsorption heat exchanger (13) operate as evaporators. And a stream of outside air (OA) after passage through the first air heat exchanger (11) and another stream of outside air (OA) after passage through the second adsorption heat exchanger (14) are each expelled to the outdoors as exhaust air (EA); still another stream of outside air (OA) after passage through the first adsorption heat exchanger (13) is supplied to the room as supply air (SA); a stream of room air (RA) after passage through the second air heat exchanger (12) also returns into the room as supply air (SA).

At that time, air latent heat processing is performed mainly in the first adsorption heat exchanger (13), while air sensible heat processing is performed mainly in the second air heat exchanger (12). To sum up, one part of outside air (OA) is dehumidified mainly by passage through the first adsorption heat exchanger (13) and supplied into the room, while room air (RA) is cooled mainly by passage through the second air heat exchanger (12) and returns into the room. Thereby, it becomes possible to efficiently perform room cooling and dehumidification. Additionally, another part of outside air (OA) regenerates the adsorbent when passing through the second adsorption heat exchanger (14).

By alternate repetition of the first operation and the second operation in the way described above, it becomes possible to continuously performing indoor latent heat load processing while continuously performing also indoor sensible heat load processing. Also at this time, as the indoor latent heat load increases, the time interval, at which switching between the first operation and the second operation is accomplished, is reduced.

Heating/Humidification Operating Mode

During the heating and humidification operating mode, a first operation of FIG. 13(A) and a second operation of FIG. 13(B) are carried out alternately. In the first operation, the second air heat exchanger (12) and the second adsorption heat exchanger (14) operate as condensers, while the first air heat exchanger (11) and the first adsorption heat exchanger (13) operate as evaporators. And a stream of outside air (OA) after passage through the first air heat exchanger (11) and another stream of outside air (OA) after passage through the first adsorption heat exchanger (13) are each expelled to the outdoors as exhaust air (EA); still another stream of outside air (OA) after passage through the second adsorption heat exchanger (14) is supplied to the room as supply air (SA); and a stream of room air (RA) after passage through the second air heat exchanger (12) returns into the room as supply air (SA).

At that time, air latent heat processing is performed mainly in the second adsorption heat exchanger (14), while air sensible heat processing is performed mainly in the second air heat exchanger (12). To sum up, one part of outside air (OA) is humidified mainly by passage through the second adsorption heat exchanger (14) and supplied into the room, while room air (RA) is heated mainly by passage through the second air heat exchanger (12) and returns into the room. Thereby, it becomes possible to efficiently provide room heating and humidification. Additionally, another part of outside air (OA) gives moisture to the adsorbent when passing through the first adsorption heat exchanger (13).

On the other hand, in the second operation, the second air heat exchanger (12) and the first adsorption heat exchanger (13) operate as condensers, while the first air heat exchanger (11) and the second adsorption heat exchanger (14) operate as evaporators. And, a stream of outside air (OA) after passage through the first air heat exchanger (11) and another stream of outside air (OA) after passage through the second adsorption heat exchanger (14) are each expelled to the outdoors as exhaust air (EA); still another stream of outside air (OA) after passage through the first adsorption heat exchanger (13) is supplied to the room as supply air (SA); and a stream of room air (RA) after passage through the second air heat exchanger (12) returns into the room as supply air (SA).

At that time, air latent heat processing is performed mainly in the first adsorption heat exchanger (13), while air sensible heat processing is performed mainly in the second air heat exchanger (12). To sum up, one part of outside air (OA) is humidified mainly by passage through the first adsorption heat exchanger (13) and supplied into the room, while room air (RA) is heated mainly by passage through the second air heat exchanger (12) and returns into the room. This makes it possible to efficiently provide room heating and humidification. Additionally, another part of outside air (OA) gives, when it is passing through the second adsorption heat exchanger (14), moisture to the adsorbent.

By alternate repetition of the first operation and the second operation in the way described above, it becomes possible to continuously perform indoor latent heat load processing while continuously performing also indoor sensible heat load processing. Also at this time, switching between the first operation and the second operation is made at time intervals depending on the indoor latent heat load.

As described above, the present invention is applicable in air conditioning apparatus of the air supply fan type. Also in such a case, the same effects that each of the above-described embodiments provides are obtained.

Sixth Embodiment of the Invention

As shown in FIGS. 15 and 16, an air conditioning apparatus of a sixth embodiment of the present invention is identical in refrigerant circuitry with the fourth embodiment. Additionally, the air conditioning apparatus (10) of the present embodiment is in the form of an air conditioning apparatus of the air ventilation fan type in which the amount of air which is supplied to an indoor space is in balance with the amount of air which is expelled to the outdoors.

Figure 17:
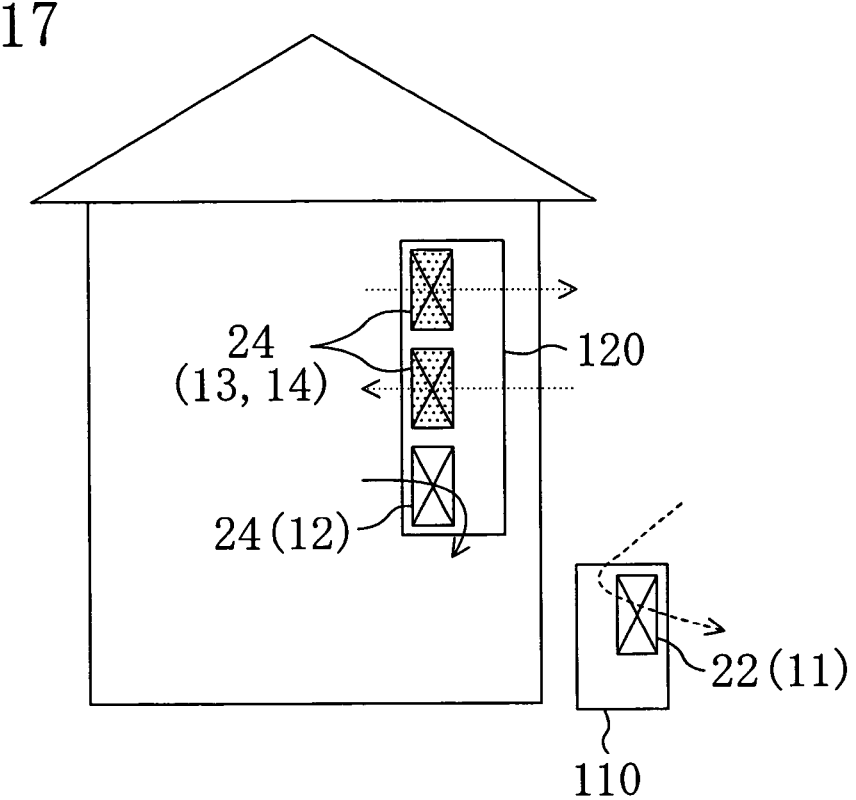
FIG. 17 is a conceptual diagram which shows an installation state of the air conditioning apparatus of the sixth embodiment as well as depicting air flow during operation.

FIG. 17 is a conceptual diagram which illustrates an installation state of the air conditioning apparatus (10) as well as depicting air flow during operation. As shown in the figure, in the indoor unit (120) of the air conditioning apparatus (10), a stream of outside air (OA) passing through one of the first and second adsorption heat exchangers (13, 14) is supplied to the room, while a stream of room air (RA) passing through the other adsorption heat exchanger is expelled to outside the room. On the other hand, another stream of room air (RA) passing through the second air heat exchanger (12) circulates in the room. Furthermore, in the outdoor unit (110), a stream of outside air (OA) passes through the first air heat exchanger (11) and circulates outside the room.

Running Operation

The running operation of the air conditioning apparatus (10) is now described below. Since the flow of refrigerant in the refrigerant circuit is the same as in the fourth embodiment, the flow of air is mainly described here.

Cooling/Dehumidification Operating Mode

During the cooling and dehumidification operating mode, a first operation of FIG. 15(A) and a second operation of FIG. 15(B) are carried out alternately. In the first operation, the first air heat exchanger (11) and the first adsorption heat exchanger (13) operate as condensers, while the second air heat exchanger (12) and the second adsorption heat exchanger (14) operate as evaporators. And, a stream of outside air (OA) after passage through the first air heat exchanger (11) is expelled to the outdoors as exhaust air (EA); a stream of room air (RA) after passage through the second air heat exchanger (12) returns into the room as supply air (SA); another stream of room air (RA) after passage through the first adsorption heat exchanger (13) is expelled to the outdoors as exhaust air (EA); and another stream of outside air (OA) after passage through the second adsorption heat exchanger (14) is supplied to the room as supply air (SA).

At that time, air latent heat processing is performed mainly in the second adsorption heat exchanger (14), while air sensible heat processing is performed mainly in the second air heat exchanger (12). To sum up, one part of outside air (OA) is dehumidified mainly by passage through the second adsorption heat exchanger (14) and is supplied to the room, while one part of room air (RA) is cooled mainly by passage through the second air heat exchanger (12) and returns into the room. This makes it possible to efficiently provide room cooling and dehumidification. Additionally, another part of room air (RA) regenerates, when it is passing through the first adsorption heat exchanger (13), the adsorbent.

In the second operation, the first air heat exchanger (11) and the second adsorption heat exchanger (14) operate as condensers, while the second air heat exchanger (12) and the first adsorption heat exchanger (13) operate as evaporators. And, a stream of outside air (OA) after passage through the first air heat exchanger (11) is expelled to the outdoors as exhaust air (EA), while a stream of room air (RA) after passage through the second air heat exchanger (12) returns into the room as supply air (SA). Additionally, another stream of outside air (OA) after passage through the first adsorption heat exchanger (13) is supplied to the room as supply air (SA), while still another stream of room air (RA) after passage through the second adsorption heat exchanger (14) is expelled to the outdoors as exhaust air (EA).

At that time, air latent heat processing is performed mainly in the first adsorption heat exchanger (13), while air sensible heat processing is performed mainly in the second air heat exchanger (12). To sum up, one part of outside air (OA) is dehumidified mainly by passage through the first adsorption heat exchanger (13) and is supplied to the room, while one part of room air (RA) is cooled mainly by passage through the second air heat exchanger (12) and returns into the room. This makes it possible to efficiently provide room cooling and dehumidification. Additionally, another part of room air (RA) regenerates, when it is passing through the second adsorption heat exchanger (14), the adsorbent.

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced.

Heating/Humidification Operating Mode

During the heating and humidification operating mode, a first operation of FIG. 16(A) and a second operation of FIG. 16(B) are carried out alternately. In the first operation, the second air heat exchanger (12) and the second adsorption heat exchanger (14) operate as condensers, while the first air heat exchanger (11) and the first adsorption heat exchanger (13) operate as evaporators. And, a stream of outside air (OA) after passage through the first air heat exchanger (11) is expelled to the outdoors as exhaust air (EA), while a stream of room air (RA) after passage through the second air heat exchanger (12) returns into the room as supply air (SA). On the other hand, another stream of room air (RA) after passage through the first adsorption heat exchanger (13) is expelled to the outdoors as exhaust air (EA), while another stream of outside air (OA) after passage through the second adsorption heat exchanger (14) is supplied to the room as supply air (SA).

At that time, air latent heat processing is performed mainly in the second adsorption heat exchanger (14), while air sensible heat processing is performed mainly in the second air heat exchanger (12). To sum up, one part of outside air (OA) is humidified mainly by passage through the second adsorption heat exchanger (14) and is supplied to the room, while one part of room air (RA) is heated mainly by passage through the second air heat exchanger (12) and returns into the room. This makes it possible to efficiently provide room heating and humidification. Additionally, another part of room air (RA) gives, when it is passing through the first adsorption heat exchanger (13), moisture to the adsorbent.

On the other hand, in the second operation, the second air heat exchanger (12) and the first adsorption heat exchanger (13) operate as condensers, while the first air heat exchanger (11) and the second adsorption heat exchanger (14) operate as evaporators. And, a stream of outside air (OA) after passage through the first air heat exchanger (11) is expelled to the outdoors as exhaust air (EA), while a stream of room air (RA) after passage through the second air heat exchanger (12) returns into the room as supply air (SA). On the other hand, another stream of outside air (OA) after passage through the first adsorption heat exchanger (13) is supplied to the room as supply air (SA), while another stream of room air (RA) after passage through the second adsorption heat exchanger (14) is expelled to the outdoors as exhaust air (EA).

At that time, air latent heat processing is performed mainly in the first adsorption heat exchanger (13), while air sensible heat processing is performed mainly in the second air heat exchanger (12). To sum up, one part of outside air (OA) is humidified mainly by passage through the first adsorption heat exchanger (13) and is supplied to the room, while one part of room air (RA) is heated mainly by passage through the second air heat exchanger (12) and returns into the room. This makes it possible to efficiently provide room heating and humidification. Additionally, another stream of room air (RA) gives, when it is passing through the second adsorption heat exchanger (14), moisture to the adsorbent.

By alternate repetition of the first operation and the second operation in the way described above, it becomes possible to continuously perform indoor latent heat load processing while continuously performing also indoor sensible heat load processing. Also at this time, switching between the first operation and the second operation is made at time intervals depending on the indoor latent heat load.

As described above, the present invention is applicable in air conditioning apparatus of the air ventilation fan type. Also in such a case, the same effects that each of the above-described embodiments provides are obtained.

Variational Example

Figure 18:
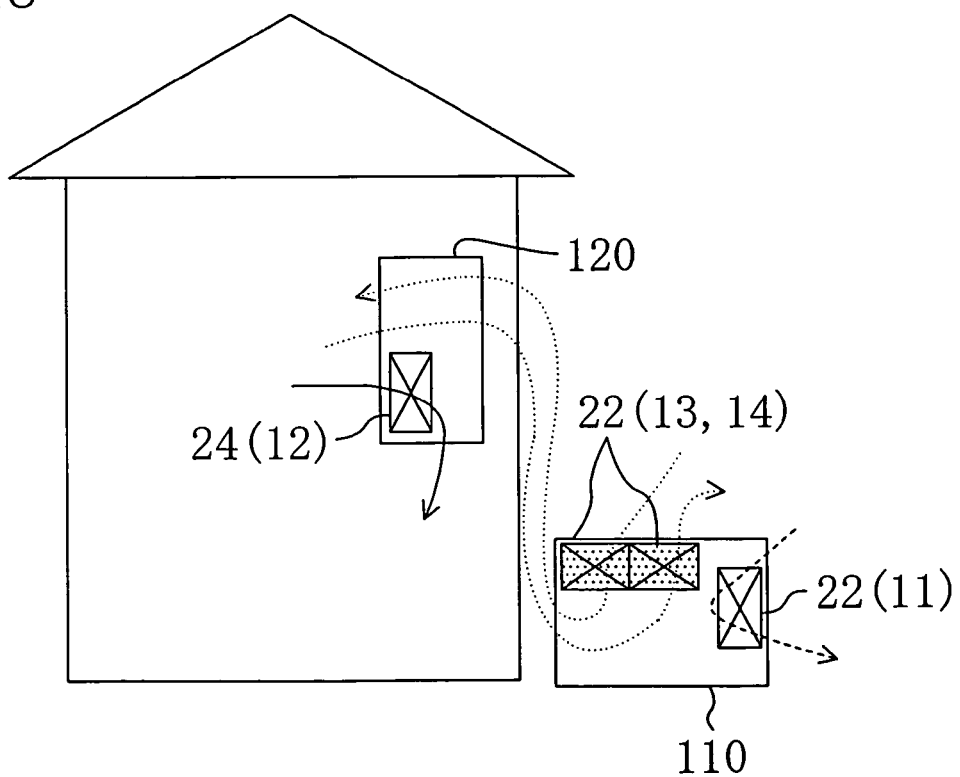
FIG. 18 is a conceptual diagram which shows an installation state of an variational example of the air conditioning apparatus of the sixth embodiment as well as depicting air flow during operation.

In the examples depicted in FIGS. 15-17, the two adsorption heat exchangers (13, 14) are disposed indoors. Alternatively, these adsorption heat exchangers (13, 14) may be disposed outdoors, as shown in FIG. 18. In this case, in the outdoor unit (110), a stream of outside air (OA) passing through one of the first and second adsorption heat exchangers (13, 14) is supplied to the room, while a stream of room air (RA) passing through the other adsorption heat exchanger is expelled to the outdoors. Another stream of room air (RA) passing through the second air heat exchanger (12) circulates in the room. In the outdoor unit (110), outside air (OA) passes through the first air heat exchanger (11) and circulates outside the room.

The above-described arrangement also makes it possible to obtain the same effects that the examples of FIGS. 15-17 provide.

Seventh Embodiment of the Invention

Figure 19:
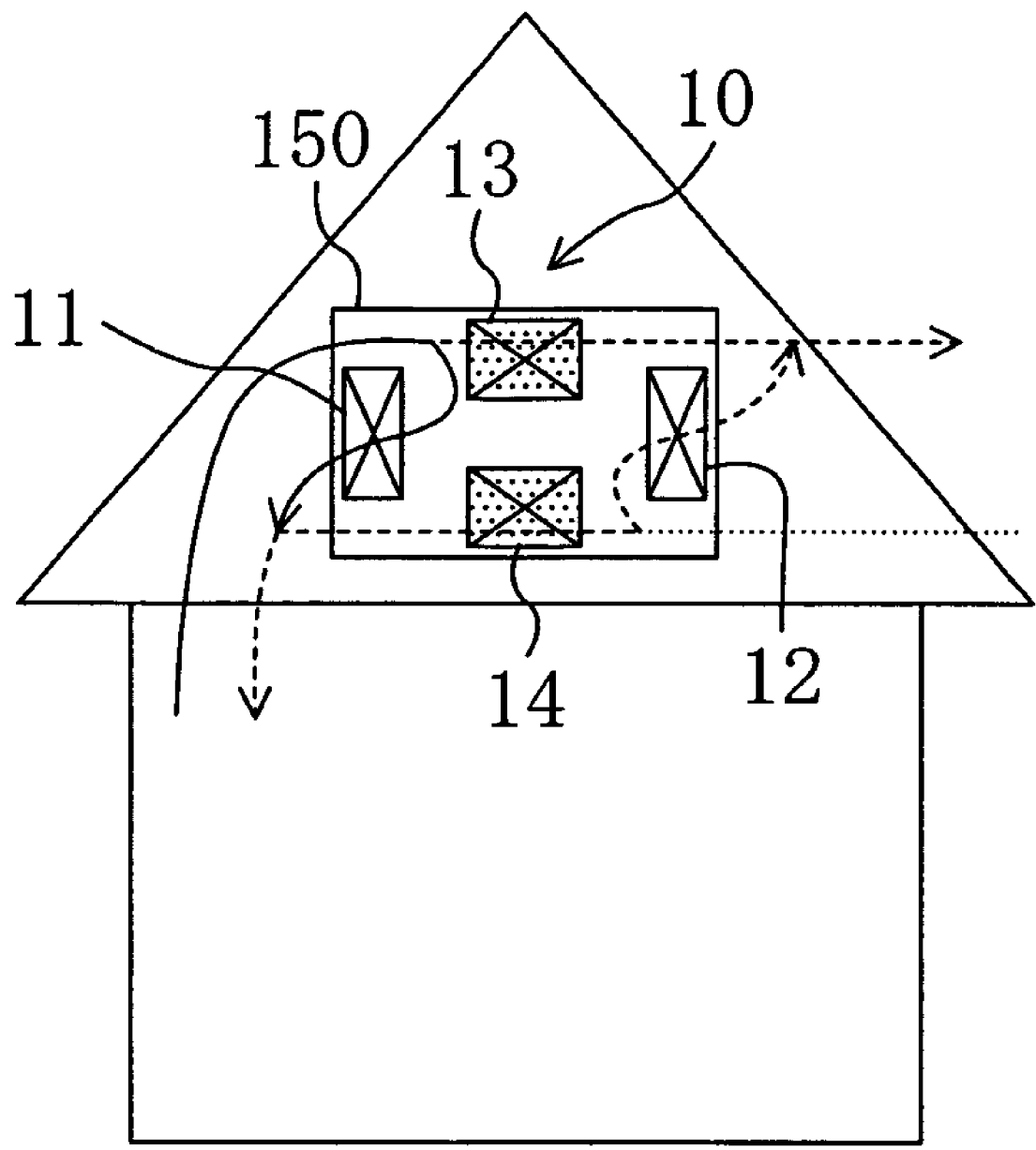
FIG. 19 is a conceptual diagram which shows an installation state of an air conditioning apparatus according to a seventh embodiment of the present invention as well as depicting air flow during operation.
Figure 20:
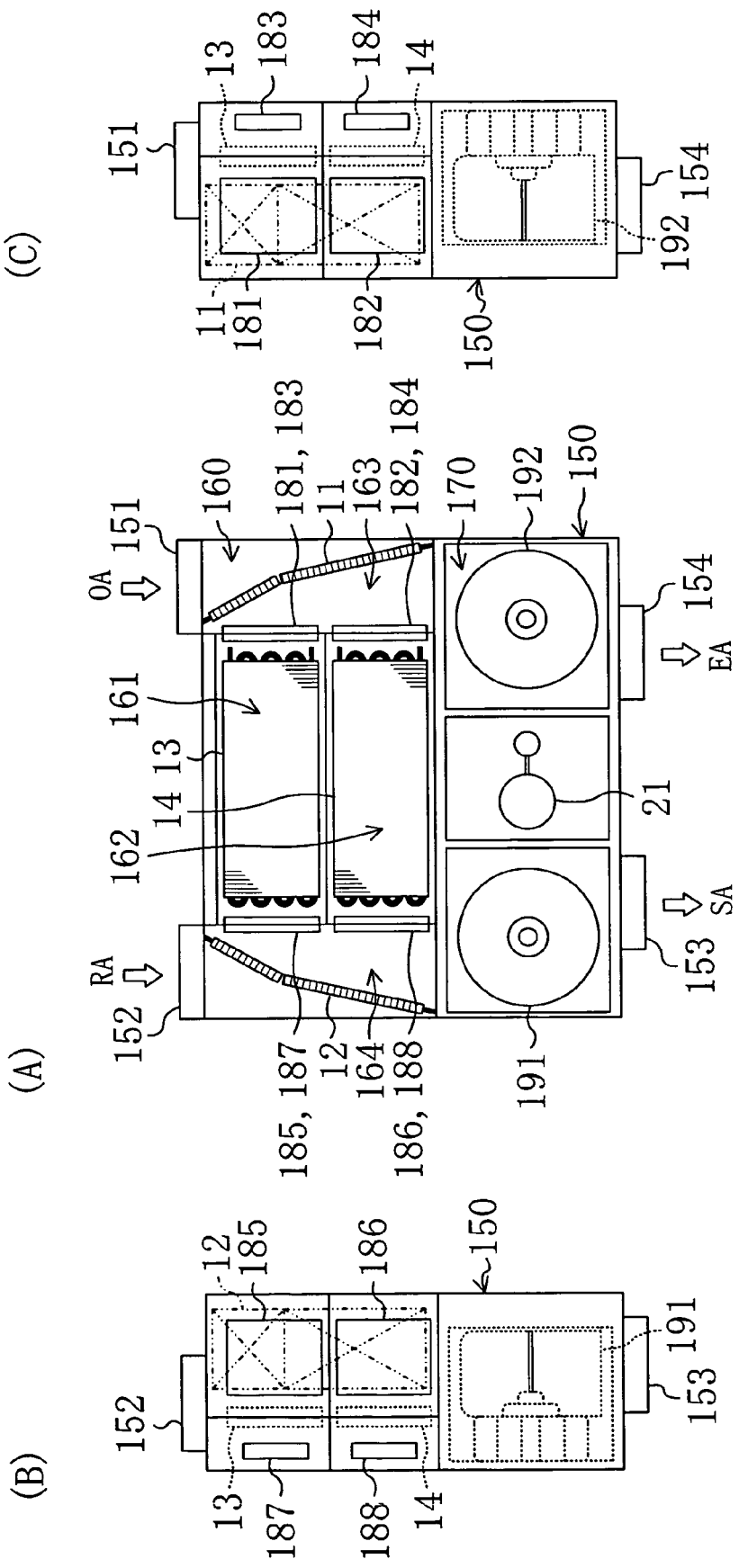
FIG. 20 is a diagram which shows an arrangement of the air conditioning apparatus of the seventh embodiment.

Referring to FIGS. 19 and 20, there is shown an integral-type air conditioning apparatus (10) according to a seventh embodiment of the present invention. This air conditioning apparatus (10) includes a single casing (150) which contains two air heat exchangers (11, 12) and two adsorption heat exchangers (13, 14) and is installed under the roof. The seventh embodiment is one constructional example when the air conditioning apparatus (10) of the present embodiment is formed as a full air ventilation type. FIG. 19 is a conceptual diagram which illustrates an installation state of the air conditioning apparatus (10) as well as depicting air flow during operation. FIG. 20(A) is a structural diagram when viewed from above. FIG. 20(B) is a structural diagram when viewed from the left-hand side. FIG. 20(C) is a structural diagram when viewed from the right-hand side.

The casing (150) of the air conditioning apparatus (10) is shaped like a rectangular box. One of a pair of end surfaces of the casing (150) is provided with a first suction opening (151) through which outside air (OA) is drawn into the casing (150), and a second suction opening (152) through which room air (RA) is drawn into the casing (150). And, the other end surface of the casing (150) is provided with a first blowout opening (153) through which supply air (SA) is supplied to an indoor space, and a second blowout opening (154) through which exhaust air (EA) is expelled to the outdoors. These openings, i.e. the first suction opening (151), the second suction opening (152), the first blowout opening (153), and the second blowout opening (154), are connected, respectively, to ducts so that outside air, room air, supply air, and exhaust air flow therethrough.

The inside of the casing (150) is divided into a heat exchange chamber (160) in which the air heat exchangers (11, 12) and the adsorption heat exchangers (13, 14) are disposed, and a machine chamber (170) in which mechanical components including fans (191, 192), a compressor (21) et cetera are disposed.

The heat exchange chamber (160) is divided, in the horizontal direction of the casing (150) in the figure, into three sections. More specifically, an adsorption heat exchanger chamber (161, 162) is formed in the center; a first air heat exchanger chamber (163) is formed on one side of the adsorption heat exchanger chamber (161, 162); and a second air heat exchanger chamber (164) is formed on the other side of the adsorption heat exchanger chamber (161, 162). The adsorption heat exchanger chamber (161, 162) and the air heat exchanger chambers (163, 164) are each divided into two spaces, i.e., upper and low spaces, in their height direction. On the other hand, the adsorption heat exchanger chamber (161, 162) is divided into two rows in the cross direction (the vertical direction in the figure), thereby forming a first adsorption heat exchanger chamber (161) and a second adsorption heat exchanger chamber (162).

The first air heat exchanger (11) is disposed in the upper space of the first air heat exchanger chamber (163). The second air heat exchanger (12) is disposed in the upper space of the second air heat exchanger chamber (164). The first adsorption heat exchanger (13) is disposed centrally between the upper and lower spaces of the first adsorption heat exchanger chamber (161), while the second adsorption heat exchanger (14) is disposed centrally between the upper and lower spaces of the second adsorption heat exchanger chamber (162).

Both the upper and lower spaces of the first air heat exchanger chamber (163) are in fluid communication with the first suction opening (151). A first damper (181) is disposed in the upper space of the first air heat exchanger chamber (163), such that it lies between the first air heat exchanger chamber (163) and the first adsorption heat exchanger chamber (161), while a second damper (182) is disposed in the upper space of the first air heat exchanger chamber (163), such that it lies between the first air heat exchanger chamber (163) and the second adsorption heat exchanger chamber (162). A third damper (183) is disposed in the lower space of the first air heat exchanger chamber (163), such that it lies between the first air heat exchanger chamber (163) and the first adsorption heat exchanger chamber (161), while a fourth damper (184) is disposed in the lower space of the first air heat exchanger chamber (163), such that it lies between the first air heat exchanger chamber (163) and the second adsorption heat exchanger chamber (162).

Both the upper and lower spaces of the second air heat exchanger chamber (164) are in fluid communication with the second suction opening (152). A fifth damper (185) is disposed in the upper space of the second air heat exchanger chamber (164), such that it lies between the second air heat exchanger chamber (164) and the first adsorption heat exchanger chamber (161), while a sixth damper (186) is disposed in the upper space of the second air heat exchanger chamber (164), such that it lies between the second air heat exchanger chamber (164) and the second adsorption heat exchanger chamber (162). A seventh damper (187) is disposed in the lower space of the second air heat exchanger chamber (164), such that it lies between the second air heat exchanger chamber (164) and the first adsorption heat exchanger chamber (161), while an eighth damper (188) is disposed in the lower space of the second air heat exchanger chamber (164), such that it lies between the second air heat exchanger chamber (164) and the second adsorption heat exchanger chamber (162).

The compressor (21) is disposed centrally in the machine chamber (170) of the casing (150). The first fan (191) is disposed on one side of the compressor (21), while the second fan (192) is disposed on the other side of the compressor (21). The first fan (191) is in fluid communication with the first blowout opening (153) and the upper space of the second air heat exchanger chamber (164). On the other hand, the second fan (192) is in fluid communication with the second blowout opening (154) and the upper space of the first air heat exchanger chamber (163).

The refrigerant circuit (20) of the present embodiment is configured in the same way as the one as shown in FIGS. 15 and 16, and the flow of air in each heat exchanger (11, 12, 13, 14) is also the same as the flow of air shown in FIGS. 15 and 16. The difference between the examples of FIGS. 15 and 16 and the present embodiment is that, whereas in the former the compressor (21) and the first air heat exchanger (11) are disposed outside the room, every equipment is disposed inside the room in the latter.

Running Operation

In the following, the running operation of the air conditioning apparatus (10) is described.

Cooling/Dehumidification Operating Mode

During the cooling and dehumidification operating mode, a first operation (see FIG. 15(A)) and a second operation (see FIG. 15(B)) are carried out alternately. In the first operation, the first air heat exchanger (11) and the first adsorption heat exchanger (13) operate as condensers, while the second air heat exchanger (12) and the second adsorption heat exchanger (14) operate as evaporators. In addition, the first damper (181), the fourth damper (184), the sixth damper (186), and the seventh damper (187) are placed in the open state, while the second damper (182), the third damper (183), the fifth damper (185), and the eighth damper (188) are placed in the closed state.

In this state, one part of outside air (OA) drawn into the casing (150) from the first suction opening (151) passes through the first air heat exchanger (11) in the upper space of the first air heat exchanger chamber (163) and is then expelled to the outdoors from the second blowout opening (154) by way of the second fan (192). On the other hand, the remaining other part of the outside air (OA) drawn into the casing (150) from the first suction opening (151) flows into the second adsorption heat exchanger chamber (162) from the lower space of the first air heat exchanger chamber (163), is dehumidified in the second adsorption heat exchanger (14), flows out to the upper space of the second air heat exchanger chamber (164), and is then supplied into the room from the first blowout opening (153) by way of the first fan (191). Meanwhile, one part of room air (RA) drawn into the casing (150) from the second suction opening (152) is cooled by passage through the second air heat exchanger (12) in the upper space of the second air heat exchanger chamber (164) and is then supplied into the room from the first blowout opening (153) by way of the first fan (191). The remaining other part of the room air (RA) drawn into the casing (150) from the second suction opening (152) flows into the first adsorption heat exchanger chamber (161) from the lower space of the second air heat exchanger chamber (164), regenerates the first adsorption heat exchanger (13), flows out to the upper space of the first air heat exchanger chamber (163), and is then expelled to the outdoors from the second blowout opening (154) by way of the second fan (192).

At that time, air latent heat processing is performed mainly in the second adsorption heat exchanger (14), while air sensible heat processing is performed mainly in the second air heat exchanger (12). To sum up, one part of outside air (OA) is dehumidified mainly by passage through the second adsorption heat exchanger (14) and is then supplied to the room, while one part of room air (RA) is cooled mainly by passage through the second air heat exchanger (12) and returns into the room. This makes it possible to efficiently provide room cooling and dehumidification.

In the second operation, the first air heat exchanger (11) and the second adsorption heat exchanger (14) operate as condensers, while the second air heat exchanger (12) and the first adsorption heat exchanger (13) operate as evaporators. In addition, the second damper (182), the third damper (183), the fifth damper (185), and the eighth damper (188) are placed in the open state, while the first damper (181), the fourth damper (184), the sixth damper (186), and the seventh damper (187) are placed in the closed state.

In this state, one part of outside air (OA) drawn into the casing (150) from the first suction opening (151) passes through the first air heat exchanger (11) in the upper space of the first air heat exchanger chamber (163) and is then expelled to the outdoors from the second blowout opening (154) by way of the second fan (192). On the other hand, the remaining other part of the outside air (OA) drawn into the casing (150) from the first suction opening (151) flows into the first adsorption heat exchanger chamber (161) from the lower space of the first air heat exchanger chamber (163), is dehumidified in the first adsorption heat exchanger (13), flows out to the upper space of the second air heat exchanger chamber (164), and is then supplied into the room from the first blowout opening (153) by way of the first fan (191). Meanwhile, one part of room air (RA) drawn into the casing (150) from the second suction opening (152) is cooled by passage through the second air heat exchanger (12) in the upper space of the second air heat exchanger chamber (164) and is then supplied into the room from the first blowout opening (153) by way of the first fan (191). The remaining other part of the room air (RA) drawn into the casing (150) from the second suction opening (152) flows into the second adsorption heat exchanger chamber (162) from the lower space of the second air heat exchanger chamber (164), regenerates the second adsorption heat exchanger (14), flows out to the upper space of the first air heat exchanger chamber (163), and is then expelled to the outdoors from the second blowout opening (154) by way of the second fan (192).

At that time, air latent heat processing is performed mainly in the first adsorption heat exchanger (13), while air sensible heat processing is performed mainly in the second air heat exchanger (12). To sum up, one part of outside air (OA) is dehumidified mainly by passage through the first adsorption heat exchanger (13) and is then supplied to the room, while one part of room air (RA) is cooled mainly by passage through the second air heat exchanger (12) and returns into the room. This makes it possible to efficiently provide room cooling and dehumidification.

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced.

Heating/Humidification Operating Mode

During the heating and humidification operating mode, a first operation (see FIG. 16(A)) and a second operation (see FIG. 16(B)) are carried out alternately. In the first operation, the second air heat exchanger (12) and the second adsorption heat exchanger (14) operate as condensers, while the first air heat exchanger (11) and the first adsorption heat exchanger (13) operate as evaporators. In addition, the first damper (181), the fourth damper (184), the sixth damper (186), and the seventh damper (187) are placed in the open state, while the second damper (182), the third damper (183), the fifth damper (185), and the eighth damper (188) are placed in the closed state.

In this state, one part of outside air (OA) drawn into the casing (150) from the first suction opening (151) passes through the first air heat exchanger (11) in the upper space of the first air heat exchanger chamber (163) and is then expelled to the outdoors from the second blowout opening (154) by way of the second fan (192). On the other hand, the remaining other part of the outside air (OA) drawn into the casing (150) from the first suction opening (151) flows into the second adsorption heat exchanger chamber (162) from the lower space of the first air heat exchanger chamber (163), is humidified in the second adsorption heat exchanger (14), flows out to the upper space of the second air heat exchanger chamber (164), and is then supplied to the room from the first blowout opening (153) by way of the first fan (191). Meanwhile, one part of room air (RA) drawn into the casing (150) from the second suction opening (152) is heated by passage through the second air heat exchanger (12) in the upper space of the second air heat exchanger chamber (164) and is then supplied to the room from the first blowout opening (153) by way of the first fan (191). The remaining other part of the room air (RA) drawn into the casing (150) from the second suction opening (152) flows into the first adsorption heat exchanger chamber (161) from the lower space of the second air heat exchanger chamber (164), gives moisture to the first adsorption heat exchanger (13), flows out to the upper space of the first air heat exchanger chamber (163), and is then expelled to the outdoors from the second blowout opening (154) by way of the second fan (192).

At that time, air latent heat processing is performed mainly in the second adsorption heat exchanger (14), while air sensible heat processing is performed mainly in the second air heat exchanger (12). To sum up, one part of outside air (OA) is humidified mainly by passage through the second adsorption heat exchanger (14) and is then supplied to the room, while one part of room air (RA) is heated mainly by passage through the second air heat exchanger (12) and returns into the room. This makes it possible to efficiently provide room heating and humidification.

In the second operation, the second air heat exchanger (12) and the first adsorption heat exchanger (13) operate as condensers, while the first air heat exchanger (11) and the second adsorption heat exchanger (14) operate as evaporators. In addition, the second damper (182), the third damper (183), the fifth damper (185), and the eighth damper (188) are placed in the open state, while the first damper (181), the fourth damper (184), the sixth damper (186), and the seventh damper (187) are placed in the closed state.

In this state, one part of outside air (OA) drawn into the casing (150) from the first suction opening (151) passes through the first air heat exchanger (11) in the upper space of the first air heat exchanger chamber (163) and is then expelled to the outdoors from the second blowout opening (154) by way of the second fan (192). On the other hand, the remaining other part of the outside air (OA) drawn into the casing (150) from the first suction opening (151) flows into the first adsorption heat exchanger chamber (161) from the lower space of the first air heat exchanger chamber (163), is humidified in the first adsorption heat exchanger (13), flows out to the upper space of the second air heat exchanger chamber (164), and is then supplied by way of the first fan (191) into the room from the first blowout opening (153). On the other hand, one part of room air (RA) drawn into the casing (150) from the second suction opening (152) is heated by passage through the second air heat exchanger (12) in the upper space of the second air heat exchanger chamber (164) and is then supplied by way of the first fan (191) into the room from the first blowout opening (153). The remaining other part of the room air (RA) drawn into the casing (150) from the second suction opening (152) flows into the second adsorption heat exchanger chamber (162) from the lower space of the second air heat exchanger chamber (164), gives moisture to the second adsorption heat exchanger (14), flows out to the upper space of the first air heat exchanger chamber (163), and is then expelled by way of the second fan (192) to the outdoors from the second blowout opening (154).

At that time, air latent heat processing is performed mainly in the first adsorption heat exchanger (13), while air sensible heat processing is performed mainly in the second air heat exchanger (12). To sum up, one part of outside air (OA) is humidified mainly by passage through the first adsorption heat exchanger (13) and is then supplied to the room, while one part of room air (RA) is heated mainly by passage through the second air heat exchanger (12) and returns into the room. This makes it possible to efficiently provide room heating and humidification.

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced.

Eighth Embodiment of the Invention

With reference to FIGS. 21 and 22, an air conditioning apparatus according to an eighth embodiment of the present invention is not provided with the refrigerant circuit (20) of the aforesaid embodiments but instead includes a cold and hot water circuit (40) for the flow of cold and hot water. The cold and hot water circuit (40) has a plurality of heat exchangers (11, 12, 13, 14) for effecting cold and hot water/air heat exchange. In addition, the cold and hot water circuit (40) is provided, as the heat exchangers (11, 12, 13, 14), with two air heat exchangers (11, 12) which mainly perform air sensible heat processing and two adsorption heat exchangers (13, 14) which mainly perform air latent heat processing.

The cold and hot water circuit (40) has a hot water source (41), a cold water source (42), an outdoor heat exchanger (43), and indoor heat exchangers (44). And, the outdoor heat exchanger (43) is made up of the first air heat exchanger (11), while the indoor heat exchangers (44) are made up of the second air heat exchanger (12), the first adsorption heat exchanger (13), and the second adsorption heat exchanger (14).

In the cold and hot water circuit (40), the first adsorption heat exchanger (13) and the second adsorption heat exchanger (14) are connected in parallel fluid communication with each other, while the first air heat exchanger (11) and the second adsorption heat exchanger (12) are connected in parallel fluid communication with each other. The first and the second adsorption heat exchangers (13, 14) and the first and the second air heat exchangers (11, 12) are connected in series fluid communication with the hot water source (41) and the cold water source (42).

The cold and hot water circuit (40) includes, as a first switching mechanism (45) for switching the direction of cold and hot water flow so that hot water flows through one of the first and second adsorption heat exchangers (13, 14) while cold water flows through the other adsorption heat exchanger, a three way valve (A1) connected in fluid communication with one end of the first adsorption heat exchanger (13), a three way valve (A2) connected in fluid communication with the other end of the first adsorption heat exchanger (13), a three way valve (B1) connected in fluid communication with one end of the second adsorption heat exchanger (14), and a three way valve (B2) connected in fluid communication with the other end of the second adsorption heat exchanger (14). In addition, the cold and hot water circuit (40) includes, as a second switching mechanism (46) for switching the direction of cold and hot water flow so that hot water flows through one of the first and second air heat exchangers (11, 12) while cold water flows through the other air heat exchanger, a three way valve (C1) connected in fluid communication with one end of the first air heat exchanger (11), a three way valve (C2) connected in fluid communication with the other end of the first air heat exchanger (11), a three way valve (D1) connected in fluid communication with one end of the second air heat exchanger (12), and a three way valve (D2) connected in fluid communication with the other end of the second air heat exchanger (12).

The three way valve (A1) and the three way valve (B1) are connected in parallel fluid communication with the hot water source (41) at their respective hot water inflow ports (Pi1), while the three way valve (A1) and the three way valve (B1) are connected in parallel fluid communication with the cold water source (42) at their respective cold water inflow ports (Pi2).

The three way valve (A2) and the three way valve (B2), and the three way valve (C1) and the three way valve (D1) are fluidly connected so that the three way valve (C1) and the three way valve (D1) are in parallel with the three way valve (A2) and the three way valve (B2) and, in addition, the three way valve (A2) and the three way valve (B2) are in parallel with the three way valve (C1) and the three way valve (D1). And a hot water outflow port (Po1) of the three way valve (A2) and a hot water outflow port (Po1) of the three way valve (B2) are in fluid communication with each other, and are in fluid communication with a hot water inflow port (Pi1) of the three way valve (C1) and a hot water inflow port (Pi1) of the three way valve (D1). In addition, a cold water outflow port (Po2) of the three way valve (A2) and a cold water outflow port (Po2) of the three way valve (B2) are in fluid communication with each other, and are in fluid communication with a cold water inflow port (Pi2) of the three way valve (C1) and a cold water inflow port (Pi2) of the three way valve (D1).

The three way valve (C2) and the three way valve (D2) are fluidly connected in parallel to the hot water source (41) at their respective hot water outflow ports (Po1), while the three way valve (C2) and the three way valve (D2) are fluidly connected in parallel to the cold water source (42) at their respective cold water outflow ports (Po2).

Running Operation

In the following, the running operation of the air conditioning apparatus (10) is described.

Cooling/Dehumidification Operating Mode

During the cooling and dehumidification operating mode, a first operation of FIG. 21(A) and a second operation of FIG. 21(B) are carried out alternately. In the first operation, in each of the three way valves (A1-D2), ports indicated by solid line of FIG. 21(A) are placed in the open state, while a port indicated by broken line of FIG. 21(A) is placed in the closed state, as a result of which the first air heat exchanger (11) and the second adsorption heat exchanger (14) operate as heaters, while the second air heat exchanger (12) and the first adsorption heat exchanger (13) operates as coolers. And, a stream of outside air (OA) which has passed through the first air heat exchanger (11) is expelled to the outdoors as exhaust air (EA), while a stream of room air (RA) which has passed through the second air heat exchanger (12) returns into the room as supply air (SA). On the other hand, another stream of outside air (OA), indicated with a dotted line originating out of dashed line OA, which has passed through the first adsorption heat exchanger (13) is supplied to the room as supply air (SA), while another stream of room air (RA), indicated with a dotted line originating out of solid line RA, which has passed through the second adsorption heat exchanger (14) is expelled to the outdoors as exhaust air (EA).

At that time, air latent heat processing is performed mainly in the first adsorption heat exchanger (13), while air sensible heat processing is performed mainly in the second air heat exchanger (12). To sum up, one part of outside air (OA) is dehumidified mainly by passage through the first adsorption heat exchanger (13) and is then supplied to the room, while one part of room air (RA) is cooled mainly by passage through the second air heat exchanger (12) and returns into the room. This makes it possible to efficiently provide room cooling and dehumidification. In addition, another part of room air (RA) regenerates, when it is passing through the second adsorption heat exchanger (14), the adsorbent.

In the second operation, in each of the three way valves (A1-D2), ports indicated by solid line of FIG. 21(B) are placed in the open state, while a port indicated by broken line of FIG. 21(B) is placed in the closed state. As a result, the first air heat exchanger (11) and the first adsorption heat exchanger (13) operate as heaters, while the second air heat exchanger (12) and the second adsorption heat exchanger (14) operate as coolers. And, a stream of outside air (OA) which has passed through the first air heat exchanger (11) is expelled to the outdoors as exhaust air (EA), while a stream of room air (RA) which has passed through the second air heat exchanger (12) returns into the room as supply air (SA). On the other hand, another stream of room air (RA) which has passed through the first adsorption heat exchanger (13) is expelled to the outdoors as exhaust air (EA), while another stream of outside air (OA) which has passed through the second adsorption heat exchanger (14) is supplied to the room as supply air (SA).

At that time, air latent heat processing is performed mainly in the second adsorption heat exchanger (14), while air sensible heat processing is performed mainly in the second air heat exchanger (12). To sum up, one part of outside air (OA) is dehumidified mainly by passage through the second adsorption heat exchanger (14) and is then supplied to the room, while one part of room air (RA) is cooled mainly by passage through the second air heat exchanger (12) and returns into the room. This makes it possible to efficiently provide room cooling and dehumidification. In addition, another part of room air (RA) regenerates, when it is passing through the first adsorption heat exchanger (13), the adsorbent.

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced.

Heating/Humidification Operating Mode

During the heating and humidification operating mode, a first operation of FIG. 22(A) and a second operation of FIG. 22(B) are carried out alternately. In the first operation, in each of the three way valves (A1-D2), ports indicated by solid line of FIG. 22(A) are placed in the open state, while a port indicated by broken line of FIG. 22(A) is placed in the closed state. As a result, the second air heat exchanger (12) and the second adsorption heat exchanger (14) operate as heaters, while the first air heat exchanger (11) and the first adsorption heat exchanger (13) operate as coolers. And, a stream of outside air (OA) which has passed through the first air heat exchanger (11) is expelled to the outdoors as exhaust air (EA), while a stream of room air (RA) which has passed through the second air heat exchanger (12) returns into the room as supply air (SA). On the other hand, another stream of room air (RA) which has passed through the first adsorption heat exchanger (13) is expelled to the outdoors as exhaust air (EA), while another stream of outside air (OA) which has passed through the second adsorption heat exchanger (14) is supplied to the room as supply air (SA).

At that time, air latent heat processing is performed mainly in the second adsorption heat exchanger (14), while air sensible heat processing is performed mainly in the second air heat exchanger (12). To sum up, one part of outside air (OA) is humidified mainly by passage through the second adsorption heat exchanger (14) and is then supplied to the room, while one part of room air (RA) is heated mainly by passage through the second air heat exchanger (12) and returns into the room. This makes it possible to efficiently provide room heating and humidification. In addition, another part of room air (RA) gives, when it is passing through the first adsorption heat exchanger (13), moisture to the adsorbent.

In the second operation, in each of the three way valves (A1-D2), ports indicated by solid line of FIG. 22(B) are placed in the open state, while a port indicated by broken line of FIG. 22(B) is placed in the closed state. As a result, the second air heat exchanger (12) and the first adsorption heat exchanger (13) operate as heaters, while the first air heat exchanger (11) and the second adsorption heat exchanger (14) operate as coolers. And, a stream of outside air (OA) which has passed through the first air heat exchanger (11) is expelled to the outdoors as exhaust air (EA), while a stream of room air (RA) which has passed through the second air heat exchanger (12) returns into the room as supply air (SA). On the other hand, another stream of outside air (OA) which has passed through the first adsorption heat exchanger (13) is supplied to the room as supply air (SA), while another stream of room air (RA) which has passed through the second adsorption heat exchanger (14) is expelled to the outdoors as exhaust air (EA).

At that time, air latent heat processing is performed mainly in the first adsorption heat exchanger (13), while air sensible heat processing is performed mainly in the second air heat exchanger (12). To sum up, one part of outside air (OA) is humidified mainly by passage through the first adsorption heat exchanger (13) and is then supplied to the room, while one part of room air (RA) is heated mainly by passage through the second air heat exchanger (12) and returns into the room. This makes it possible to efficiently provide room heating and humidification. In addition, another part of room air (RA) regenerates, when it is passing through the second adsorption heat exchanger (14), the adsorbent.

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced.

Variational Example

In the eighth embodiment, the description has been made on the condition that the air conditioning apparatus (10) is of the separate type as in the first to sixth embodiments and the four heat exchangers (11, 12, 13, 14) are divided into the outdoor heat exchanger (43) and the indoor heat exchanger (44). However, it is possible to employ a configuration in which the air conditioning apparatus (10) is of the integral type as in the seventh embodiment in which there is no distinction between the outdoor heat exchanger (43) and the indoor heat exchanger (44).

This is the same as in the following ninth to twelfth embodiments.

Ninth Embodiment of the Invention

As shown in FIGS. 23 and 24, an air conditioning apparatus according to a ninth embodiment of the present invention is an example as a result of modification of the configuration of the cold and hot water circuit (40) of the eighth embodiment.

The cold and hot water circuit (40) of the present embodiment includes a hot water source (41), a cold water source (42), outdoor heat exchangers (43), and indoor heat exchangers (44), wherein the outdoor heat exchangers (43) are made up of the first air heat exchanger (11) and the first adsorption heat exchanger (13), while the indoor heat exchangers (44) are made up of the second air heat exchanger (12) and the second adsorption heat exchanger (14).

In the cold and hot water circuit (40), the first adsorption heat exchanger (13) and the second adsorption heat exchanger (14) are connected in parallel fluid communication with each other, while the first air heat exchanger (11) and the second air heat exchanger (12) are in parallel fluid communication with each other. The first and the second adsorption heat exchangers (13, 14) and the first and the air heat exchangers (11, 12) are connected in parallel fluid communication with the hot water source (41) and the cold water source (42).

The cold and hot water circuit (40) includes, as a first switching mechanism (45) for switching the direction of cold and hot water flow so that hot water flows through one of the first and second adsorption heat exchangers (13, 14) while cold water flows through the other adsorption heat exchanger, a three way valve (A1) connected in fluid communication with one end of the first adsorption heat exchanger (13), a three way valve (A2) connected in fluid communication with the other end of the first adsorption heat exchanger (13), a three way valve (B1) connected in fluid communication with one end of the second adsorption heat exchanger (14), and a three way valve (B2) connected in fluid communication with the other end of the second adsorption heat exchanger (14). In addition, the cold and hot water circuit (40) includes, as a second switching mechanism (46) for switching the direction of cold and hot water flow so that hot water flows through one of the first and second air heat exchangers (11, 12) while cold water flows through the other air heat exchanger, a three way valve (C1) connected in fluid communication with one end of the first air heat exchanger (11), a three way valve (C2) connected in fluid communication with the other end of the first air heat exchanger (11), a three way valve (D1) connected in fluid communication with one end of the second air heat exchanger (12), and a three way valve (D2) connected in fluid communication with the other end of the second air heat exchanger (12).

The three way valve (A1) and the three way valve (B1) are connected in parallel fluid communication with the hot water source (41) at their respective hot water inflow ports (Pi1), while the three way valve (A1) and the three way valve (B1) are connected in parallel fluid communication with the cold water source (42) at their respective cold water inflow ports (Pi2). On the other hand, the three way valve (C1) and the three way valve (D1) are connected in parallel fluid communication with the hot water source (41) at their respective hot water inflow ports (Pi1), while the three way valve (C1) and the three way valve (D1) are connected in parallel fluid communication with the cold water source (42) at their respective cold water inflow ports (Pi2).

The three way valve (A2) and the three way valve (B2) are connected in parallel fluid communication with the hot water source (41) at their respective hot water outflow ports (Po1), while the three way valve (A2) and the three way valve (B2) are connected in parallel fluid communication with the cold water source (42) at their respective cold water outflow ports (Po2). On the other hand, the three way valve (C2) and the three way valve (D2) are connected in parallel fluid communication with the hot water source (41) at their respective hot water outflow ports (Po1), while the three way valve (C2) and the three way valve (D2) are connected in parallel fluid communication with the cold water source (42) at their respective cold water outflow ports (Po2).

Running Operation

Cooling/Dehumidification Operating Mode

During the cooling and dehumidification operating mode, a first operation of FIG. 23(A) and a second operation of FIG. 23(B) are carried out alternately. In the first operation, in each of the three way valves (A1-D2), ports indicated by solid line of FIG. 23(A) are placed in the open state, while a port indicated by broken line of FIG. 23(A) is placed in the closed state, as a result of which the first air heat exchanger (11) and the second adsorption heat exchanger (14) operate as heaters, while the second air heat exchanger (12) and the first adsorption heat exchanger (13) operate coolers. On the other hand, in the second operation, in each of the three way valves (A1-D2), ports indicated by solid line of FIG. 23(B) are placed in the open state, while a port indicated by broken line of FIG. 23(B) is placed in the closed state, as a result of which the first air heat exchanger (11) and the first adsorption heat exchanger (13) operate as heaters, while the second air heat exchanger (12) and the second adsorption heat exchanger (14) operate as coolers.

The above is the same as the eighth embodiment. In addition, the flow of air in the first and second operations during the cooling and dehumidification operating mode is also the same as the eighth embodiment. Therefore, the description of concrete operations is omitted here.

Heating/Humidification Operating Mode

During the heating and humidification operating mode, a first operation of FIG. 24(A) and a second operation of FIG. 24(B) are carried out alternately. In the first operation, in each of the three way valves (A1-D2), ports indicated by solid line of FIG. 24(A) are placed in the open state, while a port indicated by broken line of FIG. 24(A) is placed in the closed state, as a result of which the second air heat exchanger (12) and the second adsorption heat exchanger (14) operate as heaters, while the first air heat exchanger (11) and the first adsorption heat exchanger (13) operate as coolers. On the other hand, in the second operation, in each of the three way valves (A1-D2), ports indicated by solid line of FIG. 24(B) are placed in the open state, while a port indicated by broken line of FIG. 24(B) is placed in the closed state, as a result of which the second air heat exchanger (12) and the first adsorption heat exchanger (13) operate as heaters, while the first air heat exchanger (11) and the second adsorption heat exchanger (14) operate as coolers.

The above is the same as the eighth embodiment. In addition, the flow of air in the first and second operations during the heating and humidification operating mode is also the same as the eighth embodiment. Therefore, in addition to the omission of the description of operations during the cooling and dehumidification operating mode, the description of concrete operations during the heating and humidification operating mode is also omitted here.

In the ninth embodiment, in addition to the effects of the eighth embodiment, it is possible to supply cold water (hot water) to the adsorption heat exchanger (13, 14) and the air heat exchanger (11, 12) at the same temperature, thereby making it possible to increase the amount of sensible heat processing and the amount of latent heat processing.

Tenth Embodiment of the Invention

An air conditioning apparatus (10) according to a tenth embodiment of the present invention is, contrary to the eighth embodiment in which the cold and hot water circuit (40) is a closed-cycle circuit for the circulation of cold and hot water, an example in which the cold and hot water circuit (40) is formed into an open cycle circuit in which cold and hot water is expelled outside, as shown in FIGS. 25 and 26.

In the tenth embodiment, one end of the first air heat exchanger (11) is connected in fluid communication with the three way valve (C1) while the other end thereof is opened. One end of the second air heat exchanger (12) is connected in fluid communication with the three way valve (D1) while the other end thereof is opened. Accordingly, the cold and hot water circuit (40) is a circuit which is configured such that cold and hot water exiting the first air heat exchanger (11) and cold and hot water exiting the second air heat exchanger (12) are returned neither to the hot water source (41) nor to the cold water source (42) but are expelled outside.

Other configurations are the same as the eighth embodiment. In addition, the operation of the present embodiment is the same as the eighth embodiment, with the exception that cold and hot water is not circulated but is discharged outside.

The configuration that the cold and hot water circuit (40) is formed into an open cycle circuit as in the tenth embodiment can be applied to the circuit of the ninth embodiment depicted in FIGS. 23 and 24.

Eleventh Embodiment of the Invention

An air conditioning apparatus (10) according to an eleventh embodiment of the present invention is an example in which, as illustrated in FIGS. 27 and 28, the refrigerant circuit (20) is used in combination with the cold and hot water circuit (40). In the eleventh embodiment, the cold and hot water circuit (40) is connected in fluid communication with two adsorption heat exchangers (i.e., the first adsorption heat exchanger (13) and the second adsorption heat exchanger (14)), while the refrigerant circuit (20) is connected in fluid communication with two air heat exchangers (i.e., the first air heat exchanger (11) and the second air heat exchanger (12)). The outdoor heat exchanger (22) is made up of the first air heat exchanger (11). The indoor heat exchangers (24)(44) are made up of the second air heat exchanger (12), the first adsorption heat exchanger (13), and the second adsorption heat exchanger (14).

The refrigerant circuit (20) is in the form of a closed circuit along which the compressor (21), the first air heat exchanger (11), the expansion valve (23) which is an expansion mechanism, and the second air heat exchanger (12) are fluidly connected. The refrigerant circuit (20) is provided with a four way switching valve (25) as a switching mechanism. In the refrigerant circuit (20), the discharge side of the compressor (21) is connected in fluid communication with a first port (P1) of the four way switching valve (25). A second port (P2) of the four way switching valve (25) is connected in fluid communication with the first air heat exchanger (11), and the expansion valve (23) and the second air heat exchanger (12) are sequentially connected in series fluid communication with the first air heat exchanger (11). The second air heat exchanger (12) is connected in fluid communication with a third port (P3) of the four way switching valve (25), and a fourth port (P4) of the four way switching valve (25) is connected in fluid communication with the suction side of the compressor (21).

The four way switching valve (25) is operative to switch between a first state which allows fluid communication between the first port (P1) and the second port (P2) and fluid communication between the third port (P3) and the fourth port (P4) (as indicated by solid line in FIGS. 27(A) and 27(B)), and a second state which allows fluid communication between the first port (P1) and the third port (P3) and fluid communication between the second port (P2) and the fourth port (P4) (as indicated by solid line in FIGS. 28(A) and 28(B)). By switching of the four way switching valve (25) between the first state and the second state, it becomes possible to reverse the direction of refrigerant flow in the refrigerant circuit (20).

The cold and hot water circuit (40) includes, in addition to the first and second adsorption heat exchangers (13, 14) which are connected in parallel with each other, a hot water source (41) and a cold water source (42). In addition, the cold and hot water circuit (40) includes, as a switching mechanism (45) for switching the direction of cold and hot water flow so that hot water flows through one of the first and second adsorption heat exchangers (13, 14) while cold water flows through the other adsorption heat exchanger, a three way valve (A1) connected in fluid communication with one end of the first adsorption heat exchanger (13), a three way valve (A2) connected in fluid communication with the other end of the first adsorption heat exchanger (13), a three way valve (B1) connected in fluid communication with one end of the second adsorption heat exchanger (14), and a three way valve (B2) connected in fluid communication with the other end of the second adsorption heat exchanger (14).

The three way valve (A1) and the three way valve (B1) are connected in parallel fluid communication with the hot water source (41) at their respective hot water inflow ports (Pi1), while the three way valve (A1) and the three way valve (B1) are connected in parallel fluid communication with the cold water source (42) at their respective cold water inflow ports (Pi2). On the other hand, the three way valve (A2) and the three way valve (B2) are connected in parallel fluid communication with the hot water source (41) at their respective hot water outflow ports (Po1), while the three way valve (A2) and the three way valve (B2) are connected in parallel fluid communication with the cold water source (42) at their respective cold water outflow ports (Po2).

Running Operation

Cooling/Dehumidification Operating Mode

During the cooling and dehumidification operating mode, a first operation of FIG. 27(A) and a second operation of FIG. 27(B) are carried out alternately. In the first operation, in each of the three way valves (A1-D2), ports indicated by solid line of FIG. 27(A) are placed in the open state, while a port indicated by broken line of FIG. 27(A) is placed in the closed state, as a result of which the second adsorption heat exchanger (14) operates as a heater, while the first adsorption heat exchanger (13) operates as a cooler, and the four way switching valve (25) changes state to the first state, as a result of which the first air heat exchanger (11) operates as a condenser, while the second air heat exchanger (12) operates as an evaporator.

On the other hand, in the second operation, in each of the three way valves (A1-D2), ports indicated by solid line of FIG. 27(B) are placed in the open state, while a port indicated by broken line of FIG. 27(B) is placed in the closed state, as a result of which the first adsorption heat exchanger (13) operates as a heater, while the second adsorption heat exchanger (14) operates as a cooler, and the four way switching valve (25) still remains in the first state, as a result of which the first air heat exchanger (11) operates as a condenser, while the second air heat exchanger (12) operates as an evaporator.

The flow of air in the first and second operations during the cooling and dehumidification operating mode is the same as in the eighth to tenth embodiments. Therefore, the description of concrete operations is omitted here.

Heating/Humidification Operating Mode

During the heating and humidification operating mode, a first operation of FIG. 28(A) and a second operation of FIG. 28(B) are carried out alternately. In the first operation, in each of the three way valves (A1-D2), ports indicated by solid line of FIG. 28(A) are placed in the open state, while a port indicated by broken line of FIG. 28(A) is placed in the closed state, as a result of which the second adsorption heat exchanger (14) operates as a heater, while the first adsorption heat exchanger (13) operates as a cooler, and the four way switching valve (25) changes state to the second state, as a result of which the second air heat exchanger (12) operates as a condenser, while the first air heat exchanger (11) operates as an evaporator.

On the other hand, in the second operation, in each of the three way valves (A1-D2), ports indicated by solid line of FIG. 28(B) are placed in the open state, while a port indicated by broken line of FIG. 28(B) is placed in the closed state, as a result of which the first adsorption heat exchanger (13) operates as a heater, while the second adsorption heat exchanger (14) operates as a cooler, and the four way switching valve (25) still remains in the second state, as s result of which the second air heat exchanger (12) operates as a condenser, while the first air heat exchanger (11) operates as an evaporator.

The flow of air in the first and second operations during the heating and humidification operating mode is the same as in the eighth to tenth embodiments. Therefore, in addition to the omission of the description of operations during the cooling and dehumidification operating mode, the description of concrete operations during the heating and humidification operating mode is also omitted here.

Twelfth Embodiment of the Invention

An air conditioning apparatus according to a twelfth embodiment of the present invention is an example in which the refrigerant circuit (20) is used in combination with the cold and hot water circuit (40), as shown in FIGS. 29 and 30. In this example, the refrigerant circuit (20) is connected in fluid communication with two adsorption heat exchangers (i.e., the first adsorption heat exchanger (13) and the second adsorption heat exchanger (14)), while the cold and hot water circuit (40) is connected in fluid communication with two air heat exchangers (i.e., the first air heat exchanger (11) and the second air heat exchanger (12)). In this example, the outdoor heat exchanger (43) is made up of the first air heat exchanger (11). The indoor heat exchangers (24)(44) are made up of the second air heat exchanger (12), the first adsorption heat exchanger (13), and the second adsorption heat exchanger (14).

The refrigerant circuit (20) is in the form of a closed circuit along which the compressor (21), the first adsorption heat exchanger (13), the expansion valve (23) which is an expansion mechanism, and the second adsorption heat exchanger (14) are fluidly connected. The refrigerant circuit (20) is provided with a four way switching valve (25) as a switching mechanism. In the refrigerant circuit (20), the discharge side of the compressor (21) is connected in fluid communication with a first port (P1) of the four way switching valve (25). A second port (P2) of the four way switching valve (25) is connected in fluid communication with the first adsorption heat exchanger (13), and the expansion valve (23) and the second adsorption heat exchanger (14) are sequentially connected in series fluid communication with the first adsorption heat exchanger (13). The second adsorption heat exchanger (14) is connected in fluid communication with a third port (P3) of the four way switching valve (25), and a fourth port (P4) of the four way switching valve (25) is connected in fluid communication with the suction side of the compressor (21).

The four way switching valve (25) is operative to switch between a first state which allows fluid communication between the first port (P1) and the second port (P2) and fluid communication between the third port (P3) and the fourth port (P4) (as indicated by solid line in FIGS. 29(B) and 30(B)), and a second state which allows fluid communication between the first port (P1) and the third port (P3) and fluid communication between the second port (P2) and the fourth port (P4) (as indicated by solid line in FIGS. 29(A) and 30(A)). By switching of the four way switching valve (25) between the first state and the second state, it becomes possible to reverse the direction of refrigerant flow in the refrigerant circuit (20).

The cold and hot water circuit (40) includes, in addition to the first and second air heat exchangers (11, 12) which are connected in parallel with each other, a hot water source (41) and a cold water source (42). In addition, the cold and hot water circuit (40) includes, as a switching mechanism (45) for switching the direction of cold and hot water flow so that hot water flows through one of the first and second air heat exchangers (11, 12) while cold water flows through the other air heat exchanger, a three way valve (A1) connected in fluid communication with one end of the first air heat exchanger (11), a three way valve (A2) connected in fluid communication with the other end of the first air heat exchanger (11), a three way valve (B1) connected in fluid communication with one end of the second air heat exchanger (12), and a three way valve (B2) connected in fluid communication with the other end of the second air heat exchanger (12).

The three way valve (A1) and the three way valve (B1) are connected in parallel fluid communication with the hot water source (41) at their respective hot water inflow ports (Pi1), while the three way valve (A1) and the three way valve (B1) are connected in parallel fluid communication with the cold water source (42) at their respective cold water inflow ports (Pi2). On the other hand, the three way valve (A2) and the three way valve (B2) are connected in parallel fluid communication with the hot water source (41) at their respective hot water outflow ports (Po1), while the three way valve (A2) and the three way valve (B2) are connected in parallel fluid communication with the cold water source (42) at their respective cold water outflow ports (Po2).

Running Operation

Cooling/Dehumidification Operating Mode

During the cooling and dehumidification operating mode, a first operation of FIG. 29(A) and a second operation of FIG. 29(B) are carried out alternately. In the first operation, the four way switching valve (25) changes state to the second state, as a result of which the second adsorption heat exchanger (14) operates as a condenser, while the first adsorption heat exchanger (13) operates as an evaporator, and in each of the three way valves (A1-D2), ports indicated by solid line of FIG. 29(A) are placed in the open state, while a port indicated by broken line of FIG. 29(A) is placed in the closed state, as a result of which the first air heat exchanger (11) operates as a heater, while the second air heat exchanger (12) operates as a cooler.

On the other hand, in the second operation, the four way switching valve (25) changes state to the first state, as a result of which the first adsorption heat exchanger (13) operates as a condenser, while the second adsorption heat exchanger (14) operates as an evaporator, and the state of each of the three way valves (A1-D2) remains unchanged, as a result of which the first air heat exchanger (11) operates as a heater, while the second air heat exchanger (12) operates as a cooler.

The flow of air in the first and second operations during the cooling and dehumidification operating mode is the same as in the eleventh embodiment. Therefore, the description of concrete operations is omitted here.

Heating/Humidification Operating Mode

During the heating and humidification operating mode, a first operation of FIG. 30(A) and a second operation of FIG. 30(B) are carried out alternately. In the first operation, the four way switching valve (25) changes state to the second state, as a result of which the second adsorption heat exchanger (14) operates as a condenser, while the first adsorption heat exchanger (13) operates as an evaporator, and in each of the three way valves (A1-D2), ports indicated by solid line of FIG. 30(A) are placed in the open state, while a port indicated by broken line of FIG. 30(A) is placed in the closed state, as a result of which the second air heat exchanger (12) operates as a heater, while the first air heat exchanger (11) operates as a cooler.

On the other hand, in the second operation, the four way switching valve (25) changes state to the first state, as a result of which the first adsorption heat exchanger (13) operates as a condenser, while the second adsorption heat exchanger (14) operates as an evaporator, and the state of each of the three way valves (A1-D2) remains unchanged, as a result of which the second air heat exchanger (12) operates as a heater, while the first air heat exchanger (11) operates as a cooler.

The flow of air in the first and second operations during the heating and humidification operating mode is the same as in the eleventh embodiment. Therefore, in addition to the omission of the description of operations during the cooling and dehumidification operating mode, the description of concrete operations during the heating and humidification operating mode is also omitted here.

Thirteenth Embodiment of the Invention

As illustrated in FIGS. 31 and 32, an air conditioning apparatus (10) according to a thirteenth embodiment of the present invention is identical in refrigerant circuitry with the fourth to sixth embodiments. Accordingly, the configuration of the refrigerant circuit is not described in detail here. This apparatus is of an air ventilation type in which the amount of air which is supplied to an indoor space is in balance with the amount of air which is expelled to the outdoors.

The air conditioning apparatus (10) of the present embodiment is provided with a heat exchange element (50) for effecting heat exchange between first air and second air. The heat exchange element (50) is disposed so as to extend over a distribution passageway for the distribution of first air and a distribution passageway for the distribution of second air, and is made up of a rotatable sensible heat exchanger of the rotary type.

In the present embodiment, both during the cooling operating mode and during the heating operating mode, a stream of first air passing through the heat exchange element (50) is an airstream for adsorption prior to passage through the adsorption heat exchanger (13, 14) and a stream of second air passing through the heat exchange element (50) is an airstream for regeneration prior to passage through the adsorption heat exchanger (13, 14). And heat exchange takes place between first air and second air in the heat exchange element (50), and the first air is cooled, while the second air is heated. During the cooling operating mode, the first air is outside air (OA) while the second air is room air (RA). During the heating operating mode, the first air is room air (RA) while the second air is outside air (OA).

Figure 33:
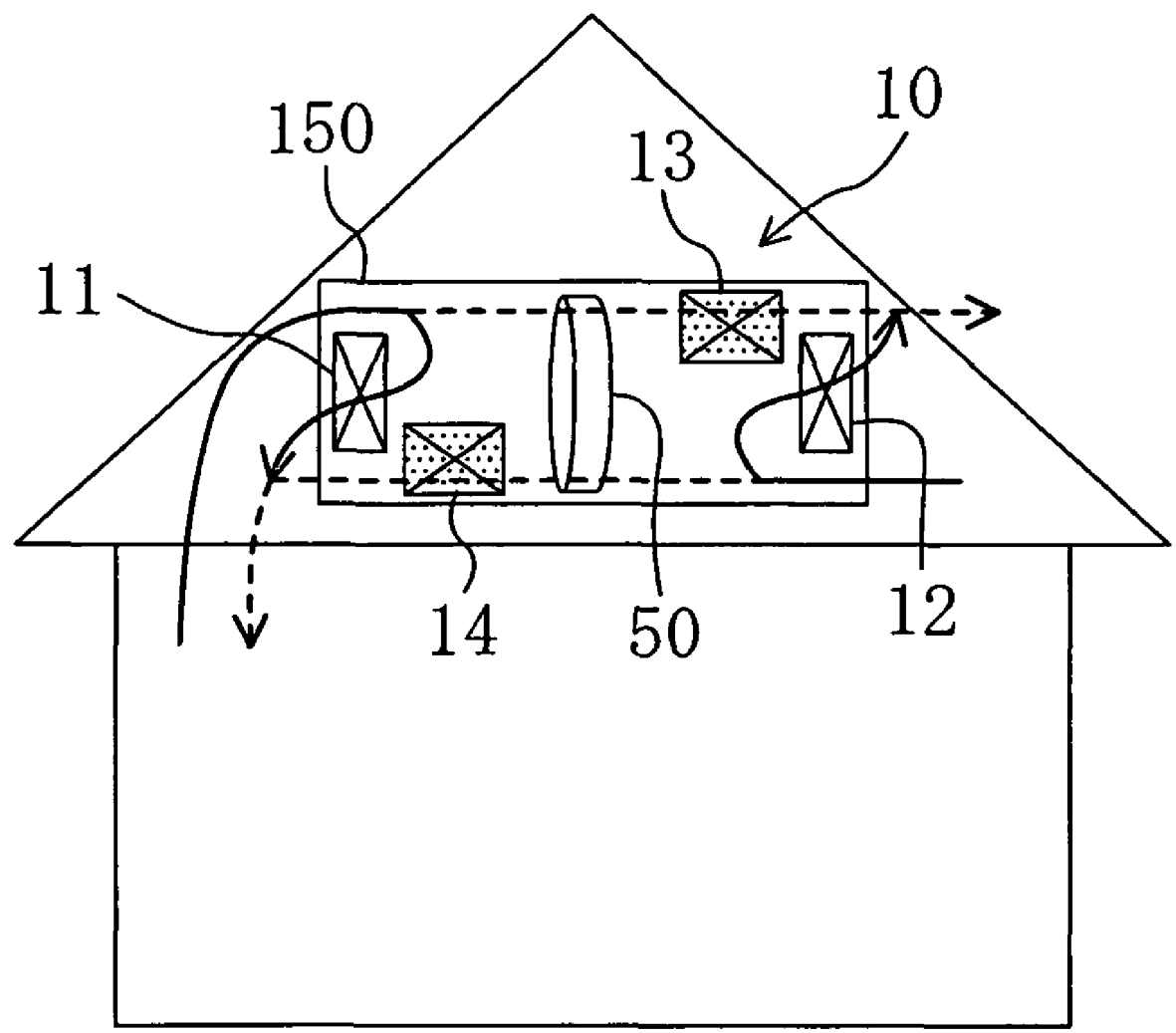
FIG. 33 is a conceptual diagram which shows an installation state of the air conditioning apparatus of the thirteenth embodiment as well as depicting air flow during operation.
Figure 34:
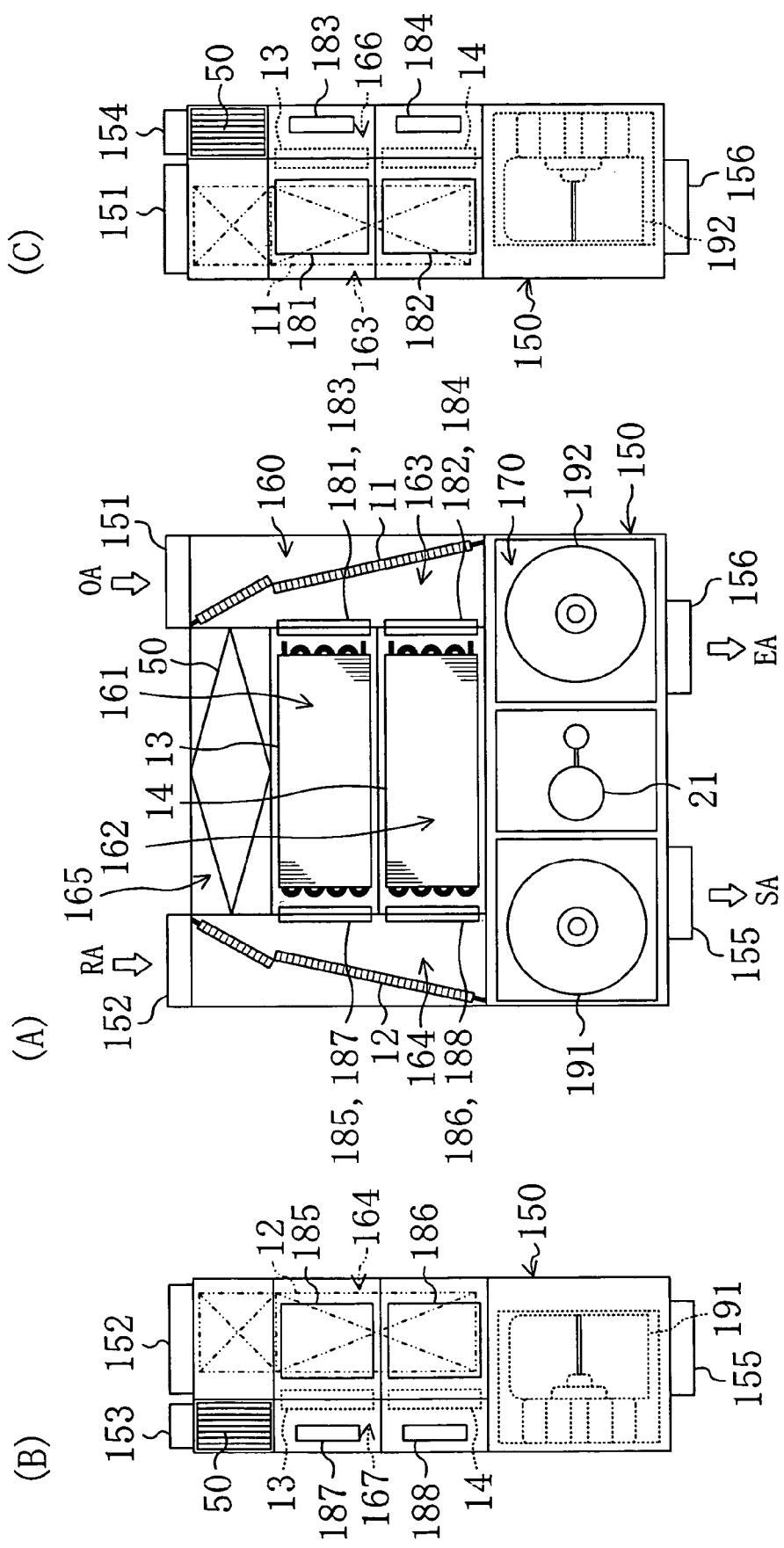
FIG. 34 is a diagram which shows an arrangement of the air conditioning apparatus of the thirteenth embodiment.

Making reference now to FIGS. 33 and 34, the configuration of the air conditioning apparatus (10) is more specifically described. FIG. 33 is a conceptual diagram which illustrates an installation state of the air conditioning apparatus (10) as well as depicting air flow during operation. FIG. 34(A) is a constructional diagram when viewed from above. FIG. 34(B) is a constructional diagram when viewed from the left-hand side. FIG. 34(C) is a constructional diagram when viewed from the right-hand side. The air conditioning apparatus (10) includes a single casing (150) which accommodates therein two air heat exchangers (11, 12) and two adsorption heat exchangers (13, 14), and is installed as an integral type under the roof. In the circuitry of FIGS. 31 and 32 as well as in the installation diagram of FIG. 33, a rotary sensible heat exchanger is shown as the heat exchange element (50); however, the apparatus constructional diagram of FIG. 34 shows a sensible heat exchanger (a sensible heat exchanger of a so-called cross-flow type) in which first and second airstreams flow crosswise. Accordingly, the heat exchange element (50) may be of the rotary type or of the cross-flow type.

The casing (150) of the air conditioning apparatus (10) is shaped like a rectangular box. One of a pair of end surfaces of the casing (150), i.e., an upper end surface in the figure, is provided with a first suction opening (151) through which one part of outside air (OA) is drawn into the casing (150), a second suction opening (152) through which one part of room air (RA) is drawn into the casing (150), a third suction opening (153) through which the other part of the outside air (OA) is drawn into the casing (150), and a fourth suction opening (154) through which the other part of the room air (RA) is drawn into the casing (150). On the other hand, the other end surface of the casing (150), i.e., a lower end surface in the figure, is provided with a first blowout opening (155) through which supply air (SA) is supplied to the room, and a second blowout opening (156) through which exhaust air (EA) is expelled to the outdoors. The first suction opening (151), the second suction opening (152), the third suction opening (153), the fourth suction opening (154), the first blowout opening (155), and the second blowout opening (156) are connected, respectively, to ducts.

The inside of the casing (150) is divided into a heat exchange chamber (160) in which the air heat exchangers (11, 12), the adsorption heat exchangers (13, 14), and the heat exchange element (50) are disposed, and a machine chamber (170) in which mechanical components such as the fans (191, 192), the compressor (21) et cetera are disposed.

The heat exchange chamber (160) is divided, in the horizontal direction of the casing (150) in the figure, into three sections. More specifically, an adsorption heat exchanger chamber (161, 162) and a heat exchange element chamber (165) are formed in the center section. A first air heat exchanger chamber (163) is formed on one side of the center section, while a second air heat exchanger chamber (164) is formed on the other side of the center section. The heat exchange chamber (160) is divided into two spaces in its height direction (i.e., in the horizontal direction in FIGS. 34(B) and 34(C)).

The heat exchange element chamber (165) and the adsorption heat exchanger chamber (161, 162) are zoned in the cross direction of the casing (150), i.e. in the vertically direction in the figure. The adsorption heat exchanger chamber (161, 162) is further divided in the cross direction of the casing (150) into two sections, i.e., a first adsorption heat exchanger chamber (161) and a second adsorption heat exchanger chamber (162).

The heat exchange element chamber (165) is formed in a heightwise lower part in the casing (150), and the heat exchange element (50) is disposed within the heat exchange element chamber (165). In addition, the upper space of the heat exchange element chamber (165) is a closed space.

The first air heat exchanger chamber (163) and the second air heat exchanger chamber (164) are formed in a heightwise upper part in the casing (150). A first air passageway (166) is formed in a lower space of the first air heat exchanger chamber (163). A second air passageway (167) is formed in a lower space of the second air heat exchanger chamber (164). The first air heat exchanger (11) is disposed in the first air heat exchanger chamber (163), while the second air heat exchanger (12) is disposed in the second air heat exchanger chamber (164).

The adsorption heat exchanger chambers (161, 162) are each divided into two spaces (upper and lower spaces) in their height direction, as described above. The first adsorption heat exchanger (13) lies between the upper and lower spaces of the first adsorption heat exchanger chamber (161), while the second adsorption heat exchanger (14) lies between the upper and lower spaces of the second adsorption heat exchanger chamber (162).

The first air heat exchanger chamber (163) is connected in fluid communication with the first suction opening (151). The second air heat exchanger chamber (164) is connected in fluid communication with the second suction opening (152). The first air passageway (166) is in fluid communication with the third suction opening (153) by way of the heat exchange element (50) of the heat exchange element chamber (165). The second air passageway (167) is in fluid communication with the fourth suction opening (154) by way of the heat exchange element (50) of the heat exchange element chamber (165).

A first damper (181) is disposed in the first air heat exchanger chamber (163) such that it lies between the first air heat exchanger chamber (163) and the first adsorption heat exchanger chamber (161). A second damper (182) is disposed in the first air heat exchanger chamber (163) such that it lies between the first air heat exchanger chamber (163) and the second adsorption heat exchanger chamber (162). A third damper (183) is disposed in the first air passage (166) such that it lies between the first air passage (166) and the first adsorption heat exchanger chamber (161). A fourth damper (184) is disposed in the first air passage (166) such that it lies between the first air passage (166) and the second adsorption heat exchanger chamber (162).

A fifth damper (185) is disposed in the second air heat exchanger chamber (164) such that it lies between the second air heat exchanger chamber (164) and the first adsorption heat exchanger chamber (161). A sixth damper (186) is disposed in the second air heat exchanger chamber (164) such that it lies between the second air heat exchanger chamber (164) and the second adsorption heat exchanger chamber (162). A seventh damper (187) is disposed in the second air passage (167) such that it lies between the second air passage (167) and the first adsorption heat exchanger chamber (161). An eighth damper (188) is disposed in the second air passage (167) such that it lies between the second air passage (167) and the second adsorption heat exchanger chamber (162).

The compressor (21) is positioned centrally in the machine chamber (170) of the casing (170). The first fan (191) and the second fan (192) are disposed, respectively, on both sides of the compressor (21). The first fan (191) is in fluid communication with the first blowout opening (155) and the second air heat exchanger chamber (164). The second fan (192) is in fluid communication with the second blowout opening (156) and the first air heat exchanger chamber (163).

Running Operation

The running operation of the air conditioning apparatus (10) is now described below. Since the flow of refrigerant in the refrigerant circuit is the same as in the fourth to sixth embodiments, the flow of air is mainly described here.

Cooling/Dehumidification Operating Mode

During the cooling and dehumidification operating mode, a first operation of FIG. 31(A) and a second operation of FIG. 31(B) are carried out alternately. In the first operation, the first air heat exchanger (11) and the first adsorption heat exchanger (13) operate as condensers, while the second air heat exchanger (12) and the second adsorption heat exchanger (14) operate as evaporators. In addition, the first damper (181), the fourth damper (184), the sixth damper (186), and the seventh damper (187) are placed in the open state, while the second damper (182), the third damper (183), the fifth damper (185), and the eighth damper (188) are placed in the closed state.

In this state, one part of outside air (OA) drawn into the casing (150) from the first suction opening (151) passes through the first air heat exchanger (11) in the first air heat exchanger chamber (163) and is then expelled to the outdoors from the second blowout opening (156) by way of the second fan (192). On the other hand, the rest of the outside air (OA) drawn into the casing (150) from the third suction opening (153) passes through the heat exchange element (50), flows into the first air passageway (166), enters the second adsorption heat exchanger chamber (162), is dehumidified in the second adsorption heat exchanger (14), flows out to the second air heat exchanger chamber (164), and is supplied into the room from the first blowout opening (155) by way of the first fan (191).

On the other hand, one part of room air (RA) drawn into the casing (150) from the second suction opening (152) is cooled by passage through the second air heat exchanger (12) in the second air heat exchanger chamber (164) and is then supplied into the room from the first blowout opening (155) by way of the first fan (191). On the other hand, the rest of the room air (RA) drawn into the casing (150) from the fourth suction opening (154) passes through the heat exchange element (50), flows into the second air passageway (167), enters the first adsorption heat exchanger chamber (161), regenerates the first adsorption heat exchanger (13), flows out to the first air heat exchanger chamber (163), and is then expelled to the outdoors from the second blowout opening (156) by way of the second fan (192).

As described above, a stream of outside air (OA) which has passed through the first air heat exchanger (11) is expelled to the outdoors as exhaust air (EA), while a stream of room air (RA) which has passed through the second air heat exchanger (12) returns into the room as supply air (SA). In addition, in the heat exchange element (50), outside air (OA) as first air is cooled by room air (RA) as second air, while room air (RA) is heated by outside air (OA). And the outside air (OA) cooled in the heat exchange element (50) is dehumidified when it is passing through the second adsorption heat exchanger (14) and is then supplied to the room. On the other hand, the room air (RA) heated in the heat exchange element (50) regenerates the adsorbent when it is passing through the first adsorption heat exchanger (13) and is then expelled to the outdoors.

In the first operation, indoor latent heat processing is performed mainly in the second adsorption heat exchanger (14), while indoor sensible heat processing is performed mainly in the second air heat exchanger (12). To sum up, one part of outside air (OA) is dehumidified mainly by passage through the second adsorption heat exchanger (14) and is then supplied to the room, while one part of room air (RA) is cooled mainly by passage through the second air heat exchanger (12) and returns into the room. This makes it possible to efficiently provide cooling and dehumidification.

Next, in the second operation, the first air heat exchanger (11) and the second adsorption heat exchanger (14) operate as condensers, while the second air heat exchanger (12) and the first adsorption heat exchanger (13) operate as evaporators. In addition, the second damper (182), the third damper (183), the fifth damper (185), and the eighth damper (188) are placed in the open state, while the first damper (181), the fourth damper (184), the sixth damper (186), and the seventh damper (187) are placed in the closed state.

In this state, one part of outside air (OA) drawn into the casing (150) from the first suction opening (151) passes through the first air heat exchanger (11) in the first air heat exchanger chamber (163) and is then expelled to the outdoors from the second blowout opening (156) by way of the second fan (192). On the other hand, the rest of the outside air (OA) drawn into the casing (150) from the third suction opening (153) passes through the heat exchange element (50), flows into the first air passageway (166), enters the first adsorption heat exchanger chamber (161), is dehumidified in the first adsorption heat exchanger (13), flows out to the second air heat exchanger chamber (164), and is supplied into the room from the first blowout opening (155) by way of the first fan (191).

On the other hand, one part of room air (RA) drawn into the casing (150) from the second suction opening (152) is cooled by passage through the second air heat exchanger (12) in the second air heat exchanger chamber (164) and is then supplied into the room from the first blowout opening (155) by way of the first fan (191). On the other hand, the rest of the room air (RA) drawn into the casing (150) from the fourth suction opening (154) passes through the heat exchange element (50), flows into the second air passageway (167), enters the second adsorption heat exchanger chamber (162), regenerates the second adsorption heat exchanger (14), flows out to the first air heat exchanger chamber (163), and is then expelled to the outdoors from the second blowout opening (156) by way of the second fan (192).

As described above, a stream of outside air (OA) which has passed through the first air heat exchanger (11) is expelled to the outdoors as exhaust air (EA), while a stream of room air (RA) which has passed through the second air heat exchanger (12) returns into the room as supply air (SA). In addition, in the heat exchange element (50), outside air (OA) as first air is cooled by room air (RA) as second air, while room air (RA) is heated by outside air (OA). And the outside air (OA) cooled in the heat exchange element (50) is dehumidified when it is passing through the first adsorption heat exchanger (13) and is then supplied to the room. On the other hand, the room air (RA) heated in the heat exchange element (50) regenerates the adsorbent when it is passing through the second adsorption heat exchanger (14) and is then expelled to the outdoors.

In the second operation, indoor latent heat processing is performed mainly in the first adsorption heat exchanger (13), while indoor sensible heat processing is performed mainly in the second air heat exchanger (12). To sum up, one part of outside air (OA) is dehumidified mainly by passage through the first adsorption heat exchanger (13) and is then supplied to the room, while one part of room air (RA) is cooled mainly by passage through the second air heat exchanger (12) and returns into the room. This makes it possible to efficiently provide room cooling and dehumidification.

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced.

Heating/Humidification Operating Mode

During the heating and humidification operating mode, a first operation of FIG. 32(A) and a second operation of FIG. 32(B) are carried out alternately. In the first operation, the second air heat exchanger (12) and the second adsorption heat exchanger (14) operate as condensers, while the first air heat exchanger (11) and the first adsorption heat exchanger (13) operate as evaporators. In addition, the first damper (181), the fourth damper (184), the sixth damper (186), and the seventh damper (187) are placed in the open state, while the second damper (182), the third damper (183), the fifth damper (185), and the eighth damper (188) are placed in the closed state.

In this state, one part of outside air (OA) drawn into the casing (150) from the first suction opening (151) passes through the first air heat exchanger (11) in the first air heat exchanger chamber (163) and is then expelled to the outdoors from the second blowout opening (156) by way of the second fan (192). On the other hand, the rest of the outside air (OA) drawn into the casing (150) from the third suction opening (153) passes through the heat exchange element (50), flows into the first air passageway (166), enters the second adsorption heat exchanger chamber (162), is humidified in the second adsorption heat exchanger (14), flows out to the second air heat exchanger chamber (164), and is supplied into the room from the first blowout opening (155) by way of the first fan (191).

On the other hand, one part of room air (RA) drawn into the casing (150) from the second suction opening (152) is heated by passage through the second air heat exchanger (12) in the second air heat exchanger chamber (164) and is then supplied into the room from the first blowout opening (155) by way of the first fan (191). On the other hand, the rest of the room air (RA) drawn into the casing (150) from the fourth suction opening (154) passes through the heat exchange element (50), flows into the second air passageway (167), enters the first adsorption heat exchanger chamber (161), gives moisture to the first adsorption heat exchanger (13), flows out to the first air heat exchanger chamber (163), and is then expelled to the outdoors from the second blowout opening (156) by way of the second fan (192).

As described above, a stream of outside air (OA) which has passed through the first air heat exchanger (11) is expelled to the outdoors as exhaust air (EA), while a stream of room air (RA) which has passed through the second air heat exchanger (12) returns into the room as supply air (SA). In addition, in the heat exchange element (50), outside air (OA) as second air is heated by room air (RA) as first air, while room air (RA) is cooled by outside air (OA). And the outside air (OA) heated in the heat exchange element (50) is humidified when it is passing through the second adsorption heat exchanger (14) and is then supplied to the room. On the other hand, the room air (RA) cooled in the heat exchange element (50) gives moisture to the adsorbent when it is passing through the first adsorption heat exchanger (13) and is then expelled to the outdoors.

In the first operation, indoor latent heat processing is performed mainly in the second adsorption heat exchanger (14), while indoor sensible heat processing is performed mainly in the second air heat exchanger (12). To sum up, one part of outside air (OA) is humidified mainly by passage through the second adsorption heat exchanger (14) and is then supplied to the room, while one part of room air (RA) is heated mainly by passage through the second air heat exchanger (12) and returns into the room. This makes it possible to efficiently provide room heating and humidification.

Next, in the second operation, the second air heat exchanger (12) and the first adsorption heat exchanger (13) operate as condensers, while the first air heat exchanger (11) and the second adsorption heat exchanger (14) operate as evaporators. In addition, the second damper (182), the third damper (183), the fifth damper (185), and the eighth damper (188) are placed in the open state, while the first damper (181), the fourth damper (184), the sixth damper (186), and the seventh damper (187) are placed in the closed state.

In this state, one part of outside air (OA) drawn into the casing (150) from the first suction opening (151) passes through the first air heat exchanger (11) in the first air heat exchanger chamber (163) and is then expelled to the outdoors from the second blowout opening (156) by way of the second fan (192). On the other hand, the rest of the outside air (OA) drawn into the casing (150) from the third suction opening (153) passes through the heat exchange element (50), flows into the first air passageway (166), enters the first adsorption heat exchanger chamber (161), is humidified in the first adsorption heat exchanger (13), flows out to the second air heat exchanger chamber (164), and is supplied into the room from the first blowout opening (155) by way of the first fan (191).

On the other hand, one part of room air (RA) drawn into the casing (150) from the second suction opening (152) is heated by passage through the second air heat exchanger (12) in the second air heat exchanger chamber (164) and is then supplied into the room from the first blowout opening (155) by way of the first fan (191). On the other hand, the rest of the room air (RA) drawn into the casing (150) from the fourth suction opening (154) passes through the heat exchange element (50), flows into the second air passageway (167), enters the second adsorption heat exchanger chamber (162), gives moisture to the second adsorption heat exchanger (14), flows out to the first air heat exchanger chamber (163), and is then expelled to the outdoors from the second blowout opening (156) by way of the second fan (192).

As described above, a stream of outside air (OA) which has passed through the first air heat exchanger (11) is expelled to the outdoors as exhaust air (EA), while a stream of room air (RA) which has passed through the second air heat exchanger (12) returns into the room as supply air (SA). In addition, in the heat exchange element (50), outside air (OA) as second air is heated by room air (RA) as first air, while room air (RA) is cooled by outside air (OA). And the outside air (OA) heated in the heat exchange element (50) is humidified when it is passing through the first adsorption heat exchanger (13) and is then supplied to the room. On the other hand, the room air (RA) cooled in the heat exchange element (50) gives moisture to the adsorbent when it is passing through the second adsorption heat exchanger (14) and is then expelled to the outdoors.

In the second operation, indoor latent heat processing is performed mainly in the first adsorption heat exchanger (13), while indoor sensible heat processing is performed mainly in the second air heat exchanger (12). To sum up, one part of outside air (OA) is humidified mainly by passage through the first adsorption heat exchanger (13) and is then supplied to the room, while one part of room air (RA) is heated mainly by passage through the second air heat exchanger (12) and returns into the room. This makes it possible to efficiently provide room heating and humidification. In addition, another part of the room air (RA) gives moisture to the adsorbent when it is passing through the second adsorption heat exchanger (14).

By alternate repetition of the first operation and the second operation in the way described above, it becomes possible to continuously perform indoor latent heat load processing while continuously performing also indoor sensible heat load processing. Also at this time, switching between the first operation and the second operation is made at time intervals depending on the indoor latent heat load.

As just described, the present invention is applicable in the air conditioning apparatus (10) of the air ventilation fan type. Also in this case, it is possible to obtain the same effects that each of the aforesaid embodiments provides.

Variational Examples

In the thirteenth embodiment, the description has been made in terms of the apparatus of the integral type in which the four heat exchangers (11, 12, 13, 14) and the single heat exchange element (50) are housed in the single casing. However, the air conditioning apparatus (10) may be in the form of a separate type as illustrated in FIG. 35.

Figure 35:
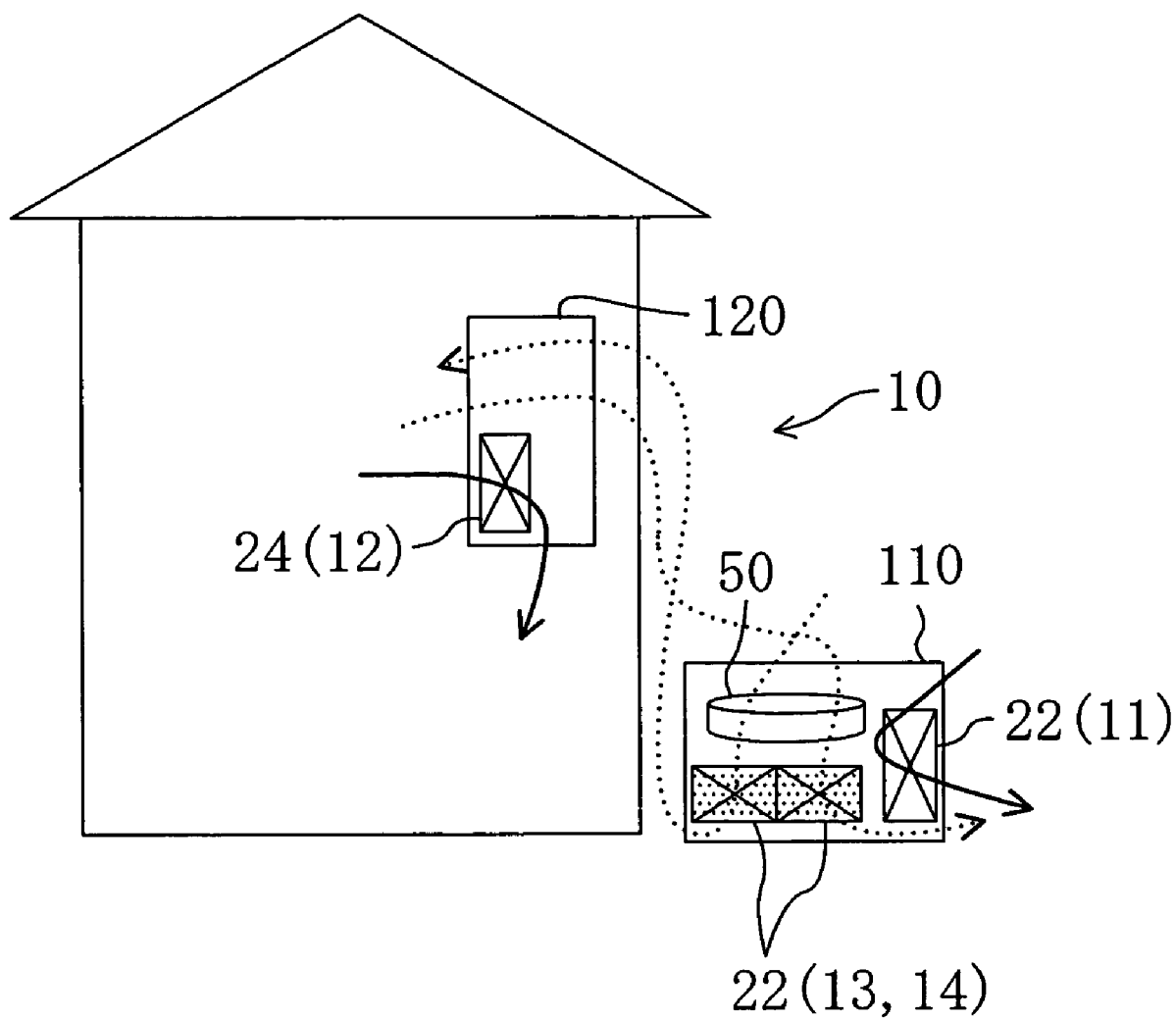
FIG. 35 is a conceptual diagram which shows an installation state of an variational example of the air conditioning apparatus of the thirteenth embodiment as well as depicting air flow during operation.

The air conditioning apparatus (10) of FIG. 35 is made up of an outdoor unit (110) and an indoor unit (120), wherein these units (110, 120) are fluidly connected together by an interunit line (not diagrammatically shown) to form the refrigerant circuit (20). The outdoor unit (110) houses therein the first air heat exchanger (11), the first adsorption heat exchanger (13), the second adsorption heat exchanger (14), and the heat exchange element (50). The indoor unit (120) houses therein the second air heat exchanger (12). Even when employing such a configuration, it is possible to perform the same operations as described with reference to FIGS. 31 through 34, and the same effects are obtained.

In addition, in the thirteenth embodiment, the description has been made in terms of an example of incorporating the heat exchange element (50) into the apparatus of the fourth to sixth embodiments. Alternatively, the heat exchange element (50) may be incorporated into the apparatus of the first to third and seventh to twelfth embodiments.

Furthermore, the heat exchange element (50) is not limited to a sensible heat exchanger. The heat exchange element (50) may be a total heat exchanger. A total heat exchanger is a heat exchanger capable of effecting not only sensible heat exchange between the first air and the second air but also latent heat exchange between the first air and the second air. Consequently, if the humidity of first air is higher than the humidity of second air, moisture in the first air is absorbed into the second air by the total heat exchanger. Accordingly, when the first air is supplied into the room during the dehumidification operating mode, this makes it possible to enhance the air conditioning apparatus (10) in dehumidification capability. In addition, if the humidity of first air is higher than the humidity of second air, moisture in the first air is given to the second air by the total heat exchanger. Accordingly, when the second air is supplied into the room during the humidification operating mode, this makes it possible to enhance the air conditioning apparatus (10) in humidification capability.

Fourteenth Embodiment

As shown in FIGS. 36 and 37, an air conditioning apparatus (10) according to a fourteenth embodiment of the present invention is identical in refrigerant circuitry with the third embodiment. Accordingly, the description of its specific configuration is omitted. In addition, this apparatus is in the form of an air exhaust fan type.

The air conditioning apparatus (10) of the fourteenth embodiment includes a latent heat processing element (60) capable of performing latent heat processing of adsorption air and regeneration air. The latent heat processing element (60) is made up of a rotatable adsorptive rotor (60) which is positioned so as to extend over a distribution passageway for adsorption air and a distribution passageway for regeneration air. The adsorptive rotor (60) is positioned upstream of the adsorption heat exchangers (13, 14) in the adsorption air distribution passageway while on the other hand it is positioned downstream of the adsorption heat exchangers (13, 14) in the regeneration air distribution passageway.

The adsorptive rotor (60) is made up of a perforated substrate shaped like a circular plate, such as a honeycomb structure, and an adsorbent supported on the substrate. The adsorptive rotor (60) is capable of performing air latent heat processing by adsorption/desorption of moisture with the adsorbent. As the adsorbent used in the adsorptive rotor (50), the same material as the adsorbent used in the adsorption heat exchangers (13, 14) may be employed.

In the present embodiment, a stream of adsorption air which passes through the adsorptive rotor (60) is a stream of room air (RA) prior to passing through one of the adsorption heat exchangers (13, 14), while a stream of regeneration air which passes through the adsorptive rotor (60) is a stream of room air (RA) after passage through the other of the adsorption heat exchangers (13, 14). In addition, both during the cooling operating mode and during the heating operating mode, the comparison between adsorption air and regeneration air in the adsorptive rotor (60) shows that the former is lower in temperature but higher in relative humidity while the latter is higher in temperature but lower in relative humidity. Consequently, the adsorption air is dehumidified while the regeneration air is moistened.

Instead of using such an adsorptive rotor, the latent heat processing element (60) may be made up of two adsorptive elements (a first adsorptive element and a second adsorptive element), wherein the distribution passageway of air and the direction of refrigerant flow in the refrigerant circuit are changed so that an operation in which moisture in adsorption air is adsorbed by the first adsorptive element and, at the same time, the second adsorptive element is regenerated by regeneration air, and an operation in which the first adsorptive element is regenerated by regeneration air and, at the same time, moisture in adsorption air is adsorbed by the second adsorptive element are carried out alternately.

In addition, it may be arranged such that each of the two adsorptive elements is made up of an adsorptive cooling element which is provided with a cooling passageway for the flow of cooling air which absorbs heat of absorption at the time of moisture adsorption.

Running Operation

In the following, the running operation of the air conditioning apparatus (10) is described. Since the flow of refrigerant in the refrigerant circuit is the same as in the third embodiment, the flow of air is mainly described here.

Cooling/Dehumidification Operating Mode

During the cooling and dehumidification operating mode, a first operation of FIG. 36(A) and a second operation of FIG. 36(B) are carried out alternately.

In the first operation, the first air heat exchanger (11) and the first adsorption heat exchanger (13) operate as condensers, while the second adsorption heat exchanger (14) and the second air heat exchanger (12) operate as evaporators. And indoor latent heat processing is performed in the second adsorption heat exchanger (14), while indoor sensible heat processing is performed in the second air heat exchanger (12). In other words, one part of room air (RA) (adsorption air) is dehumidified (latent heat-processed) by moisture adsorption by the adsorbent when passing through the second adsorption heat exchanger (14) and returns into the room while the other part is cooled (sensible heat-processed) when passing through the second air heat exchanger (12) and returns into the room. This makes it possible to efficiently provide room cooling and dehumidification.

In the first adsorption heat exchanger (13), by the passage of the other part of the room air (RA) (regeneration air) therethrough, the adsorbent is regenerated. On the other hand, the outside air (OA) exchanges heat with the refrigerant when passing through the first air heat exchanger (11) and is then expelled to the outdoors as exhaust air (EA).

On the other hand, in the adsorptive rotor (60), adsorption air of low temperature and high relative humidity is dehumidified, while regeneration air of high temperature and low relative humidity is humidified. Consequently, the adsorption air is two-stage dehumidified in the adsorptive rotor (60) and in the second adsorption heat exchanger (14), and is then supplied to the room. On the other hand, the regeneration air twice performs adsorbent regeneration in the first adsorption heat exchanger (13) and in the adsorptive rotor (60) and is then expelled to outside the room.

On the other hand, in the second operation, the first air heat exchanger (11) and the second adsorption heat exchanger (14) operate as condensers, while the first adsorption heat exchanger (13) and the second air heat exchanger (12) operate as evaporators. And, indoor latent heat processing is carried out in the first adsorption heat exchanger (13), while indoor sensible heat processing is carried out in the second air heat exchanger (12). In other words, one part of room air (RA) (adsorption air) is dehumidified (latent heat-processed) by moisture adsorption by the adsorbent when passing through the first adsorption heat exchanger (13) and returns into the room, while the other part is cooled (sensible heat-processed) when passing through the second air heat exchanger (12) and returns into the room. This makes it possible to efficiently provide room cooling and dehumidification.

In the second adsorption heat exchanger (14), by the passage of the other part of the room air (RA) (regeneration air) therethrough, the adsorbent is regenerated. On the other hand, the outside air (OA) exchanges heat with the refrigerant when passing through the first air heat exchanger (11) and is then expelled to the outdoors as exhaust air (EA).

On the other hand, in the adsorptive rotor (60), adsorption air of low temperature and high relative humidity is dehumidified, while regeneration air of high temperature and low relative humidity is humidified. Consequently, the adsorption air is two-stage dehumidified in the adsorptive rotor (60) and in the first adsorption heat exchanger (13) and is then supplied to the room. On the other hand, the regeneration air twice performs adsorbent regeneration in the second adsorption heat exchanger (14) and in the adsorptive rotor (60) and is then expelled to outside the room.

By alternate repetition of the first operation and the second operation in the way described above, it becomes possible to continuously perform indoor latent heat load processing while continuously performing also indoor sensible heat load processing. Also at this time, as the indoor latent heat load increases, the time interval, at which switching between the first operation and the second operation is made, is reduced. Consequently, when the indoor latent heat load is large, the frequency of switching is increased to thereby increase the amount of dehumidification for enhancing room comfort. On the other hand, when the indoor latent heat load is small, the frequency of switching is decreased to thereby reduce the amount of dehumidification for enhancing energy-savings.

Heating/Humidification Operating Mode

During the heating and humidification operating mode, a first operation of FIG. 37(A) and a second operation of FIG. 37(B) are carried out alternately.

In the first operation, the second air heat exchanger (12) and the second adsorption heat exchanger (14) operate as condensers, while the first adsorption heat exchanger (13) and the first air heat exchanger (11) operate as evaporators. And, indoor latent heat processing is carried out in the second adsorption heat exchanger (14), while indoor sensible heat processing is carried out in the second air heat exchanger (12). In other words, one part of room air (RA) (regeneration air) is humidified (latent heat-processed) by adsorbent regeneration when passing through the second adsorption heat exchanger (14) and returns into the room, while the other part is heated (sensible heat-processed) when passing through the second air heat exchanger (12) and returns into the room. This makes it possible to efficiently provide room heating and humidification.

In the first adsorption heat exchanger (13), by the passage of the other part of the room air (RA) (adsorption air) therethrough, the adsorbent is given moisture. On the other hand, the outside air (OA) exchanges heat with the refrigerant when passing through the first air heat exchanger (11) and is then expelled to the outdoors as exhaust air (EA).

On the other hand, in the adsorptive rotor (60), regeneration air of high temperature and low relative humidity is humidified, while adsorption air of low temperature and high relative humidity is dehumidified. Consequently, the regeneration air is two-stage humidified in the adsorptive rotor (60) and in the second adsorption heat exchanger (14)) and is then supplied to the room. On the other hand, the adsorption air twice undergoes moisture absorption in the adsorptive rotor (60) and in the first adsorption heat exchanger (13) and is then expelled to outside the room.

On the other hand, in the second operation, the second air heat exchanger (12) and the first adsorption heat exchanger (13) operate as condensers, while the second adsorption heat exchanger (14) and the first air heat exchanger (11) operate as evaporators. And, indoor latent heat processing is carried out in the first adsorption heat exchanger (13), while indoor sensible heat processing is carried out in the second air heat exchanger (12). In other words, one part of room air (RA) (regeneration air) is humidified (latent heat-processed) by adsorbent regeneration when passing through the first adsorption heat exchanger (13) and returns into the room, while the other part is heated (sensible heat-processed) when passing through the second air heat exchanger (12) and returns into the room. This makes it possible to efficiently provide room heating and humidification.

In the second adsorption heat exchanger (14), by the passage of the other part of the room air (RA) (adsorption air) therethrough, the adsorbent is given moisture. On the other hand, the outside air (OA) exchanges heat with the refrigerant when passing through the first air heat exchanger (11) and is then expelled to the outdoors as exhaust air (EA).

On the other hand, in the adsorptive rotor (60), regeneration air of high temperature and low relative humidity is humidified, while adsorption air of low temperature and high relative humidity is dehumidified. Consequently, the regeneration air is two stage-humidified in the first adsorption heat exchanger (13) and in the adsorptive rotor (60) and is then supplied to the room. On the other hand, the adsorption air twice undergoes moisture absorption in the adsorptive rotor (60) and in the second adsorption heat exchanger (14) and is then expelled to outside the room.

By alternate repetition of the first operation and the second operation in the way described above, it becomes possible to continuously perform indoor latent heat load processing while continuously performing also indoor sensible heat load processing. Also at this time, the first and second operations are switched at time intervals depending on the indoor latent heat load.

Effects of the Fourteenth Embodiment

In accordance with the fourteenth embodiment, during the cooling and dehumidification operating mode, adsorption air (room air (RA)) is two stage-dehumidified in the adsorptive rotor (60) and in the adsorption heat exchanger (13, 14), thereby enhancing the apparatus in dehumidification capability. In addition, during the heating and humidification operating mode, regeneration air (room air (RA)) is two stage-humidified in the adsorption heat exchanger (13, 14) and in the adsorptive rotor (60), thereby enhancing the apparatus in humidification capability.

In addition, as in each of the foregoing embodiments, the frequency of switching between the first operation and the second operation is increased if the indoor latent heat load is large, while on the other hand the frequency of switching between the first operation and the second operation is decreased if the indoor latent heat load is small, thereby making it possible to provide operations with a balance between room comfort and energy-savings.

Other Embodiments

In regard to the foregoing embodiments, the present invention may be configured as follows.

For example, each of the foregoing embodiments employs a configuration in which one or two air heat exchangers (11, 12) and one or two adsorption heat exchangers (13, 14) are used. However, it may be configured such that three or more air heat exchangers (11, 12) and three or more adsorption heat exchangers (13, 14) are used. To sum up, in the present invention, it suffices if at least one heat exchanger is made up of an adsorption heat exchanger which supports on its surface an adsorbent.

Additionally, in a configuration employing the refrigerant circuit (20) of each of the first to seventh, thirteenth, and fourteenth embodiments, the specific configuration of the refrigerant circuit (20) and the specific configuration of the air conditioning apparatus (10) (the configuration of the outdoor unit (110) and the configuration of the indoor unit (120) in the case of the separate type of each of the first to sixth and fourteenth embodiments and the configuration of the casing (150) in the case of the integral type of each of the seventh and thirteenth embodiments) may be modified if necessary.

Furthermore, in each of the eighth to tenth embodiments employing the cold and hot water circuit (40), in both the hot water side and the cold water side, the adsorption heat exchangers (13, 14) are disposed on the upstream side, while the air heat exchangers (11, 12) are disposed on the downstream side, on the assumption that latent heat processing is given priority over sensible heat processing. However, it may be arranged such that the air heat exchangers (11, 12) are disposed on the upstream side, while the adsorption heat exchangers (13, 14) are disposed on the downstream side, on the assumption that sensible heat processing is given priority over latent heat processing.

INDUSTRIAL APPLICABILITY

As has been described above, the present invention is useful for air conditioning apparatus which separately perform indoor latent heat load processing and indoor sensible heat load processing.

What is claimed is:

1. An air conditioning apparatus controlling temperature and humidity of an airstream supplied to an air-conditioned space, comprising:
    a cold and hot water circuit for the flow of cold and hot water, the cold and hot water circuit including
        four heat exchangers for effecting heat exchange between the cold and hot water and said airstream, wherein two of the four heat exchangers are air heat exchangers which mainly perform air sensible heat processing, at least one of the air heat exchangers effecting direct heat exchange between water in the water circuit and a first portion of said airstream and the other two heat exchangers are adsorption heat exchangers which mainly perform air latent heat processing with an adsorbent supported on a surface thereof by effecting direct heat exchange between water in the water circuit and a second portion of said airstream, the first portion of said airstream being distinct from the second portion of said airstream,
    a first switching mechanism for switching a direction of cold and hot water flow so that hot water flows through one of the adsorption heat exchangers while cold water flows through the other adsorption heat exchanger, and
    a second switching mechanism for switching the direction of cold and hot water flow so that hot water flows through one of the air heat exchangers while cold water flows through the other air heat exchanger.

2. The air conditioning apparatus of claim 1,
    wherein said air conditioning apparatus is provided with a control unit which switches the flow of the cold and the hot water in the cold and hot water circuit and the distribution of air to thereby perform (a) a moisture absorbing operation in which, while cooling an adsorbent in an adsorption heat exchanger, moisture in a portion of said airstream flowing through the adsorption heat exchanger is adsorbed by the adsorbent and (b) a moisture releasing operation in which, while heating an adsorbent in an adsorption heat exchanger, moisture is released to a portion of said airstream flowing through the adsorption heat exchanger.

3. The air conditioning apparatus of claim 2,
    wherein the control unit is provided with a switching interval setting part for setting, depending on the latent heat load, a time interval at which switching between the moisture absorbing operation and the moisture releasing operation is accomplished.

4. The air conditioning apparatus of claim 3,
    wherein the switching interval setting part is configured such that as the latent heat load increases the time interval at which switching between the moisture absorbing operation and the moisture releasing operation is accomplished is set to a lower setting value.

5. The air conditioning apparatus of claim 1,
    wherein said adsorption heat exchangers mainly perform air latent heat processing by supplying an airstream to said adsorption heat exchangers without passing through said air heat exchangers.

6. The air conditioning apparatus of claim 1, wherein the first switching mechanism is configured to switch water flow direction when one of the adsorption heat exchangers is saturated to regenerate said one of the adsorption heat exchangers, and the first switching mechanism comprises:
    a first three way valve connected in fluid communication with
        a first end of a first adsorption heat exchanger,
        a source of cold water, and
        a source of hot water;
    a second three way valve connected in fluid communication with
        a second end of the first adsorption heat exchanger, and
        a fluid junction of the first switching mechanism to the second switching mechanism;
    a third three way valve connected in fluid communication with
        a first end of a second adsorption heat exchanger,
        the source of cold water, and
        the source of hot water; and
    a fourth three way valve connected in fluid communication with
        a second end of the second adsorption heat exchanger, and
        the fluid junction of the first switching mechanism to the second switching mechanism.

7. The air conditioning apparatus of claim 1, wherein the second switching mechanism is configured to switch water flow direction when one of the adsorption heat exchangers is saturated to regenerate said one of the adsorption heat exchangers, and the second switching mechanism comprises:
    a first three way valve connected in fluid communication with
        a first end of a first air heat exchanger, and
        a fluid junction of the first switching mechanism to the second switching mechanism;
    a second three way valve connected in fluid communication with
        a second end of the first air heat exchanger,
        a source of cold water, and
        a source of hot water;
    a third three way valve connected in fluid communication with
        a first end of a second air heat exchanger, and
        the fluid junction of the first switching mechanism to the second switching mechanism; and
    a fourth three way valve connected in fluid communication with
        a second end of the second air heat exchanger,
        the source of cold water, and
        the source of hot water.

8. An air conditioning apparatus controlling temperature and humidity of an airstream supplied to an air-conditioned space, comprising:
    a cold water circuit including
        a cold water supply fluidly connected to a first adsorption heat exchanger,
        the first adsorption heat exchanger performing latent heat processing by effecting direct heat exchange between water in the cold water circuit and a first portion of said airstream, and fluidly connected to a first air heat exchanger, the first air heat exchanger performing air sensible heat processing by effecting direct heat exchange between water in the cold water circuit and a second portion of said airstream, and being fluidly connected to the cold water supply, wherein water circulates from the cold water supply to the first adsorption heat exchanger, to the first air heat exchanger, and back to the cold water supply; and a hot water circuit including a hot water supply fluidly connected to a second adsorption heat exchanger, the second adsorption heat exchanger performing latent heat processing by effecting direct heat exchange between water in the hot water circuit and air, and fluidly connected to a second air heat exchanger, the second air heat exchanger performing air sensible heat processing by effecting direct heat exchange between water in the hot water circuit and air, and being fluidly connected to the hot water supply, wherein water circulates from the hot water supply to the second adsorption heat exchanger, to the second air heat exchanger, and back to the hot water supply.

* * * * *